US012798222B2

(12) United States Patent
Noguchi et al.

(10) Patent No.: US 12,798,222 B2
(45) Date of Patent: Nov. 17, 2026

(54) RESIN COMPOSITION, OPTICAL LAMINATE, OPTICAL ARTICLE, LENS AND EYEGLASSES

(71) Applicant: TOKUYAMA CORPORATION, Yamaguchi (JP)

(72) Inventors: Takao Noguchi, Yamaguchi (JP); Katsuhiro Mori, Yamaguchi (JP); Junji Momoda, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 614 days.

(21) Appl. No.: 18/271,925

(22) PCT Filed: Jan. 12, 2022

(86) PCT No.: PCT/JP2022/000699
§ 371 (c)(1),
(2) Date: Jul. 12, 2023

(87) PCT Pub. No.: WO2022/158348
PCT Pub. Date: Jul. 28, 2022

(65) Prior Publication Data

US 2024/0100810 A1 Mar. 28, 2024

(30) Foreign Application Priority Data

Jan. 25, 2021 (JP) ................................ 2021-009922
Mar. 22, 2021 (JP) ................................ 2021-047602
Apr. 7, 2021 (JP) ................................ 2021-065523

(51) Int. Cl.
*B32B 27/06* (2006.01)
*B32B 27/40* (2006.01)
*C08L 75/08* (2006.01)

(52) U.S. Cl.
CPC .............. *B32B 27/06* (2013.01); *B32B 27/40* (2013.01); *C08L 75/08* (2013.01);
(Continued)

(58) Field of Classification Search
CPC ..... B32B 27/06; B32B 27/40; B32B 2250/02; B32B 2307/42; B32B 2375/00;
(Continued)

(56) References Cited

U.S. PATENT DOCUMENTS

2014/0107314 A1 4/2014 Kawato et al.
2017/0002176 A1 1/2017 Kadowaki
(Continued)

FOREIGN PATENT DOCUMENTS

CN 107266673 10/2017
CN 108623779 10/2018
(Continued)

OTHER PUBLICATIONS

English translation of Office Action issued Jul. 7, 2025 in corresponding Taiwanese Patent Application No. 111101804.
(Continued)

*Primary Examiner* — Callie E Shosho
*Assistant Examiner* — Steven A Rice
(74) *Attorney, Agent, or Firm* — Wenderoth, Lind & Ponack, L.L.P.

(57) ABSTRACT

The present invention aims to provide a resin composition having excellent photochromic properties and mechanical properties.

The present invention relates to a resin composition containing (i) a urethane-based resin having a propylene glycol chain in a molecular chain thereof and (ii) a photochromic compound, wherein the intensity ratio of $PMI_{pst}$ to $PMI_{cp}$ ($PMI_{pst}/PMI_{cp}$) is 8.0 or more and 40.0 or less when $PMI_{pst}$ indicates the total spectral intensity of 16 ppm or more and
(Continued)

20 ppm or less including the spectral intensity of a carbon atom of a methyl group in the propylene glycol chain as measured by $^{13}$C-PST/MAS NMR and $PMI_{cp}$ indicates the total spectral intensity of 16 ppm or more and 20 ppm or less including the spectral intensity of the carbon atom of the methyl group in the propylene glycol chain as measured by $^{13}$C-CP/MAS NMR.

13 Claims, 4 Drawing Sheets

(52) U.S. Cl.
CPC ....... *B32B 2250/02* (2013.01); *B32B 2307/42* (2013.01); *B32B 2375/00* (2013.01); *B32B 2551/00* (2013.01)

(58) Field of Classification Search
CPC ...... B32B 2551/00; C08L 75/08; C08L 75/04; C08G 18/246; C08G 18/283; C08G 18/3876; C08G 18/4825; C08G 18/4833; C08G 18/4854; C08G 18/6484; C08G 18/753; C08G 18/755; C08G 18/757; C08G 18/758; C08G 18/48; C08G 18/72; G02B 1/041; G02B 5/23; G02B 1/00; G02B 1/04; G02C 7/102; G02C 7/10; C09K 9/02
USPC ........................................................ 428/411.1
See application file for complete search history.

(56) References Cited

U.S. PATENT DOCUMENTS

| | | | |
|---|---|---|---|
| 2018/0030341 | A1 | 2/2018 | Shimizu et al. |
| 2018/0312643 | A1 | 11/2018 | Shimizu et al. |
| 2020/0071467 | A1 | 3/2020 | Shimizu et al. |
| 2021/0108113 | A1 | 4/2021 | Mori et al. |

FOREIGN PATENT DOCUMENTS

| | | |
|---|---|---|
| WO | 2012/176439 | 12/2012 |
| WO | 2015/115648 | 8/2015 |
| WO | 2016/143910 | 9/2016 |
| WO | 2017/038865 | 3/2017 |
| WO | 2019/198664 | 10/2019 |
| WO | 2020/204176 | 10/2020 |
| WO | 2021/241596 | 12/2021 |

OTHER PUBLICATIONS

Extended European Search Report issued Nov. 11, 2024 in corresponding European Patent Application No. 22742470.2.
International Search Report (ISR) issued Mar. 8, 2022 in International (PCT) Application No. PCT/JP2022/000699.

RESIN COMPOSITION, OPTICAL LAMINATE, OPTICAL ARTICLE, LENS AND EYEGLASSES

TECHNICAL FIELD

The present invention relates to a resin composition, an optical laminate, an optical article, a lens and eyeglasses.

BACKGROUND ART

A lens containing a photochromic compound is used for photochromic eyeglasses. The lens may be rapidly colored to impart functions for sunglasses in an outdoor area irradiated with light such as sunlight containing ultraviolet rays. The lens fades indoors in the absence of light irradiation and imparts functions for transparent eyeglasses. Recently, demand for photochromic optical articles having such photochromic performance has increased.

In order to impart photochromic properties to the lens for eyeglasses, usually the following methods can be taken.

(a) A method of directly molding an optical material such as a lens by polymerizing a composition of a polymerizable compound and a photochromic compound (kneading method)

(b) A method of coating or cast polymerizing for laminating a resin layer, in which a photochromic compound is dispersed, on a surface of a plastic molded article like a lens (lamination method)

(c) A method of joining two optical plates with an adhesive in which a photochromic compound is dispersed, where the optical plates may be plastic or inorganic glass (binder method)

In recent years, there has been a demand for photochromic optical articles with further improved photochromic properties. In addition, there has been a need for photochromic optical articles imparted with both advanced photochromic properties and advanced mechanical properties. Patent Document 1 describes a dyed lens obtained by dyeing a urethane-based resin (molded product), which is regarded as similar to a photochromic optical article. The urethane-based resin constituting this molded product contains thiol as a monomer. It has a (thio) urethane bond in its molecular chain, and it is excellent in mechanical strength.

However, in a case where the dyeing is replaced by blending a photochromic compound that will be colored or colorless through ring-opening and ring-closing, a problem may occur since the urethane resin to make a matrix has the (thio)urethane bond. That is, the molecular mobility for the ring-opening and ring-closing of the photochromic compound may be inhibited unless the monomer formulation is controlled in a specialized manner.

PRIOR ART DOCUMENTS

Patent Documents

Patent Document 1: WO2012/176439
Patent Document 2: WO2015/115648
Patent Document 3: WO2016/143910

SUMMARY OF THE INVENTION

Problems to be Solved by the Invention

In order to improve photochromic properties, Patent Document 2 refers to use of a bifunctional active hydrogen compound having a polypropylene glycol chain or the like, while Patent Document 3 refers to use of a monofunctional active hydrogen compound. According to these methods, a specific active hydrogen compound is used to form a space in a urethane matrix, whereby the photochromic properties can be improved.

Means for Solving the Problems

The present inventors considered that it may be necessary not only to form a free space but also to control the molecular mobility in a urethane resin by a crosslinking molecule. Then, the present inventor found that a cured product (a urethane resin in which a photochromic compound is dispersed) satisfying a specific molecular mobility parameter can develop favorable photochromic properties and mechanical properties, thereby arriving at the present invention.

The present invention encompasses the following inventions.

1. A resin composition comprising a urethane-based resin having a polyoxypropylene chain in a molecular chain and a photochromic compound, wherein a ratio of $PMI_{pst}$ to $PMI_{cp}$ ($PMI_{pst}/PMI_{cp}$) is 8.0 or more and 40.0 or less when $PMI_{pst}$ indicates the maximal intensity of signal in a range of 16 ppm to 20 ppm in a first spectrum by $^{13}$C-PST/MAS nuclear magnetic resonance spectroscopy and $PMI_{cp}$ indicates the maximal intensity of signal in a range of 16 ppm to 20 ppm in a second spectrum by $^{13}$C-CP/MAS nuclear magnetic resonance spectroscopy.

2. The resin composition according to the above 1., wherein a ratio of $AMI_{pst}$ to $AMI_{cp}$ ($AMI_{pst}/AMI_{cp}$) is 7.0 or more and 23.0 or less when $AMI_{pst}$ indicates the maximal intensity of signal in a range of 10 ppm to 15 ppm in the first spectrum and $AMI_{cp}$ indicates the maximal intensity of signal in a range of 10 ppm to 15 ppm in the second spectrum.

3. The resin composition according to the above 1. or 2., wherein a ratio of $EI_{pst}$ to $EI_{cp}$ ($EI_{pst}/EI_{cp}$) is 5.0 or more and 20.0 or less when $EI_{pst}$ indicates the maximal intensity of signal in a range of 68 ppm to 72 ppm in the first spectrum and $EI_{cp}$ indicates the maximal intensity of signal in a range of 68 ppm to 72 ppm in the second spectrum.

4. The resin composition according to any one of the above 1. to 3., wherein the total content of alkali metal ion and alkaline earth metal ion by X-ray fluorimetry is 500 ppm or less.

5. The resin composition according to any one of the above 1. to 4., wherein the urethane-based resin is a resin obtained through a reaction of:

(A) a polyiso(thio)cyanate component having in a molecule at least two iso(thio)cyanate groups selected from the group consisting of an isocyanate group and an isothiocyanate group, and (B) an active hydrogen-containing component having an active hydrogen-containing group, when nB indicates a total mole number of active hydrogen-containing groups of the active hydrogen-containing component (B) and nA indicates the total mole number of iso(thio)cyanate groups of the polyiso(thio) cyanate component (A), a ratio (nA/nB) is 1.00 or more and 1.50 or less, the active hydrogen-containing component (B) comprises:

a polyfunctional active hydrogen-containing component (B1) having at least three active hydrogen-containing groups in one molecule, and a first active hydrogen-containing component (B2) having one or two active hydrogen-containing groups in one molecule, the first active hydrogen-containing component (B2) has a number average molecular weight of 500 or more and has a polyoxypropylene chain in a molecule.

6. The resin composition according to the above 5., wherein the polyoxypropylene chain of the first active hydrogen-containing component (B2) has an average value of oxypropylene repeating units of 2 or more and 25 or less.

7. The resin composition according to the above 5. or 6., wherein the first active hydrogen-containing component (B2) further has at least either an alkyl group or a polyoxyethylene chain in a molecule.

8. The resin composition according to the above 7., wherein the first active hydrogen-containing component (B2) has the alkyl group, and the carbon number is 5 or more and 20 or less.

9. The resin composition according to the above 7., wherein the first active hydrogen-containing component (B2) has the polyoxyethylene chain, and the average value of repeating units is 5 or more and 25 or less.

10. The resin composition according to any one of the above 5. to 9., wherein the polyfunctional active hydrogen-containing component (B1) comprises a compound that has a quaternary carbon atom in a molecule, and all groups to be bonded to the quaternary carbon atom have active hydrogen-containing groups.

11. An optical laminate comprising:

an optical substrate and the resin composition according to any one of the above 1. to 10., laminated on at least one of main surfaces of the optical substrate.

12. The optical laminate according to the above 11., further comprising a polarizing film.

13. An optical article comprising the resin composition according to any one of the above 1. to 10.

14. A lens comprising the resin composition according to any one of the above 1. to 10.

15. Eyeglasses comprising the lens according to the above 14.

Effect of the Invention

According to the present invention, a resin composition having excellent photochromic properties and mechanical properties can be obtained. In particular, a resin composition excellent in photochromic properties and heat resistance can be obtained.

MODE FOR CARRYING OUT THE INVENTION

<Resin Composition>

Figure 1:
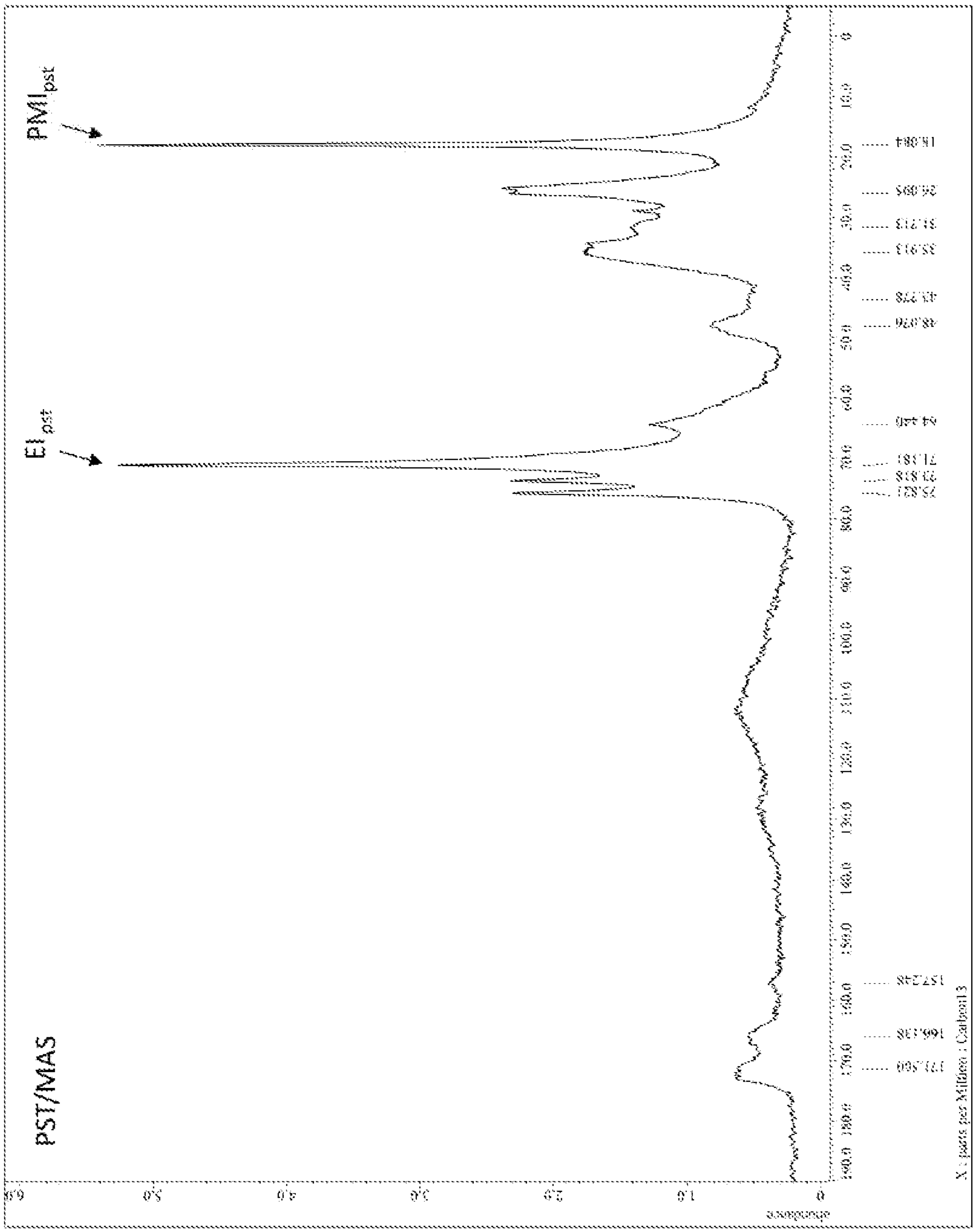
FIG. 1 is a graph showing an example of the first spectrum of a resin composition according to an embodiment.

The resin composition comprises:

(i) a urethane-based resin having a polyoxypropylene chain in a molecular chain (component (i)); and (ii) a photochromic compound (component (ii)).

According to the present findings, the urethane-based resin (i) has a polyoxypropylene chain in its molecular chain, and it exhibits excellent effects when its matrix is formed from a urethane-based resin where the molecular mobility of the polyoxypropylene chain satisfies a specific range.

Specifically, the mobility of the moiety of the methyl group of the polyoxypropylene chain that contains carbon atoms is evaluated by a solid-state $^{13}$CNMR measurement. When the index of the mobility satisfies the specific range, a resin composition having excellent photochromic properties and mechanical properties is obtained.

<Molecular Mobility Evaluation by Solid-State $^{13}$CNMR Measurement>

Examples of solid-state ER measurement of carbon-nuclei include Pulse Saturation Transfer/Magic Angle Spinning (PST/MAS) and Cross Polarization/Magic Angle Spinning (CP/MAS).

PST/MAS method is a technique of observation by highlighting highly mobile parts (amorphous moieties). CP/MAS method is a technique of observation by highlighting less mobile parts (crystalline moieties). It is possible to evaluate the molecular mobility of the components constituting the urethane-based resin (matrix resin in which the photochromic compound is dispersed) by comparing the intensities of specific signals in these spectra. The solid-state $^{13}$CNMR spectrum of the resin composition by the PST/MAS method is also referred to as a first spectrum. The solid-state $^{13}$CNMR spectrum of the resin composition by the CP/MAS method is also referred to as a second spectrum.

When $I_{PST}$ indicates the intensity of each peak measured by the PST/MAS method and $I_{CP}$ indicates the intensity of each peak measured by the CP/MAS method, $I_{PST}/I_{CP}$, i.e., a value obtained by dividing $I_{PST}$ by $I_{CP}$, is the index of molecular mobility. The $I_{ISP}/I_{CP}$ becomes larger as the molecular mobility increases. For the purpose of comparison of the molecular mobility among the different urethane-based resin compositions, the reference ($I_{PST}/I_{CP}$=1) is preferably the peak at a hard segment moiety that is rarely affected by the surrounding molecular mobility. Here, the reference peak is a carbon atom of C═O group appearing within the range of 163 to 168 ppm.

The component (i) includes a polyoxypropylene chain as an essential component. Preferably, it includes also an alkyl group and/or an oxyethylene chain.

The chemical shift values of carbon nuclei in the respective units observed by the solid-state $^{13}$C-NMR measurement are generally as follows.

10 ppm to 15 ppm: terminal methyl group in alkyl group 16 ppm to 20 ppm: methyl group in oxypropylene unit 68 ppm to 72 ppm: ethylene group in oxyethylene unit 73 ppm to 80 ppm: ethylene group (excluding methyl group) in oxypropylene unit <Measurement of $PMI_{pst}$ and $PMI_{cp}$>

In the range of 16 to 20 ppm, a methyl group in the oxypropylene unit can be identified. In a case where the component (i) contains an alkyl group having two or more carbon atoms, a peak of a methylene group next to a terminal methyl group also falls within this range.

<Measurement of $EI_{pst}$ and $EI_{cp}$>

In the range of 68 to 72 ppm, an ethylene group in the oxyethylene unit can be identified.

<Measurement of $AMI_{pst}$ and $AMI_{cp}$>

In the range of 10 to 15 ppm, in a case where the component (i) contains an alkyl group having two or more carbon atoms, the methyl group at the terminal of the alkyl group can be identified.

<Others>

In the range of 73 to 80 ppm, an ethylene group (excluding a methyl group) in the oxypropylene unit can be identified.

It is possible to analyze a resin composition containing a photochromic compound or a photochromic optical article directly by NMR to determine the values of $I_{PST}/I_{CP}$ of the respective carbon nuclei.

When the intensity ratio ($PMI_{pst}/PMI_{cp}$) is set to be 8.0 or more and 40.0 or less, excellent photochromic properties and mechanical properties can be developed. The $PMI_{pst}$ is the maximal intensity, i.e., the maximal height of the signal appearing in the range of 16 ppm to 20 ppm of the first spectrum. The $PMI_{cp}$ is the maximal intensity, i.e., the maximal height of the signal appearing in the range of 16 ppm to 20 ppm of the second spectrum. As described above, signals appearing in the range of 16 ppm to 20 ppm of the first and two spectra are the signals regarded to be derived from a methyl group of the oxypropylene unit.

An excellent effect can be exhibited when the intensity ratio ($PMI_{pst}/PMI_{cp}$) of the resin composition falls within the specific range. Although the reason has not been clarified, it can be estimated as follows. According to one speculation, when the urethane resin constituting most of the matrix of the resin composition has a polyoxypropylene chain in the molecular chain, a free space is easily maintained and high photochromic properties can be exhibited. In other words, since the matrix of the resin composition becomes flexible, structural change in the photochromic compound is rarely inhibited, and photochromic properties can be exhibited over a long period of time. However, the mechanical properties may deteriorate if the proportion of the polyoxypropylene chain is excessively increased or if the chain to be introduced becomes too long. In such circumstances, the present inventors considered that it would be necessary to evaluate the mobility of the component (i) itself in order to improve the photochromic properties while maintaining high mechanical properties. And the present inventors found that an excellent effect can be obtained by setting the intensity ratio ($PMI_{pst}/PMI_{cp}$) of the component (i) to 8.0 or more and 40.0 or less at a measurement of mobility of the component (i) by the NMR method. Namely, a fine balance between the photochromic properties and the mechanical properties can be maintained since not only the free space is formed but also appropriate mobility of the component (i) itself is maintained.

When the intensity ratio ($PMI_{pst}/PMI_{cp}$) of the component (i) is less than 8.0, it is not preferable because the photochromic properties may be inferior. When the same ratio exceeds 40.0, it is not preferable because the mechanical properties (particularly the heat resistance) may deteriorate.

That is, when the intensity ratio ($PMI_{pst}/PMI_{cp}$) is less than 8.0, it is denoted that the percentage of the polyoxypropylene chain, which has high molecular mobility and flexibility in the resin composition, is considerably low. In this resin composition, structural change of the photochromic compound is difficult, and thus, photochromic properties of the photochromic compound, such as a fading rate and a color optical density, cannot be exhibited sufficiently. The intensity ratio ($PMI_{pst}/PMI_{cp}$) of more than 40.0 may denote that the ratio of the highly crystalline polyoxypropylene chain in the resin composition is considerably low. There is a tendency that such a resin composition cannot exhibit sufficient mechanical properties like heat resistance.

In order to exhibit further favorable properties, the intensity ratio ($PMI_{pst}/PMI_{cp}$) is preferably in the range of 10.0 to 35.0, preferably 10.0 to 15.0, or more preferably 20.0 to 35.0.

As for a polymerizable monomer for constituting the component (i), in a case where a monofunctional polymerizable monomer having one reactive group (an iso(thio) cyanate group or an active hydrogen-containing group) in a molecule is used, it is particularly preferable to set the intensity ratio ($PMI_{pst}/PMI_{cp}$) in a range of 10.0 to 15.0.

In a case of using a polymerizable monomer having at least two functional groups in place of the monofunctional polymerizable monomer, it is particularly preferable to set the intensity ratio ($PMI_{pst}/PMI_{cp}$) in a range of 20.0 to 35.0, because the crosslinking degree is increased in a case where the monofunctional polymerizable monomer is not used. Seemingly therefore, excellent effect may be exhibited even if the intensity ratio ($PMI_{pst}/PMI_{cp}$) is high. In a case where the monofunctional polymerizable monomer is not used, the intensity ratio ($PMI_{pst}/PMI_{cp}$) is preferably set to a range of 23.5 to 35.0, and further preferably, 25.5 to 35.0, in view of the balance of physical properties.

It should be noted that, among the aforementioned preferred ranges, the intensity ratio ($PMI_{pst}/PMI_{cp}$) is particularly preferably in a range of 10.0 to 15.0. And it is most preferable to use the monofunctional polymerizable monomer. A resin composition having excellent photochromic and mechanical properties can be obtained by using the monofunctional polymerizable monomer that satisfies the intensity ratio ($PMI_{pst}/PMI_{cp}$) of 10.0 to 15.0. In order to exhibit further favorable photochromic properties, the intensity ratio ($PMI_{pst}/PMI_{cp}$) is preferably 11.0 to 15.0, and still more preferably, 12.5 to 15.0. This may impart the excellent physical properties and further improve the polymerizable moldability of the photochromic curable composition constituting the resin composition. In particular, a photochromic curable composition comprising the monofunctional polymerizable monomer is capable of retarding a rapid increase in viscosity at the time of polymerization.

The intensity $PMI_{pst}$ is preferably 1.0 or more and 20.0 or less. A resin composition having the intensity $PMI_{pst}$ within this range tends to have polyoxypropylene chains imparted with sufficiently high molecular mobility and flexibility. The intensity $PMI_{pst}$ is more preferably 1.1 or more and 17.5 or less, and still more preferably 1.1 or more and 3.5 or less, or further preferably 13.0 or more and 17.5 or less.

The intensity $PMI_{cp}$ is preferably 0.1 or more and 1.0 or less. A resin composition having the intensity $PMI_{cp}$ within this range tends to have sufficient polyoxypropylene chains imparted with high crystallinity. The intensity $PMI_{cp}$ is more preferably 0.10 or more and 0.70 or less, and still more preferably 0.15 or more and 0.30 or less, or 0.50 or more and 0.70 or less.

The component (i) preferably has an alkyl group in the molecule. The alkyl group preferably has 5 to 20 carbon atoms, and preferably it is a linear alkyl group. This alkyl group may constitute a side chain or a main chain of the component (i). The component (i) having an alkyl group in the molecule is obtained, for instance, by using a polymerizable monomer having an alkyl group, as the above-described monofunctional polymerizable monomer. A terminal group located opposite to the reactive group of this monofunctional polymerizable monomer is an alkyl group, and preferably, a linear alkyl group having 5 to 20 carbon atoms.

The following description refers to a case where the component (i) has an alkyl group in the molecule. In a case where the spectral intensity of the carbon atom in the methyl group at the terminal of the alkyl group as measured by $^{13}$C-PST/MAS NMR is indicated as $AMI_{pst}$ and the spectral intensity of the carbon atom in the methyl group at the terminal of the alkyl group as measured by $^{13}$C-CP/MAS NMR is indicated as a $AMI_{cp}$, the intensity ratio of $AMI_{pst}$ to $AMI_{cp}$ ($AMI_{pst}/AMI_{cp}$) is preferably 7.0 or more and 23.0 or less.

By setting the peak intensity ratio ($AMI_{pst}/AMI_{cp}$) to 7.0 or more and 23.0 or less, the photochromic properties and the mechanical properties of the obtained resin composition can be improved. The intensity ratio ($AMI_{pst}/AMI_{cp}$) is more preferably set to 11.5 or more and 20.0 or less, and further preferably, 13.5 or more and 16.0 or less. As mentioned above, signals that are believed to be derived from the carbon atom in the methyl group at the terminal of the alkyl group appear within the ranges of 10 to 15 ppm of the first and second spectra.

The intensity $AMI_{pst}$ is preferably 1.0 or more and 5.0 or less. A resin composition having an intensity $AMI_{pst}$ within this range tends to have sufficient alkyl groups imparted with high molecular mobility and flexibility. The intensity $AMI_{pst}$ is more preferably 1.10 or more and 3.00 or less, and still more preferably 2.0 or more and 2.3 or less.

The intensity $AMI_{cp}$ is preferably 0.1 or more and 0.5 or less. A resin composition having an intensity AMI p within this range tends to have sufficient alkyl groups imparted with high crystallinity. The intensity $AMI_{cp}$ is more preferably 0.10 or more and 0.30 or less, and still more preferably 0.15 or more and 0.20 or less.

Further preferably, the component (i) has an oxyethylene chain in the molecule. As for the component (i) having a polyoxyethylene chain in the molecular chain, in a case where the spectral intensity of the carbon atoms in the polyoxyethylene chains measured by $^{13}$C-PST/MAS NMR is indicated as $EI_{pst}$ and the spectral intensity of the carbon atoms in the polyoxyethylene chain measured by $^{13}$C-CP/MAS NMR is indicated as $EI_{cp}$, preferably the intensity ratio of $EI_{pst}$ to $EI_{cp}$ ($EI_{pst}/EI_{cp}$) is 5.0 or more and 20.0 or less.

When the peak intensity ratio ($EI_{pst}/EI_{cp}$) is 5.0 or more and 20.0 or less, the photochromic properties and the mechanical properties of the obtained resin composition can be improved. The intensity ratio ($EI_{pst}/EI_{cp}$) is more preferably set to 6.5 or more and 12.0 or less. As mentioned above, signals that are believed to be derived from the ethylene group in the oxyethylene unit appear within the ranges of 68 ppm to 72 ppm of the first and second spectra.

The intensity $EI_{pst}$ is preferably 4.0 or more and 20.0 or less. A resin composition having an intensity $EI_{pst}$ within this range tends to have sufficient oxyethylene chains imparted with high molecular mobility and flexibility. The intensity $EI_{pst}$ is more preferably 4.50 or more and 18.00 or less, and still more preferably 9.50 or more and 18.00 or less.

The intensity $EI_{cp}$ is preferably 0.5 or more and 3.0 or less. A resin composition having an intensity $EI_{cp}$ within this range tends to have sufficient oxyethylene chains imparted with high crystallinity. The intensity $EI_{cp}$ is more preferably 0.70 or more and 2.10 or less, and still more preferably 1.30 or more and 2.00 or less.

The first spectrum of the resin composition is obtained by $^{13}$C-PST/MAS NMR spectrometry. For the sample, a disk-shaped resin composition of about 2 mm in diameter and 1 mm in thickness is used. In measurement, a 4 mm zirconia sample tube filled with this sample is used. As the measuring device, for instance, ET-NMR JNM-ECA400II (JEOL Ltd.) is used. The measurement conditions are, for instance, as follows.

Probe: 4 mmΦCP/MAS probe (JEOL Ltd.)
$^{13}$C Nuclear measurement frequency: 100.53 MHz
Measurement method: CP/MAS
Contact times: 2 msec.
Delay time: 5 sec.
Cumulative number: 5000
Sample volume: approximately 80 mg
Sample rotation number: 6000 Hz
Temperature: 25 °C.
External standard substance: adamantane (29.5 ppm)
Presaturation: 10 msec. interval The second spectrum of the resin composition is obtained by $^{13}$C-CP/MAS NMR spectrometry. The second spectrum is obtained in the same manner as the first spectrum described above, except that the presaturation is not applied. For the first and second spectra thus obtained, the intensities and chemical shifts of the respective signals are calculated using analysis software like JEOL Delta v5.0.4, for instance.

FIG. 1 is a graph showing an example of the first spectrum of a resin composition according to the embodiment. The graph shown in FIG. 1 is the first spectrum of the resin composition according to Example 15 described later. In FIG. 1, the horizontal axis shows the chemical shift, and the vertical axis shows the intensity. The first spectrum shown in FIG. 1 includes a signal indicating a maximal value $PMI_{pst}$ within a chemical shift range of 16 ppm or more and 20 ppm or less, and a signal indicating a maximal value $EI_{pst}$ within a chemical shift range of 68 ppm or more and 72 ppm or less.

Figure 2:
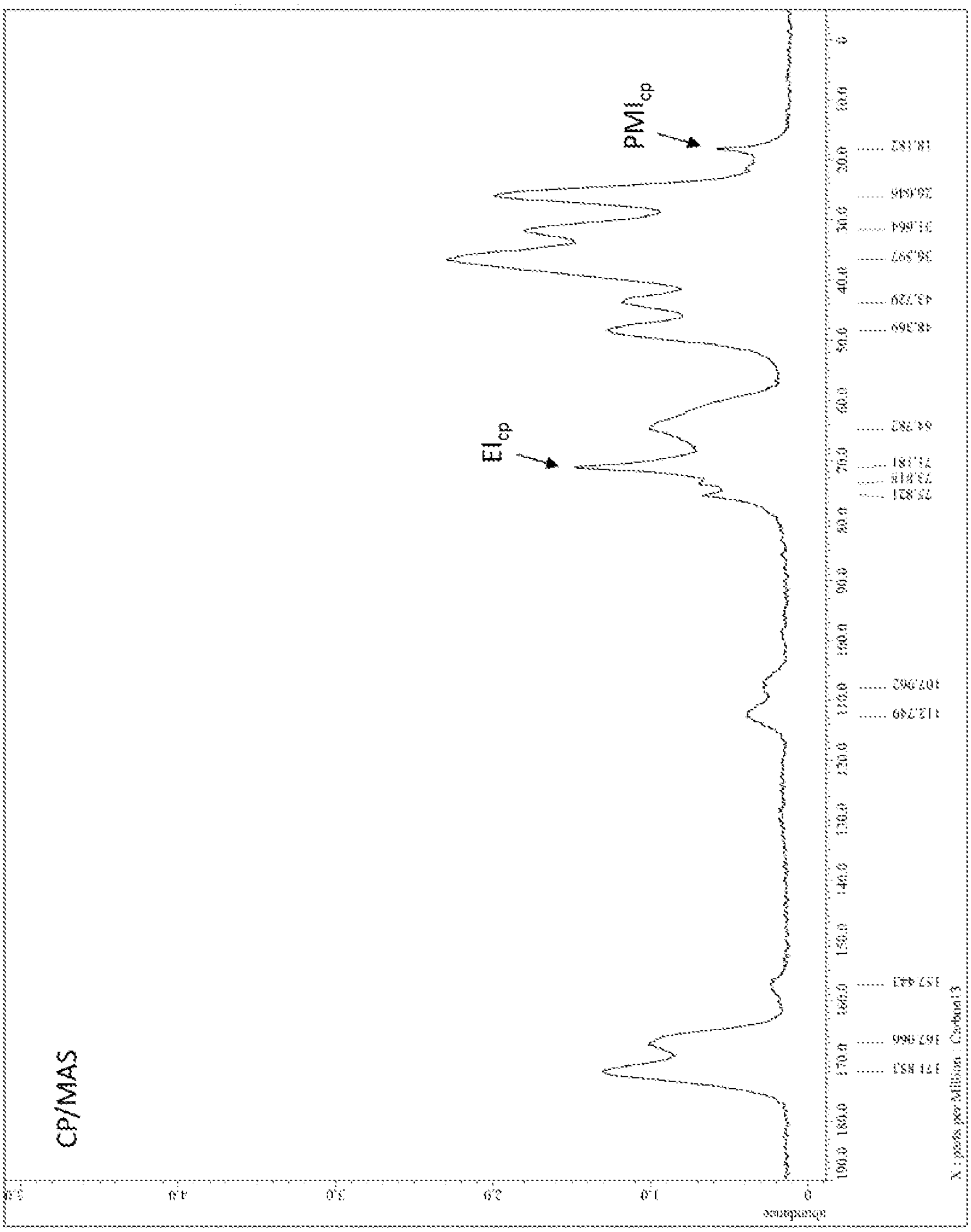
FIG. 2 is a graph showing an example of the second spectrum of a resin composition according to an embodiment.

FIG. 2 is a graph showing an example of the second spectrum of the resin composition according to the embodiment. The graph shown in FIG. 2 is the second spectrum of the resin composition according to Example 15 described later. In FIG. 2, the horizontal axis shows the chemical shift, and the vertical axis shows the intensity. The second spectrum shown in FIG. 2 includes a signal showing a maximal value $PMI_{cp}$ within a chemical shift range of 16 ppm or more and 20 ppm or less, and a signal showing a maximum value $EI_{cp}$ within a chemical shift range of 68 ppm or more and 72 ppm or less.

The component (i) can be produced by any method without any particular limitations as long as it has a polyoxypropylene chain in the molecular chain and has an intensity ratio ($PMI_{pst}/PMI_{cp}$) of 8.0 to 40.0 as mentioned above. It is particularly preferable to use a polymerizable monomer having an oxypropylene chain with favorable polymerization moldability for easily producing a resin composition. A polymerizable monomer having an oxypropylene chain and an oxyethylene chain is more preferably used, and a polymerizable monomer having an oxypropylene chain, an oxyethylene chain, and an alkyl group having 5 to 20 carbon atoms (particularly preferably a monofunctional polymerizable monomer) is preferably used.

A photochromic compound contained in the resin composition will be described below.

<Photochromic Compound (ii)>

Any compounds exhibiting the photochromic properties can be used as the photochromic compound (ii) (hereinafter, this is referred to also as component (ii)) without any particular limitations. These compounds can be used alone or at least two thereof can be used in combination.

Typical examples of such photochromic compounds include known photochromic compounds such as a chromene compound, a fulgimide compound, a spirooxazine compound, and a spiropyran compound. These compounds can be used without any substantial limitations.

Examples of the fulgimide compound, the spirooxazine compound, the spiropyran compound and the chromene compound include compounds described in JP H02-28154 A, JP S62-268830 A, WO94/22950 pamphlet, and WO96/14596 pamphlet, for instance.

In addition to the chromene compounds described in these patent documents, chromene compounds having excellent photochromic properties are known. Such a chromene compound can be suitably used as the component (ii). These chromene compounds are disclosed in, for instance, JP 2001-031670 A, JP 2001-011067 A, JP 2001-011066 A, JP 2000-344761 A, JP 2000-327675 A, JP 2000-256347 A, JP 2000-229976 A, JP 2000-229975 A, JP 2000-229974 A, JP 2000-229973 A, JP 2000-229972 A, JP 2000-219678 A, JP 2000-219686 A, JP H11-322739 A, JP H11-286484 A, JP H11-279171 A, JP H09-218301 A, JP H09-124645 A, JP H08-295690 A, JP H08-176139 A, JP H08-157467 A, U.S. Pat. No. 5,645,767 publication, U.S. Pat. No. 5,658,501 publication, U.S. Pat. No. 5,961,892 publication, U.S. Pat. No. 6,296,785 publication, Japanese Patent No. 4424981 publication, Japanese Patent No. 4424962 publication, WO2009/136668 pamphlet, WO2008/023828 pamphlet, Japanese Patent No. 4369754 publication, Japanese Patent No. 4301621 publication, Japanese Patent No. 4256985 publication, WO2007/086532 pamphlet, JP 2009-120536 A, JP 2009-67754 A, JP 2009-67680 A, JP 2009-57300 A, Japanese Patent No. 4195615 publication, Japanese Patent No. 4158881 publication, Japanese Patent No. 4157245 publication, Japanese Patent No. 4157239 publication, Japanese Patent No. 4157227 publication, Japanese Patent No. 4118458 publication, JP 2008-74832 A, Japanese Patent No. 3982770 publication, Japanese Patent No. 3801386 publication, WO2005/028465 pamphlet, WO2003/042203 pamphlet, JP 2005-289812 A, JP 2005-289807 A, JP 2005-112772 A, Japanese Patent No. 3522189 publication, WO2002/090342 pamphlet, Japanese Patent No. 3471073 publication, JP 2003-277381 A, WO2001/060811 pamphlet, and WO00/71544 pamphlet. Fulgide compounds, chromene compounds and spirooxazine compounds are disclosed in many documents, for instance, JP H02-28154 A, JP S62-288830 A, WO94/22850 pamphlet, and WO96/14596 pamphlet.

Among the known photochromic compounds, a chromene compound having an indeno[2,1-f]naphtho[1,2-b]pyran skeleton may be used more preferably from the viewpoint of photochromic properties such as color optical density, initial colorability, durability, and fading rate.

In addition to that, a photochromic compound having an oligomer chain group in a molecule can also be suitably used. Photochromic compounds having such oligomer chain groups are disclosed in many documents such as WO2000/015630 pamphlet, WO2004/041961 pamphlet, WO2009/146509 pamphlet, WO2012/149599 pamphlet, WO2012/162725 pamphlet, WO2013/078086 pamphlet, WO2019/013249 pamphlet, and WO2019/203205 pamphlet. Among the photochromic compounds having an oligomer chain group in the molecule, photochromic compounds having oligomer chain groups as described in WO2019/013249 pamphlet and WO2019/203205 pamphlet are preferably used because both exhibit further favorable photochromic properties and durability.

<Resin Composition>

The resin composition includes the component (i) and the component (ii). The compounding ratio of the component (i) and the component (ii) for the resin composition may be appropriately determined depending on the intended use of the target photochromic optical article and the like. Taking the general use in consideration, preferably 0.01 to 10 parts by mass of the component (ii) is contained relative to 100 parts by mass of the component (i).

The component (i) will form a crosslinked structure. Therefore, the following process may be employed for making the component (ii) uniformly disperse in the component (i) that becomes the matrix. As described in detail below, it is preferable to prepare a polymerizable curable composition (photochromic curable composition) containing a photochromic compound and to cure the photochromic curable composition, thereby forming a resin composition. In this case, the content of the component (i) becomes the total amount of the polymerizable monomer component to form the component (i) in the photochromic curable composition. Specifically, in a case where the component (i) is composed of the component (A) and the component (B) described in detail below, the content of the component (i) will be equivalent to the total amount of the component (A) and the component (B). (Namely, component (i) amount=component (A) amount+component (B) amount.) For this reason, in order to set a suitable content of the component (ii) in the resin composition, the amount of the component (ii) may be appropriately determined relative to the total amount of the component (A) and the component (B). This will be described in detail below.

The resin composition may contain any known additive in addition to the component (i) and the component (ii).

Specific examples thereof include additives such as an ultraviolet absorber, an antistatic agent, an infrared absorber, an ultraviolet stabilizer, an antioxidant, a coloring inhibitor, an antistatic agent, a fluorescent dye, a dye, a pigment, and a perfume; a solvent; a leveling agent; an internal release agent; and a polymerization modifier such as thiols like t-dodecyl mercaptan. These additives are preferably compounded into the photochromic curable composition described in detail below.

The total content of the alkali metal ion and the alkaline earth metal ion in the resin composition is preferably 500 ppm or less. A resin composition having a smaller content of alkali metal ion and alkaline earth metal ion may make a photochromic compound excellent in durability.

The alkali metal ion and the alkaline earth metal ion are not particularly limited. Examples of the alkali metal ion include sodium ion, potassium ion, lithium ion, and cesium ion. Examples of the alkaline earth metal ion include calcium ion, magnesium ion, barium ion, strontium ion, beryllium ion, and radium ion. The alkali metal ion and the alkaline earth metal ion include, for instance, at least one kind of ion selected from the group consisting of sodium ion, potassium ion, cesium ion, and magnesium ion.

The total content of alkali metal ion and alkaline earth metal ion in the resin composition can be measured by X-ray fluorimetry. In the measurement, a resin composition of a disk shape having a diameter of 40 mm and a thickness of 1 mm is used as a sample. As the measuring device, for instance, an X-ray fluorimeter (ZSX Primus IV) manufactured by Rigaku Corporation is used. The detection limit of the X-ray fluorimeter is 1 ppm, for instance.

The total content of the alkali metal ion and the alkaline earth metal ion in the resin composition is preferably 200 ppm or less, and more preferably 100 ppm or less. The lower limit of the alkali metal ion and the alkaline earth metal ion in the resin composition is 0 ppm or the detection limit of the X-ray fluorimeter.

<Characteristics of Resin Composition>

A resin composition satisfying a color optical density of 0.55 or more, a fading rate of 200 sec. or less, and a heat resistance (softening temperature) of 45 °C or higher can be obtained. Here, these properties can be measured by the methods described in Examples below. It is possible to set the color optical density to be 0.60 or more, the fading rate to be 95 sec. or less, and the heat resistance (softening temperature) to be 50 °C or higher in order to obtain further-balanced photochromic properties and heat resistance. It is further possible to set the color optical density to be 0.75 or more, the fading rate to be 80 sec. or less, and the heat resistance (softening temperature) to be 60 °C or higher. It is particularly possible to set the color optical density to be 0.85 or more, the fading rate to be 70 sec. or less, and the heat resistance (softening temperature) to be 70 °C or higher. Although the upper limits or the lower limits of values for these physical properties are not particularly limited, the color optical density is 1.10 or less, the fading rate is 40 sec. or more, and the heat resistance is 90 °C or lower.

<Suitable Method for Producing Resin Composition>

As described above, the method for producing the resin composition is not particularly limited as long as the urethane resin contained in the resin composition satisfies certain requirements. For instance, the component (i) may be impregnated with the component (ii), or the component (i) and the component (ii) may be mixed. However, in order to efficiently disperse the (ii) component in the resin composition, it is preferable to prepare a photochromic curable composition containing the component (ii) and a polymerizable monomer to form a urethane-based resin. From the viewpoint of facilitating production of a photochromic curable composition, it is preferred to produce a photochromic curable composition comprising:

(A) a polyiso(thio)cyanate component having in a molecule two or more iso(thio)cyanate groups selected from the group consisting of an isocyanate group and an isothiocyanate group;

(B) an active hydrogen-containing component having an active hydrogen-containing group; and the component (ii).

And, it is preferred to produce a resin composition by curing (polymerizing) this photochromic curable composition.

In preparation of the photochromic curable composition, though the compounding ratio of the monomer for forming the component (i) is not particularly limited, a compounding ratio as described below is preferred to stably obtain a resin composition. The photochromic curable composition will be described below.

<Photochromic Curable Composition>

As described above, the photochromic curable composition preferably comprises:

(A) a polyiso(thio)cyanate component having in a molecule two or more iso(thio)cyanate groups selected from the group consisting of an isocyanate group and an isothiocyanate group;

(B) an active hydrogen-containing component having an active hydrogen-containing group; and the photochromic compound (ii).

Hereinafter, the respective components will be described.

<Component (A): A polyiso(thio)cyanate Component Having in a Molecule Two or More Iso (Thio) Cyanate Groups Selected from the Group Consisting of an Isocyanate Group and an Isothiocyanate Group>

As for the polyiso(thio)cyanate component (A) (component (A)) having in a molecule two or more iso(thio)cyanate groups selected from the group consisting of an isocyanate group and an isothiocyanate group, the number of iso(thio) cyanate groups is not particularly limited as long as it is two or more. From the viewpoint of facilitating control of polymerization, the number is preferably 2 to 6, more preferably 2 to 4, and still more preferably 2.

Here the "polyiso(thio)cyanate compound" refers to a group having two or more isocyanate groups and/or isothiocyanate groups.

Examples of the aforementioned component (A) include an aliphatic isocyanate compound, an alicyclic isocyanate compound, an aromatic isocyanate compound, a sulfur-containing heterocyclic isocyanate compound, a sulfur-containing aliphatic isocyanate compound, an aliphatic sulfide-based isocyanate compound, an aromatic sulfide-based isocyanate compound, an aliphatic sulfone-based isocyanate compound, an aromatic sulfone-based isocyanate compound, a sulfonic acid ester-based isocyanate compound, and an aromatic sulfonic acid amide-based isocyanate compound.

Further examples thereof include a block isocyanate compound in which an isocyanate group of the above-described isocyanate compound is blocked with at least one kind of blocking agent selected from the group consisting of alcohols, lactams, phenols, oximes, pyrazoles, thiols, active methylene compounds, malonic acid diester-based compounds, and acetoacetic acid ester-based compounds.

(Component (A): Suitable Polyisocyanate Compound)

Among the aforementioned polyisocyanate compounds, compounds suitable for forming a resin composition excellent in transparency and mechanical strength, particularly, compounds suitable for producing a resin composition containing a photochromic compound include compounds represented by the following formulae (I) to (VIII).

(Component (A): Aliphatic Isocyanate Compound)

As a preferable aliphatic isocyanate compound, a compound represented by the following formula is preferably used.

[CF 1]

$$OCN—R^{100}—NCO \quad (I)$$

(In the formula, $R^{100}$ is an alkylene group having 1 to 10 carbon atoms, and it may be a group in which a part of the methylene group in a chain of the alkylene group is substituted with a sulfur atom.)

Here, $R^{100}$ is an alkylene group having 1 to 10 carbon atoms, and it may be a linear or branched group. Preferred examples thereof include linear groups such as a pentamethylene group, a hexamethylene group, a heptamethylene group or an octamethylene group; or a branched group in which a part of the hydrogen atoms is substituted with a methyl group, such as a pentamethylene group, a hexamethylene group, a heptamethylene group, or an octamethylene group. For an alkylene group in which a part of the methylene group is substituted with a sulfur atom, a $-CH_2CH_2SCH_2CH_2SCH_2CH_2-$ group is preferred.

Specific examples of the compound represented by the formula (I) include pentamethylene diisocyanate, hexamethylene diisocyanate, heptamethylene diisocyanate, octamethylene diisocyanate, 2,4,4-trimethylhexanemethylene diisocyanate, and 1,2-bis(2-isocyanatoethylthio)ethane. These compounds can be used alone, or two or more kinds of the compounds can be used.

(Alicyclic Isocyanate Compound, Aromatic Isocyanate Compound)

For the aromatic isocyanate compound and alicyclic isocyanate compound, compounds represented by the following formulae (II) and (III) can be used preferably.

[CF 2]

(II)

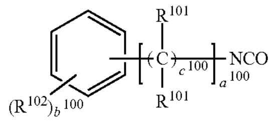

[CF 3]

(III)

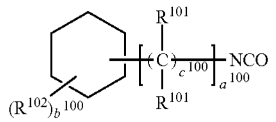

(In the formulae, each $R^{101}$ is an alkyl group having 1 to 4 carbon atoms or a hydrogen atom, and they may be the same or different groups.

$R^{102}$ is an alkyl group having 1 to 4 carbon atoms, and in a case where a plurality of groups are present, they may be the same or different groups.

$a^{100}$ is an integer from 2 or 3, $b^{100}$ is an integer from 0 to 4, and $c^{100}$ is an integer from 0 to 4.) The difference between the compound represented by the formula (II) and the compound represented by the formula (III) is whether the compound has a phenyl group (the compound represented by the formula (II)) or the compound has a cyclohexane group (the compound represented by the formula (III)).

As for the $R^{101}$, the alkyl group having 1 to 4 carbon atoms may be a linear or branched group. Particularly preferably, $R^{101}$ is a hydrogen atom, a methyl group, or an ethyl group. As for the $R^{102}$, the alkyl group having 1 to 4 carbon atoms may be a linear or branched group. Particularly preferably, $R^{102}$ is a methyl group or an ethyl group.

Specific examples of the compound represented by the formula (II) or the formula (III) include isophorone diisocyanate, xylene diisocyanate (o-, m-, p-), 2,4-tolylenediisocyanate, 2,6-tolylenediisocyanate, 1,3-bis(isocyanatomethyl)cyclohexane, and 1,4-bis(isocyanatomethyl) cyclohexane. These compounds can be used alone, or two or more kinds of the compounds can be used.

Further, as a preferred aromatic isocyanate compound and a preferred alicyclic isocyanate compound, compounds represented by the following formula (IV) and the following formula (V) are used preferably.

[CF 4]

(IV)

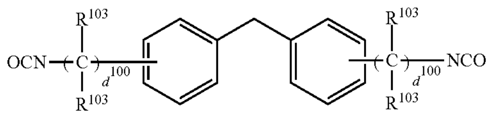

[CF 5]

(V)

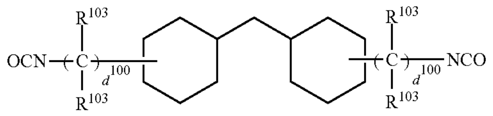

(In the formula, each $R^{103}$ is an alkyl group having 1 to 4 carbon atoms or a hydrogen atom, and they may be the same or different groups; $d^{100}$ is an integer from 0 to 4). The difference between the compound represented by the formula (IV) and the compound represented by the formula (V) is whether the compound has two phenyl groups (the compound represented by the formula (IV)) or the compound has two cyclohexane groups (the compound represented by the formula (V)).

As for the $R^{103}$, the alkyl group having 1 to 4 carbon atoms may be a linear or branched group. Particularly preferably, $R^{103}$ is a hydrogen atom, a methyl group, or an ethyl group.

Specific examples of the compound represented by the formula (IV) or the formula (V) include 4,4'-diphenylmethane diisocyanate and dicyclohexylmethane-4,4'-diisocyanate. These compounds can be used alone, or two or more kinds of the compounds can be used.

As a preferred alicyclic isocyanate compound, a compound represented by the following formula (VI) is used preferably.

[CF 6]

(VI)

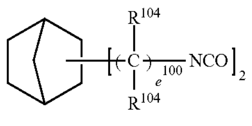

(In the formula, each $R^{104}$ is an alkyl group having 1 to 4 carbon atoms or a hydrogen atom, and they may be the same or different groups; and $e^{100}$ is an integer from 0 to 4.)

As for the $R^{104}$, the alkyl group having 1 to 4 carbon atoms may be a linear or branched group. Particularly preferably, $R^{104}$ is a hydrogen atom, a methyl group, or an ethyl group.

Specific examples of the compound represented by the above formula (VI) include norbornane diisocyanate, 2,5-bis(isocyanatemethyl)-bicyclo[2,2,1]-heptane, and 2,6-bis(isocyanatemethyl)-bicyclo[2,2,1]-heptane. These compounds can be used alone, or two or more kinds of the compounds can be used.

(Component (A): Alicyclic Sulfur-Containing Heterocyclic Isocyanate Compound)

For a sulfur-containing heterocyclic isocyanate compound, compounds represented by the following formulae (VII) and (VIII) are preferably used.

[CF 7]

(VII)

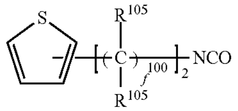

[CF 8]

(VIII)

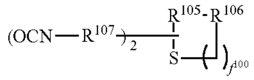

(In the formulae, each $R^{105}$ is an alkyl group having 1 to 4 carbon atoms or a hydrogen atom, and they may be the same or different groups.

$R^{106}$ is a methylene group or a sulfur atom; $R^{107}$ is an alkylene group having 1 to 6 carbon atoms or a group in which a part of the methylene group in the chain of the alkylene group having 1 to 6 carbon atoms is substituted with a sulfur atom; and $f^{100}$ is an integer from 0 to 2.)

Specific examples of the compound represented by the formula (VII) or the formula (VIII) include 2,5-bis(isocyanatomethyl)thiophene, 2,5-bis(isocyanatomethyl)-1,4-dithiane, 3,4-bis(isocyanatomethyl)tetrahydrothiophene, and 4,5-bis(isocyanatomethyl)-1,3-dithiolane. These compounds can be used alone, or two or more kinds of the compounds can be used.

Further examples thereof include: halogen-substitution products, alkyl substitution products, alkoxy substitution products or nitro substitution products of the polyisocyanate; prepolymer-type denatured products with polyvalent alcohols; carbodiimide denatured products; urea denatured products; biuret denatured products; and products obtained by dymerization or trimerization reaction.

(Suitable Component (A): Polyisothiocyanate Compound)

Examples of the alicyclic polyisothiocyanate compound (A) include a polyisocyanate compound represented by any of the formulae (I) to (VIII) in which its isocyanate group is substituted with an isothiocyanate group. More specifically, examples thereof include an aliphatic isothiocyanate compound, an alicyclic isothiocyanate compound, an aromatic isothiocyanate compound, a sulfur-containing heterocyclic isothiocyanate compound, a heterocycle-containing isothiocyanate compound, a sulfur-containing aliphatic isothiocyanate compound, and a sulfur-containing aromatic isothiocyanate compound.

Specific examples of preferred aliphatic isothiocyanate compound include hexamethylene diisothiocyanate, 1,2-diisothiocyanateethane, 1,3-diisothiocyanatepropane, 1,4-diisothiocyanatebutane, 1,6-diisothiocyanatehexane, 2,4,4-trimethylhexane methylene diisothiocyanate, thiobis(3-isothiocyanatepropane), thiobis(2-isothiocyanateethane), and dithiobis(2-isothiocyanateethane).

Examples of alicyclic isothiocyanate compounds and aromatic isothiocyanate compounds include p-phenylene diisopropylidene diisothiocyanate, 1,2-diisothiocyanate benzene, 1,3-diisothiocyanate benzene, 1,4-diisothiocyanate benzene, 2,4-diisothiocyanate toluene, isophorone diisothiocyanate, xylene diisothiocyanate (o-, m-, p-), 2,4-tolylene diisothiocyanate, 2,6-tolylene diisothiocyanate, and cyclohexane diisothiocyanate. Further examples thereof include 1,1'-methylenebis(4-isothiocyanatebenzene), 1,1'-methylenebis (4-isothiocyanate 2-methylbenzene), and 1,1'-methylenebis (4-isothiocyanate 3-methylbenzene).

Examples of preferred alicyclic isothiocyanate compounds include 2,4-bis(isothiocyanatomethyl)norbornane, 2,5-bis(isothiocyanatomethyl)norbornane, 2,6-bis(isothiocyanatomethyl)norbornane, 3,5-bis(isothiocyanatomethyl) norbornane, and norbornane diisothiocyanate.

Examples of preferred sulfur-containing heterocyclic isothiocyanate compounds include thiophene-2,5-diisothiocyanate, 1,4-dithiane-2,5-diisothiocyanate, 2,5-bis(isothiocyanatomethyl)-1,4-dithiane, and 4,5-bis (isothiocyanatomethyl)-1,3-dithiolane.

(Component (A): Compound Having Isocyanate Group and Isothiocyanate Group)

Examples of compound as the component (A) having both isocyanate group and isothiocyanate group include the following compounds. For instance, it is the polyisocyanate compound specified above in which at least one isocyanate group is an isothiocyanate group. Further, it is the polyisothiocyanate compound specified above in which at least one isothiocyanate group is an isocyanate group.

(Component (A): Compound Having Iso(Thio)Cyanate Group Blocked with Blocking Agent)

A compound having an iso(thio)cyanate group blocked with a blocking agent (hereinafter, also referred to as a block iso(thio)cyanate compound) can be obtained by reacting the aforementioned iso(thio)cyanate group of the polyiso(thio) cyanate compound with at least one kind of blocking agent selected from the group consisting of alcohols, lactams, phenols, oximes, pyrazoles, thiols, active methylene compounds, malonic acid diester-based compounds, and acetoacetate ester-based compounds. The conditions for reacting a blocking agent with the iso(thio)cyanate group vary depending on the type of blocking agent, and thus, they may be appropriately determined according to the blocking agent to be selected. Note that the protection of the iso(thio) cyanate group by the blocking agent can be confirmed by Fourier transform infrared spectroscopy (FT-IR).

Use of the block iso(thio)cyanate compound can further extend the pot life of the photochromic composition.

Preferred Example of Component (A)

Preferred examples of the component (A) include pentamethylene diisocyanate, hexamethylene diisocyanate, heptamethylene diisocyanate, octamethylene diisocyanate, 1,3-bis(isocyanatomethyl)cyclohexane, 1,4-bis(isocyanatomethyl)cyclohexane, isophorone diisocyanate, norbornane diisocyanate, 2,5-bis(isocyanatemethyl)-bicyclo[2,2,1]-heptane, 2,6-bis(isocyanatemethyl)-bicyclo[2,2,1]-heptane, 1,2-bis(2-isocyanatoethylthio)ethane, xylene diisocyanate (o-, m-, p-), 2,4-tolylene diisocyanate, 2,6-tolylene diisocyanate, and 4,4'-diphenylmethane diisocyanate. They can be used alone or as mixtures thereof.

<Component (B): Active Hydrogen-Containing Component Having Active Hydrogen-Containing Group>

The active hydrogen-containing group in the active hydrogen-containing component (B) having an active hydrogen-containing group (component (B)) is a group containing active hydrogen. In other words, the component (B) is an active hydrogen compound having a group containing active hydrogen. The active hydrogen-containing group refers to a group capable of reacting with an isocyanate group, and examples thereof include a hydroxyl group, an amino group, a carboxyl group and/or a thiol group.

Preferably, the component (B) has a polyoxypropylene chain. Further preferably, the component (B) has an alkyl group having 5 to 20 carbon atoms and/or a polyoxyethylene chain in addition to the polyoxypropylene chain. Since the component (B) has the chains and the groups, a resin composition having an intensity ratio ($PMI_{pst}/PMI_{cp}$) of 8.0 or more and 40.0 or less can be easily produced.

When nB indicates the total mole number of active hydrogen-containing groups in the component (B) and nA indicates the total mole number of iso(thio)cyanate groups in the polyiso(thio)cyanate compound (A), the ratio (nA/nB) is preferably 1.00 or more and 1.50 or less, more preferably 1.00 or more and 1.20 or less. When nA/nB is 1.00 or more and 1.50 or less, a resin composition having an intensity ratio ($PMI_{pst}/PMI_{cp}$) of 8.0 or more and 40.0 or less can be easily produced. As a result, a resin composition having excellent photochromic properties and heat resistance can be obtained.

When nA/nB ratio is less than 1.00 or greater than 1.50, the degree of polymerisation does not increase, which may result in inferior heat resistance.

The compounding ratio of the component (A) to the component (B) is not particularly limited as long as the ratio of nA/nB is within the range of 1.00 to 1.50. For the purpose of producing a resin composition that satisfies the intensity ratio ($PMI_{pst}/PMI_{cp}$) of 8.0 or more and 40.0 or less and that has excellent photochromic properties and heat resistance, the component (B) is preferably set to 50 to 70 parts by mass, and more preferably, the component (B) is set to 60 to 65 parts by mass when the total mass of the component (A) and the component (B) is set to 100 parts by mass.

In view of the photochromic properties and mechanical properties of the resin composition to be obtained, it is desirable that the component (B) contains: (B1) a polyfunctional active hydrogen-containing component having three or more active hydrogen-containing groups in one molecule (component (B1)); and further (B2) a first active hydrogen-containing component having one or two active hydrogen-containing groups in one molecule (component (B2)).

(Component (B1): Polyfunctional Active Hydrogen-Containing Component Having Three or More Active Hydrogen-Containing Groups in One Molecule)

The component (B1) used for the photochromic curable composition is not particularly limited as long as it is a compound having three or more active hydrogen-containing groups in a molecule. Particularly preferably, it is a compound in which the total number of hydroxyl groups and thiol groups in a molecule is three or more. Specifically, a compound having three or more hydroxyl groups in a molecule, a compound having three or more thiol groups in a molecule, or a compound having totally three or more hydroxyl groups and thiol groups in a molecule may be used. The number of hydroxyl groups and thiol groups in the component (B1) is not particularly limited as long as it is three or more.

Specific examples of the component (B1) include an aliphatic poly(thi)ol compound and an aromatic poly(thi)ol compound. More particularly, the following compounds can be used.

(Suitable poly(thi)ol Compound)

Among the aforementioned poly(thi)ol compounds (B1), the following compounds can be referred to as examples of the compound suitable for forming a resin composition excellent in transparency and heat resistance, and particularly, a compound suitable for producing a resin composition containing a photochromic compound. Specific examples thereof include compounds represented by the following formulae (IX) to (XVII).

(Aliphatic poly(thi)ol Compound)

A compound represented by the following formula (IX) is preferably used as the aliphatic poly(thi)ol compound.

[CF 9]

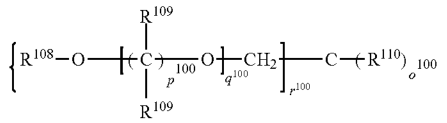

(IX)

(In the formula, each $R^{108}$ is a hydrogen atom or a group synonymous with the following formula (K), and they can be the same or different.

[CF 10]

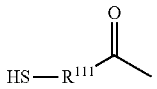

(X)

(In the formula, $R^{111}$ is an alkylene group having 1 to 6 carbon atoms.)

Each $R^{109}$ is a hydrogen atom, a methyl group, or an ethyl group, which may be the same or different.

$R^{110}$ is a hydrogen atom or an alkyl group having 1 to 6 carbon atoms. In a case where a plurality of $R^{110}$ are present, they may be the same or different.

$o^{100}$ is 0 to 2, $p^{100}$ is 1 to 6, $q^{100}$ is 0 to 10, $r^{100}$ is 2 to 4, and $o^{100}*+r^{100}$ is 4.}

The $R_{111}$ is an alkylene group having 1 to 6 carbon atoms, and it may be a linear or branched group. Particularly preferably, $R^{111}$ is a methylene group, an ethylene group, a trimethylene group, or a propylene group.

Specific examples of the compound represented by the formula (IX) include trimethylolpropane, pentaerythritol, trimethylolpropane tris(3-mercaptopropionate), and pentaerythritol tetrakis(3-mercaptopropionate).

Among the preferred aliphatic poly(thi)ol compounds, a compound represented by the following formula (XI) is preferably used as the polyfunctional poly(thi)ol compound having an ether bond.

[CF 11]

$$(F^{100})_3C-H_2C-O-CH_2-C(F^{100})_3 \quad (XI)$$

(In the formula, each $F^{100}$ is an alkyl group having 1 to 6 carbon atoms, or a group represented by the following formula (XII).

[CF 12]

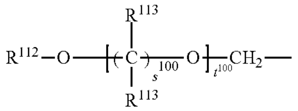

(XII)

(In the formula, each $R^{112}$ is a hydrogen atom or a group synonymous with the aforementioned formula (X), and they may be the same or different groups.

Each $R^{113}$ is a hydrogen atom, a methyl group or an ethyl group, and they may be the same or different groups.

$s^{100}$ is 1 to 6, and $t^{100}$ is 0 to 10.)}

As for $F^{100}$, at least two thereof are the groups represented by the formula (XII). Examples of the other groups include an alkyl group having 1 to 6 carbon atoms, and they may be a linear or branched groups. Particularly preferably, $F^{100}$ is a methyl group, an ethyl group, a trimethyl group, or a propyl group. The respective $F^{100}$ may be the same or different groups as long as two or more of them are the groups represented by the formula (XII). Specific examples of the compound represented by the formula (XI) include ditrimethylolpropane, dipentaerythritol, ditrimethylolpropane tetrakis(3-mercaptopropionate), and dipentaerythritol hexakis(3-mercaptopropionate).

Among the preferred aliphatic poly(thi)ol compounds, a compound represented by the following formula (XIII) is used preferably as the polyfunctional polythiol compound.

[CF 13]

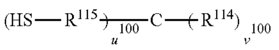

(XIII)

(In the formula, $R^{114}$ is a hydrogen atom, an alkyl group having 1 to 6 carbon atoms, or a group in which a part of the methylene group of the alkyl group having 1 to 6 carbon atoms is substituted with a sulfur atom. In a case where a plurality of $R^{114}$ are present, they may be the same or different groups.

$R^{115}$ is an alkylene group having 1 to 10 carbon atoms, a group in which a part of the methylene group in the chain of the alkylene group having 1 to 10 carbon atoms is substituted with a sulfur atom, or a group in which a part of the hydrogen atoms of the alkylene group having 1 to 10 carbon atoms is substituted with a thiol group. In a case where a plurality of $R^{115}$ are present, they may be the same or different groups.

$u^{100}$ is an integer from 2 to 4, $v^{100}$ is an integer from 0 to 2, and $u^{100}+v^{100}$ is 4.)

As for the $R^{114}$, the alkyl group having 1 to 6 carbon atoms may be a linear or branched group. Particularly preferably, $R^{114}$ is a hydrogen atom, a methyl group, or an ethyl group. Specific examples of the group in which a part of the methylene group in the chain of the alkyl group having 1 to 6 carbon atoms is substituted with a sulfur atom include $-CH_2SCH_3$.

As for the $R^{115}$, the alkylene group having 1 to 10 carbon atoms may be a linear or branched group. Particularly preferably, $R^{115}$ is a methylene group, an ethylene group, a trimethylene group, or a propylene group. Specific examples of the group in which a part of the methylene group in the chain of the alkylene group having 1 to 10 carbon atoms is substituted with a sulfur atom include $-CH_2S-$, $-CH_2CH_2S-$, and $-CH_2CH_2CH_2S-$. Further, examples of the group in which a part of the hydrogen atoms of the alkyl group having 1 to 6 carbon atoms is substituted with a thiol group include a group such as $-CH_2SCH(SCH_2SH)-$.

Specific examples of the compound represented by the Formula (XIII) include 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio) ethane, 4,7-bismercaptomethyl-3,6,9-trithio-1,11-undecanedithiol, 5,7-dimercaptomethyl-1,11-dimercapto-3,6,9-trithiaundecane, and 4,8-dimercaptomethyl-1,11-dimercapto-3,6,9-trithiaundecane.

Among the preferred aromatic poly(thi)ol compounds, a compound represented by the following formula (XIV) is preferably used as the phenyl group-containing polythiol compound.

[CF 14]

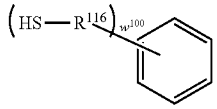

(XIV)

(In the formula, $R^{116}$ is an alkylene group having 1 to 6 carbon atoms or a group in which a part of the methylene group in the chain of the alkylene group having 1 to 6 carbon atoms is substituted with a sulfur atom; $w^{100}$ is 3.)

As for the $R^{116}$, the alkylene group having 1 to 6 carbon atoms may be a linear or branched group. Particularly preferably, $R^{116}$ is a methylene group, an ethylene group, a trimethylene group, or a propylene group. Further, specific examples of the group in which a part of the methylene group in the chain of the alkylene group having 1 to 6 carbon atoms is substituted with a sulfur atom include $-CH_2CH_2CH_2SCH_2-$, $-CH_2CH_2SCH_2-$, and $-CH_2SCH_2-$. Specific examples of the compound represented by the above formula (XIV) include 1,3,5-tris(mercaptopropylthiomethyl)benzene.

Among the preferred poly(thi)ol compounds other than those described above, a compound represented by the following formula (XV) is preferably used as the poly(thi)ol compound having a triazine ring.

[CF 15]

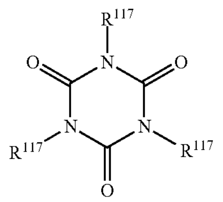

(XV)

(In the formula, each $R^{117}$ is an alkyl group having 1 to 6 carbon atoms, or a group represented by the following formula (XVI).

[CF 16]

(XVI)

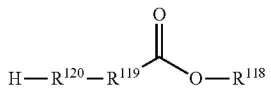

(In the formula, $R^{118}$ and $R^{119}$ are alkylene groups each having 1 to 6 carbon atoms, and $R^{120}$ is an oxygen atom or a sulfur atom.)

At least two of the $R^{117}$ are the groups represented by the formula (XVI), and they may be the same or different groups.)

As for the $R^{118}$ and the $R^{119}$, the alkylene group having 1 to 6 carbon atoms may be a linear or branched group. Particularly preferably, $R^{118}$ and $R^{119}$ are methylene groups, ethylene groups, trimethylen groups, or propylene groups. Specific examples of the compound represented by the formula (XV) include 2-mercaptomethanol and tris-{(3-mercaptopropionyloxy)-ethyl}-isocyanurate.

Among the preferred poly(thi)ol compounds other than those described above, a compound having a silsesquioxane structure can be used. The compound having a silsesquioxane structure is a compound to have various molecular structures such as a cage-like structure, a ladder-like structure or a random structure, and it is a compound represented by the following formula (XVII).

[CF 17]

$$\left(R^{500}-SiO_{3/2}\right)_{n^{100}} \qquad \text{(XVII)}$$

(In the formula, a plurality of $R^{500}$ may be the same or different from each other. They are selected from a hydrogen atom, an alkyl group, a cycloalkyl group, an alkoxy group, a phenyl group, and an organic group containing two or more hydroxyl groups and/or thiol groups in at least one molecule; $n^{100}$ is an integer from 3 to 100.)

(Suitable Component (B1))

The components (B1) can be used without any particular limitations, and a plurality of components can be used in combination in consideration of the photochromic properties and mechanical properties of the obtained photochromic cured product. In order to produce a resin composition having excellent properties and to make a photochromic curable composition having excellent moldability and favorable handleability, a component (B1) having 3 to 6 active hydrogen-containing groups in one molecule is used preferably. Hereinafter, a polyfunctional active hydrogen-containing component having 3 to 6 active hydrogen-containing groups in one molecule of the component (B1) may be simply referred to as a component (B1a).

Among these components (B1a), a component having 4 to 6 active hydrogen-containing groups in one molecule is preferred from the viewpoint of producing a resin composition that satisfies the intensity ratio ($PMI_{pst}/PMI_{cp}$) in the range of 8.0 to 40.0 and that has excellent photochromic properties and heat resistance. And a component having six active hydrogen-containing groups in one molecule is most preferred. The active hydrogen-containing group is preferably a thiol group in consideration of an increase in viscosity at the time of blending the photochromic curable composition.

The component (B1) may consist solely of the component (B1a). Alternatively, it may include a component having more than 6 active hydrogen-containing groups in one molecule, if necessary. Hereinafter, this component will be also simply referred to as component (B1b).

First, the component (B1a) will be described.

<Component (B1a)>

Examples of the component (B1a) as a preferred component of the component (B1) include trimethylolpropane tris(3-mercaptopropionate), pentaerythritol tetrakis(3-mercaptopropionate), dipentaerythritol hexakis(3-mercaptopropionate), 4-mercaptomethyl-1,8-dimercapto-3,6-dithiaoctane, and tris-((3-mercaptopropionyloxy)-ethyl)-isocyanurate. It is more preferred that among them, at least one of trimethylolpropane tris(3-mercaptopropionate), pentaerythritol tetrakis(3-melcaptopropionate) and dipentaerythritol hexakis(3-mercaptopropionate) is used.

Among them, particularly, dipentaerythritol hexakis(3-mercaptopropionate) is most preferred because it can improve the photochromic properties and mechanical properties of the obtained photochromic cured product (resin composition). From the viewpoint of photochromic properties, it is preferable to use dipentaerythritol hexakis(3-mercaptopropionate) alone as the component (B1a). However, since the dipentaerythritol hexakis(3-mercaptopropionate) has a high viscosity, other component (s) (B1) may be mixed in use for viscosity adjustment in a case of obtaining a photochromic cured product by casting polymerization.

Examples of other component (B1a) include trimethylolpropane tris(3-mercaptopropionate), pentaerythritol tetrakis (3-mercaptopropionate), 1,6-hexanediol bis(3-mercaptopropionate), 1,2-bis[(2-mercaptoethyl)thio]-3-mercaptopropane, 2,2-bis(mercaptomethyl)-1,4-butanedithiol, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, and tris-((3-mercaptopropionyloxy)-ethyl)-isocyanurate. Particularly preferably, trimethylolpropane tris(3-mercaptopropionate) is used in combination, because the handleability can be improved while its excellent photochromic properties are maintained.

Any component (B1) other than the component (B1a) may be contained so that the intensity ratio ($PMI_{pst}/PMI_{cp}$) of the component (i) satisfies the range of 8.0 to 40.0 and that the resin composition exhibits particularly excellent effects. More specifically, it is preferable to use a component having a larger number of active hydrogen-containing groups contained in the molecule than the component (B1a). It is particularly preferred to contain a polyrotaxane component that has a polyrotaxane structure and seven or more active hydrogen-containing groups in a molecule (hereinafter, this may be simply referred to as component (B1b)).

<Component (B1b): Polyrotaxane Component Having More than Six Active Hydrogen-Containing Groups in a Molecule>

Further preferably, the photochromic curable composition comprises a polyrotaxane component (component (B1b)) having more than six active hydrogen-containing groups in a molecule. By use of the component (B1b), it is possible to enhance the photochromic properties of the obtained resin composition due to the mobility of the polyrotaxane itself. In addition, incorporation of oxypropylene chains or the like into the polyrotaxane component may facilitate setting of the intensity ratio ($PMI_{pst}/PMI_{cp}$) of the component (i) within the range of 8.0 to 40.0. In other words, since the polyrotaxane component has extremely high mobility, the intensity ratio ($PMI_{pst}/PMI_{cp}$) can be easily increased by incorporating the oxypropylene chain into the polyrotaxane component. As a result, the obtained resin composition can exhibit excellent photochromic properties.

The component (B1b) is a known compound, and it has a complex molecular structure formed of a chain-like axial molecule and a cyclic molecule. In other words, a plurality of cyclic molecules include a chain-like axial molecule with a clathrate structure, and the axial molecule penetrates the interior of the rings of the cyclic molecules. Therefore, the cyclic molecules can slide freely on the axial molecule, but bulky terminal groups are formed at both ends of the axial molecule, whereby the cyclic molecules are prevented from falling off from the axial molecule.

Figure 3:
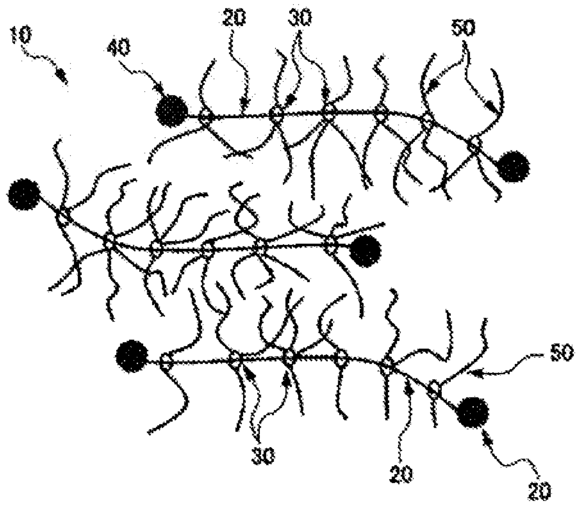
FIG. 3 is a schematic view of a polyrotaxane component (B1b) used in Example.

As shown in FIG. 3, the polyrotaxane component (B1b) has a complex molecular structure formed of chain-like axial molecules 20 and cyclic molecules 30. More specifically, it has a clathrate structure where a plurality of cyclic molecules 30 include the chain-like axial molecule 20, and the axial molecule 20 penetrates the interior of the rings of the cyclic molecules 30. Although the cyclic molecules 30 can freely slide on the axial molecule 20, bulky terminal groups 40 are formed at both ends of the axial molecule 20, whereby the cyclic molecules 30 are prevented from falling off from the axial molecule 20. As described above, the cyclic molecules 30 of the polyrotaxane 10 are slidable on the axial molecule 20, and this is considered to serve to improve the photochromic properties. In addition, it is considered that incorporation of oxypropylene chains into such polyrotaxane allows easy adjustment of the intensity ratio ($PMI_{pst}/PMI_{cp}$) of the obtained resin composition to be in the range of 8.0 to 40.0, and thus, the photochromic properties can be improved. In FIG. 3 showing the polyrotaxane 10, side chains 50 are also illustrated. The side chains 50 may be introduced as required into the rings of the cyclic molecules 30.

Note that the component (B1b) is a known compound and it can be synthesized by the method described in WO2015/068798 and the like.

The axial molecule is not particularly limited as long as it can penetrate the rings of the cyclic molecules. It may be linear or branched. This axial molecule is usually formed of a polymer. Examples of suitable polymers for forming the axial molecule are described in WO2015/068798. Among them, polyethylene glycol is preferably used. By using the polyethylene glycol as the axial molecule, oxyethylene chains will be introduced into the obtained resin composition. As a result, the intensity ratio ($EI_{pst}/EI_{cp}$) can be easily adjusted to be 5.0 or more and 20.0 or less.

As for the bulky terminal groups to be formed at both ends of the axial molecule, there is no particular limitation as long as the groups are to prevent the cyclic molecules from falling off from the axial molecule. As a specific example, an adamantyl group is preferred.

Though the mass average molecular weight (Mw) of the axial molecule is not particularly limited, preferably it is in the range of 1000 to 100000, more preferably in the range of 5000 to 80000, and still more preferably in the range of 10000 to 50000. When the mass average molecular weight (Mw) of the axial molecules is 1000 or more, the mobility of the cyclic molecule tends to be improved. Further, when the mass average molecular weight (Mw) of the axial molecule is 100000 or less, compatibility with other components tends to be improved. In addition, when polyethylene glycol is used for the axial molecule, the intensity ratio ($EI_{pst}/EI_{cp}$) of the obtained resin composition can be easily adjusted to be 5.0 or more and 20.0 or less. As a result, the photochromic properties can be improved.

The cyclic molecule has a ring of a size capable of including the axial molecule with a clathrate structure. An example of the ring is a cyclodextrin ring. The cyclodextrin ring may be an α-form (ring inner diameter: 0.45 to 0.6 nm), a β-form (ring inner diameter: 0.6 to 0.8 nm), and a γ-form (ring inner diameter: 0.8 to 0.95 nm). Among them, the α-cyclodextrin ring is preferred.

At least one cyclic molecule includes one axial molecule with a clathrate structure. The number of the clathrate cyclic molecules is usually in the range of 0.001 to 0.6, preferably in the range of 0.002 to 0.5, and more preferably in the range of 0.003 to 0.4 when the maximal number of the clathrate cyclic molecules that can include one axial molecule with a clathrate structure is set to 1.0.

The maximal number of the clathrate cyclic molecules per axial molecule can be calculated from the length of the axial molecule and the thickness of the rings of the cyclic molecules. For instance, in a case where a chain-like moiety of an axial molecule is formed of polyethylene glycol and a ring of a cyclic molecule is an α-cyclodextrin ring, the maximal clathrate number is calculated as follows. Specifically, two of the repeating units [$-CH_2-CHO-$] of the polyethylene glycol are approximated to the thickness of one α-cyclodextrin ring. Therefore, the number of repeating units is calculated from the molecular weight of this polyethylene glycol, and ½ of the number of repeating units is determined as the maximal clathrate number of the cyclic molecules. This maximal clathrate number is set to 1.0, and the clathrate number of the cyclic molecules is adjusted to the range described above.

A side chain may be introduced into the cyclic molecule. When a side chain is introduced in this manner, a pseudo-crosslinked structure can be formed in the obtained resin composition (component (i)). Thus, the mechanical properties of the resin composition can be improved and the photochromic properties can be improved.

The side chain is preferably formed of a repeating unit of an organic group having 3 to 20 carbon atoms. The mass average molecular weight (Mw) of the side chain is not particularly limited, but it is preferably in the range of 200 to 10000, more preferably in the range of 250 to 8000, still more preferably in the range of 300 to 5000, and particularly preferably in the range of 300 to 1500.

The side chain may be introduced by utilizing a functional group (e.g., a hydroxyl group) of the ring of the cyclic molecule and modifying this functional group. For instance, an α-cyclodextrin ring has 18 hydroxyl groups as functional groups, and the side chain may be introduced via the hydroxyl groups. That is, at most 18 side chains can be introduced per α-cyclodextrin ring. In order to sufficiently exhibit the function of the side chain as described above, it is preferable that 6% or more, particularly 30% or more, of the total number of functional groups of the ring is modified with the side chain. When a side chain is bonded to 9 of the 18 hydroxyl groups of the α-cyclodextrin ring, the degree of modification is 50%.

The side chain may be linear or branched. A side chain of an appropriate size can be introduced by reacting an appropriate compound with a ring of the cyclic molecule by using polymerization such as ring-opening polymerization; radical polymerization; cationic polymerization; anionic polymerization; and living radical polymerization such as atom transfer radical polymerization, RAFT polymerization, or NMP polymerization. As the cyclic compound, cyclic lactone and cyclic carbonate are preferred, and a ε-caprolactone is further preferred.

In a case of reacting the cyclic compound by ring-opening polymerization so as to introduce the side chain, since a functional group (e.g., a hydroxyl group) bonded to the ring has poor reactivity, it may be difficult to directly react large molecules due to steric hindrance or the like. In a technique applicable for such a case, for instance, first a low molecular weight compound such as propylene oxide is reacted with the functional group to perform hydroxypropylation, and a functional group (hydroxyl group) having rich reactivity is introduced, and then, the side chain is introduced by ring-opening polymerization using the above-described cyclic compound. This low molecular weight compound such as propylene oxide can also be regarded as a side chain. The propylene oxide incorporated into this side chain can be regarded as an oxypropylene chain. Therefore, in particular, in a case where a hydroxyl group having rich reactivity is introduced using the propylene oxide, the intensity ratio ($PMI_{pst}/PMI_{cp}$) can be easily adjusted to be in the range of 8.0 to 40.0.

It is preferable that a polymerizable functional group selected from hydroxyl groups or thiol groups is introduced into the terminal of the side chain. In particular, it is most preferable that a polymerizable functional group selected from hydroxyl groups is introduced. Needless to note, in a case where an alkyl group is introduced into the terminal of the side chain, the intensity ratio ($AMI_{pst}/AMI_{cp}$) includes the peak of this alkyl group, similarly to the oxypropylene chain and the oxyethylene chain.

The component (B1b) most preferably used will satisfy the following requirements. Specifically, a polyethylene glycol, which is bonded to both ends with adamantyl groups, is used as an axial molecule. The cyclic molecules each has an α-cyclodextrin ring. Further, a hydroxyl group activated by propylene oxide is introduced into the cyclic molecule, and a side chain having a hydroxyl group at the terminal is introduced into the cyclic molecule by the hydroxyl group and polycaprolactone.

It is preferable that the oxyethylene chain is the axial molecule, the molecular weight of the axial molecule is 8,000 to 30,000, the introduction ratio of the α-cyclodextrin ring is in the range of 0.003 to 0.4, and the rate (degree of modification; a side chain introduction rate) of modified α-cyclodextrin ring is 30% or more and 70% or less. It is preferable that the base of the side chain is an oxypropylene unit. It is preferable that a side chain comprising an oxypropylene unit and having a molecular weight of 400 to 1500 in average is introduced into the α-cyclodextrin ring. The component (B1b) has a weight average molecular weight of 0.1 million to 0.2 million. Although it is an average value thereof, preferably a component containing 150 to 350 hydroxyl groups per molecule is used.

<Disposition of Suitable Active Hydrogen-Containing Group in Component (B1)>

As the component (B1), preferably the aforementioned polyfunctional active hydrogen-containing components may be used. It is particularly preferable to use a polyfunctional active hydrogen-containing component having the following structure. That is, it is preferable that the component (B1) has a compound having a quaternary carbon atom in a molecule, and all groups bonded to the quaternary carbon atom have active hydrogen-containing groups. It is considered that use of a compound in which all groups bonded to a quaternary carbon atom have active hydrogen-containing groups may contribute to efficient formation of a free space in the resin obtained upon polymerization. The free space may allow molecular movement of the photochromic compound.

Figure 4:
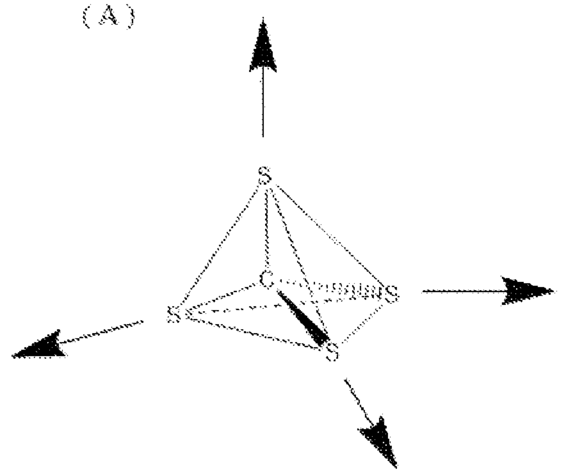
FIG. 4 is a schematic diagram showing an example of polyfunctional active hydrogen-containing component in which all groups to be bonded to a quaternary carbon atom have active hydrogen-containing groups.
Figure 5:
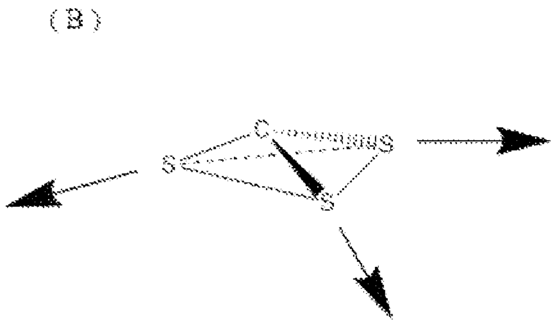
FIG. 5 is a schematic diagram showing an example of polyfunctional active hydrogen-containing component in which a part of groups to be bonded to a quaternary carbon atom have active hydrogen-containing groups.

Although the reason for this is not clear, it is considered as follows. This will be described with reference to the attached drawings. FIG. 4 shows an example of compound in which all groups to be bonded to a quaternary carbon atom have active hydrogen-containing groups (hereinafter, this may be simply referred to also as "completely substituted compound"). In FIG. 4, (A) indicates an example of "completely substituted compound" in which all of four groups to be bonded to a quaternary carbon atom have active hydrogen-containing groups. Meanwhile, FIG. 5 shows an example of compound in which a part of the groups to be bonded to a quaternary carbon atom have active hydrogen-containing groups (hereinafter, this may be simply referred to as "partially substituted compound"). In FIG. 5, (B) indicates an example of "partially substituted compound" in which three groups to be bonded to a quaternary carbon atom have active hydrogen-containing groups. In FIGS. 4 and 5, S indicates simply an active hydrogen-containing group. The arrows indicate the directions in which the polymers grow.

As shown in FIG. 4, in a case where the completely substituted compound is used, groups each having an active hydrogen-containing group are arranged so as to form a tetrahedron around the quaternary carbon atom. The polymers are regarded as growing three-dimensionally upon polymerization. As a result, the free space is effectively formed in a matrix composed of three-dimensionally grown polymers, and this may facilitate the molecular movement of the photochromic compound. FIG. 4 shows an example where all the groups to be bonded to one quaternary carbon atom have active hydrogen-containing groups, and this holds true for a case where the groups have four or more active hydrogen-containing groups. For instance, dipentaerythritol hexakis(3-mercaptopropionate) is a compound having two quaternary carbon atoms. For a group to be bonded to the quaternary carbon atom, it can be regarded that three groups have one thiol group and one group has three thiol groups. Therefore, dipentaerythritol hexakis(3-mercaptopropionate) can be regarded as a completely substituted compound. There is substantially no limitation on the completely substituted compound as long as the molecule contains at least one quaternary carbon atom to be bonded to four groups all of which have active hydrogen-containing groups. When further considering handleability and facility in production thereof, it is preferable that the number of active hydrogen-containing groups in a completely substituted compound is 4 to 6.

As shown in FIG. 5, in a case where a partially substituted compound is used, groups having active hydrogen-containing groups are not arranged to form a tetrahedron. It is presumed therefore, unlike the case of using the completely substituted compound, that the polymers do not grow three-dimensionally upon polymerization and a space to allow molecular movement of the photochromic compound is reduced.

For the above-described reasons, it is preferred to use the component (B1), in particular, a component corresponding to the completely substituted compound.

<Component (B2): First Active Hydrogen-Containing Component Having One or Two Active Hydrogen-Containing Groups in One Molecule>

It is preferable that the photochromic curable composition comprises, in addition to the component (B1), a first active hydrogen-containing component as the component (B2)

having one or two active hydrogen-containing groups in a molecule. For the first active hydrogen-containing component, a single kind of compound or a plural kinds of compounds may be used.

Specific examples of the component (B2) include a monoalkyl ether compound having an oxypropylene chain (a first active hydrogen-containing component having one active hydrogen-containing group in one molecule) or a glycol compound having an oxypropylene chain (a first active hydrogen-containing component having two active hydrogen-containing groups in one molecule). A further specific example is either a polyoxyethylene polyoxypropylene monoalkyl ether compound or a polyoxyethylene polyoxypropylene glycol compound.

Although there is no particular limitation on the component (B2), it is preferable for satisfying the ranges of the peak intensity ratio ($PMI_{pst}/PMI_{cp}$, $AMI_{pst}/AMI_{cp}$, $EI_{pst}/EI_{cp}$) of the NMR that the number average molecular weight is 500 or more, with result that the photochromic properties of the obtained resin composition can be improved. In order to achieve both excellent photochromic properties and mechanical properties, the number average molecular weight of the component (B2) is preferably 600 or more, and further preferably 700 or more. It is preferable that the upper limit of the molecular weight is 3000 for the purpose of satisfying the range of the intensity ratio ($PMI_{pst}/PMI_{cp}$) and further in view of the optical properties (prevention/reduction of white turbidity) of the obtained resin composition.

In a case where the component (B2) has an oxypropylene chain, the average value '1' of the repeating unit (—$CH_2CH(CH_3)O$—) of oxypropylene is preferably 2 or more and 25 or less. Further, it is preferable that the component (B2) contains an oxyethylene chain, and the average value 'm' of the repeating unit (—$CH_2CH_2O$—) of oxyethylene is 5 or more and 25 or less. In addition, the component (B2) may contain an alkyl group, and the alkyl group preferably has 5 to 20 carbon atoms.

With use of the photochromic curable composition containing the component (B2), the obtained photochromic cured product (resin composition) exhibits excellent photochromic properties. And it also can exhibit the following characteristics. For instance, in a case where the photochromic curable composition containing the component (B2) is cured in a mold made of inorganic glass, releasability of the obtained photochromic cured product from the inorganic glass mold may be improved. This effect of improving the releasability is remarkably exhibited when a compound having one active hydrogen-containing group in one molecule is used.

It is also possible to improve adhesion to any other optical substrate by adjusting the compounding ratio of the component (A) at the time of using the photochromic curable composition containing the component (B2). Examples of the other optical substrates include known plastic substrates and inorganic glass substrates. In particular, when the compounding ratio of the component (A) is relatively large, adhesion to the inorganic glass substrate can be improved.

Following is the further detailed description regarding the component (B2), i.e., either a compound having one active hydrogen-containing group in one molecule (hereinafter, it may be simply referred to as component (B21)) or a compound having two active hydrogen-containing groups in one molecule (hereinafter, it may be simply referred to as component (B22)).

<Component (B21)>

The component (B21) is not particularly limited, but preferably a compound represented by the following formula (XVIII) is used.

[CF 18]

(XVIII)

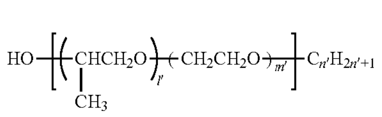

In the formula, l', m', and n' are integers from 1 to 30, respectively.

The l' in the formula (XVIII) refers to a repeating unit of oxypropylene. The l' is an average value and an integer from 1 to 30. Particularly preferably, l' is 2 to 25, and further preferably 2 to 5, so that a resin composition satisfying the intensity ratio ($PMI_{pst}/PMI_{cp}$) of 8.0 to 40.0, more preferably 10.0 to 15, is produced easily, and excellent properties are imparted.

The m' in the formula (XVIII) refers to a repeating unit of oxyethylene. The m' is an average value and an integer from 1 to 30. Particularly preferably, m' is 5 to 25, and further preferably 7 to 12, so that a resin composition satisfying the intensity ratio ($EI_{pst}n/EI_{cp}$) of 5.0 to 20.0 is produced easily, and excellent properties are imparted.

The n' in the formula (XVIII) refers to the carbon number of the alkyl group present at the terminal. This n' is an integer from 1 to 30. Particularly preferably, n' is 5 to 20, and further preferably 10 to 18, so that a resin composition satisfying the intensity ratio ($AMI_{pst}/AMI_{cp}$) of 7.0 to 23.0 is produced easily, and excellent properties are imparted.

Suitable specific examples of the component (B21) represented by the formula (XVIII) include polyoxyethylene polyoxypropylene monolauryl ether (oxyethylene repeating unit m=10, oxypropylene repeating unit l=2; alkyl group at the terminal has 12 carbon atoms, and number average molecular weight is 750), polyoxyethylene polyoxypropylene monotridecyl ether (oxyethylene repeating unit m=11, oxypropylene repeating unit l=2; alkyl group at the terminal has 13 carbon atoms, and number average molecular weight is 800), and polyoxyethylene polyoxypropylene monostearyl ether (oxyethylene repeating unit m=9, oxypropylene repeating unit l=6; alkyl group at the terminal has 18 carbon atoms, and number average molecular weight is 1000).

As for the component (B21) represented by the formula (XVIII), the polyoxyethylene polyoxypropylene moiety is indicated as a block copolymer in the chemical formula. Alternatively, the moiety may be a random type copolymer. Needless to note, the moiety may be a block type copolymer, but it is preferably a random copolymer so that a resin composition satisfying the intensity ratio ($PMI_{pst}/PMI_{cp}$) of 8.0 or more and 40.0 or less and preferably 10.0 or more and 15 or less is produced easily, and excellent properties are imparted. In other words, in the polyoxyethylene polyoxypropylene monolauryl ether, polyoxyethylene polyoxypropylene monotridecyl ether, and polyoxyethylene polyoxypropylene monostearyl ether, it is preferable that the polyoxyethylene polyoxypropylene moiety is a random copolymer.

The polymerization moldability of the photochromic curable composition can be further improved by using the component (B21). Namely, since the component (B21) is monofunctional, it can prevent or retard a rapid increase in viscosity of the photochromic curable composition. In general, the component (A) and the component (B) for the photochromic curable composition are stored separately. Upon production of the resin composition, the component (A), the component (B), the essential component and, if necessary, the optional component to be compounded are mixed to prepare first a photochromic curable composition. If the viscosity increases rapidly during the mixing process, it may be difficult to obtain a uniform resin composition. Therefore, it is preferable that the viscosity of the photochromic curable composition does not change until the conditions for initiating the polymerization (e.g., temperature) are reached. This temperature increase can be prevented or retarded by using the component (B21). For the reasons, although both the component (B21) and the component (B22) can be used at the same time as the component (B2), preferably the component (B21) is used alone.

<Component (B22)>

Though there is no particular limitation on the component (B22), preferably a compound represented by the following formula (XIX) is used.

[CF 19]

(XIX)

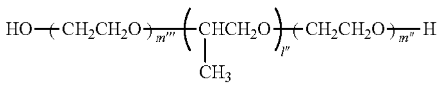

In the formula, l" and m'"+m" are integers from 1 to 30.

The l" in the formula (XIX) refers to a repeating unit of oxypropylene. This l" is an average value and an integer from 1 to 30. Particularly preferably, l" is 2 to 25, and further preferably 12 to 20, so that a resin composition satisfying the intensity ratio ($PMI_{pst}/PMI_{cp}$) of 8.0 to 40.0, suitably 20.0 to 35.0, is produced easily, and excellent properties are imparted.

The m" and m'" in the formula (XIX) refers to repeating units of oxyethylene. The m" and m'" are average values, and m"+m'" is an integer from 1 to 30. The m"+m'" is preferably 5 to 25, and further preferably 10 to 20, so that a resin composition satisfying the intensity ratio ($EI_{pst}/EI_{cp}$) of 5.0 to 20.0 is produced easily, and excellent properties are imparted.

For satisfying the range of the intensity ratio ($PMI_{pst}/PMI_{cp}$, $EI_{pst}/EI_{cp}$) and further considering the photochromic properties of the obtained resin composition, an example of the component (B22) represented by the formula (XIX) is block copolymer type polyoxyethylene polyoxypropylene glycol represented by the formula (XIX).

Specific examples thereof include polyoxyethylene polyoxypropylene glycol having a number average molecular weight of 1600 (l"=16, m"+m'"=14), polyoxyethylene polyoxypropylene glycol having a number average molecular weight of 1900 (l"=16, m"+m'"=22), and polyoxyethylene polyoxypropylene glycol having a number average molecular weight of 2000 (l"=21, m"+m'"=18).

(Photochromic Curable Compositions: Suitable Compounding Ratio of Component (A), Component (B1), and Component (B2))

As for the photochromic curable composition, the compounding ratio of the component (A) to the components (B) (the component (B1) and the component (B2)) is preferably within the following range. Specifically, when the total mole number of iso(thia)cyanate groups in the component (A) is nA and the total mole number of active hydrogen-containing groups in the component (B1) and the component (B2) is nB, preferably nA/nB=1.00 or more and 1.50 or less, more preferably 1.00 or more and 1.20 or less, still more preferably 1.02 or more and 1.15 or less, and most preferably 1.04 or more and 1.10 or less. When nA/nB satisfies a range of 1.00 or more and 1.50 or less, it is possible to obtain a photochromic cured product that satisfies suitable ranges of the $PMI_{pst}/PMI_{cp}$, $AMI_{pst}/AMI_{cp}$, and $EI_{pst}/EI_{cp}$, and that exhibits excellent photochromic properties, durability, and heat resistance.

In a case of curing the photochromic curable composition in a mold of inorganic glass, it is particularly preferable that the nA/nB is set to 1.00 or more and 1.09 or less in order to enhance the releasability of the obtained photochromic cured product from the mold. However, even when nA/nB exceeds 1.09, the releaseability can be improved by compounding the photochromic curable composition with a release agent described in detail below.

In order to enhance the adhesion (adhesiveness) with an optical substrate made of inorganic glass, the nA/nB is further preferably 1.10 or more and 1.50 or less, and particularly preferably 1.10 or more and 1.40 or less.

In production of a laminate by using a photochromic curable composition, in a case where the optical substrate on which the composition is to be laminated is plastic, sufficient adhesiveness can be imparted if nA/nB is 1.00 or more and 1.50 or less. In order to obtain a laminate excellent in adhesiveness, photochromic properties and mechanical properties, nA/nB is preferably set to 1.05 or more and 1.20 or less.

The photochromic curable composition may be used for a case where a polarizing film based on polyvinyl alcohol is joined with another substrate (e.g., an optical substrate made of a plastic other than the polyvinyl alcohol or of inorganic glass). In this case, the nA/nB preferably may be within the following range. Specifically, in a case where a polyvinyl alcohol-based polarizing film is included as the lamination object, nA/nB is preferably 1.10 or more and 1.50 or less, and more preferably 1.20 or more and 1.40 or less.

Furthermore, it is required to provide a photochromic cured product imparted with excellent photochromic properties, durability, and heat resistance. For this purpose, it is preferable that nB1/nB2=10.0 to 30.0, more preferably 12.0 to 25.0, and most preferably 12.0 to 22.0, when nB1 and nB2 are the total mole numbers of the active hydrogen-containing groups in the component (B1) and the component (B2), respectively. In a case where the component (B1) contains the component (B1b), a value calculated from the hydroxyl value may be employed for instance as the active hydrogen-containing group mole number of the component (B1b).

It is preferable that the mole number of each of the photochromic curable compositions is within the above-described range. Preferably, the following ranges in terms of mass ratio are satisfied.

Although there are no particular limitations on the compounding ratio of the component (A), the component (B1) and the component (B2), preferably the following ranges are satisfied in order to obtain a photochromic cured product having excellent photochromic properties, durability and heat resistance. It is preferable that the component (A) is 20 to 74 parts by mass, the component (B1) is 20 to 75 parts by mass, and the component (B2) is 5 to 40 parts by mass relative to 100 parts by mass of the total of the component (A), the component (B1), and the component (B2). It is further preferable that the following compounding amounts are satisfied, namely, the component (A) is 25 to 71 parts by mass, the component (B1) is 23 to 67 parts by mass, and the component (B2) is 6 to 30 parts by mass relative to 100 parts by mass of the total of the component (A), the component (B1), and the component (B2). It is further preferable that the component (A) is 25 to 69 parts by mass, the component (B1) is 23 to 67 parts by mass, and the component (B2) is 6 to 30 parts by mass. It is still further preferable that the component (A) is 30 to 63 parts by mass, the component (B1) is 30 to 60 parts by mass, and the component (B2) is 7 to 20 parts by mass. And it is most preferable that the component (A) is 30 to 57 parts by mass, the component (B1) is 35 to 60 parts by mass, and the component (B2) is 8 to 20 parts by mass.

In order to exhibit particularly excellent efficacy, it is more preferable that the component (B21) is used as the component (B2), and the mass ratio of the component (B21) to the component (B1) ((B21)/(B1)) is 0.35 or more and 0.65 or less, and still more preferably 0.40 or more and 0.55 or less.

<Other Additives: Polymerization Curing Accelerator (C)>

The photochromic curable composition may further include any polymerization curing accelerator (C) (hereinafter, it may be also referred to as component (C)) in order to promptly accelerate the polymerization curing thereof in accordance with the type of the components described above.

For the polymerization curing accelerator, a reaction catalyst or a condensing agent for urethane or urea may be used. These catalyst and condensing agent are usually used for reaction of a hydroxyl group and a thiol group with an isocyanate group and an isothiocyanate group.

This reaction catalyst for urethane or urea is used for forming a poly(thio)urethane bond through a reaction of polyiso(thio)cyanate with polyol or polythiol. Examples of these reaction catalysts for urethane or urea include: tertiary amines and inorganic/organic salts corresponding thereto, phosphines, quaternary ammonium salts, quaternary phosphonium salts, Lewis acids, or organic sulfonic acids. Specific examples thereof are described below. The catalytic activity may be excessively high depending on the type of the compound selected from the aforementioned examples. In such a case, it is possible to prevent or reduce the catalytic activity by using a mixture of a tertiary amine and a Lewis acid.

Tertiary amines: triethylamine, tri-n-propylamine, triisopropylamine, tri-n-butylamine, triisobutylamine, triethylamine, hexamethylenetetramine, N,N-dimethyloctylamine, N,N,N',N'-tetramethyl-1,6-diaminohexane, 4,4'-trimethylenebis(1-methylpiperidine), and 1,8-diazabicyclo-(5,4,0)-7-undecene Phosphines: trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane, and 1,2-bis(dimethylphosphino)ethane Quaternary ammonium salts: tetramethyl ammonium bromide, tetrabutyl ammonium chloride, and tetrabutyl ammonium bromide Quaternary phosphonium salts: tetramethyl phosphonium bromide, tetrabutyl phosphonium chloride, and tetrabutyl phosphonium bromide Lewis acids: triphenyl aluminum, dimethyltin dichloride, dimethyltin bis(isooctylthioglycolate), dibutyltin dichloride, dibutyltin dilaurate, dibutyltin maleate, dibutyltin maleate polymer, dibutyltin diricinolate, dibutyltin bis(dodecyl mercaptide), dibutyltin bis(isooctylthioglycolate), dioctyltin dichloride, dioctyltin maleate, dioctyltin maleate polymer, dioctyltin bis(butyl maleate), dioctyltin dilaurate, dioctyltin diricinolate, dioctyltin dioleate, dioctyltin di(6-hydroxy) caproate, dioctyltin bis(isooctylthioglycolate), and didodecyltin diricinolate Organic sulfonic acids: methanesulfonic acid, benzenesulfonic acid, and p-toluenesulfonic acid (Polymerization Initiator as Condensing Agent)

Specific examples of condensing agent are described below.

Inorganic acids: hydrogen chloride, hydrogen bromide, sulfuric acid, phosphoric acid, and the like Organic acids: p-toluenesulfonic acid, camphor-sulfonic acid, and the like Acidic ion exchange resins: Amberlite, Amberlyst, and the like Carbodiimides: dicyclohexylcarbodiimide, and 1-ethyl-3-(3-dimethylaminopyrrolyl)-carbodiimide Each of the components (C) described above may be used alone or in combination of two or more. The use amount may be a so-called catalyst amount, i.e., a small amount in the range of 0.001 to 10 parts by mass, particularly 0.01 to 5 parts by mass for instance, relative to 100 parts by mass of the total of the components (A) and (B).

<Other Additives>

In the photochromic curable composition, various additives known per se can be compounded as required within a range not to impair the effect. The examples include: additives such as an ultraviolet absorber, an antistatic agent, an infrared absorber, an ultraviolet stabilizer, an antioxidant, a coloring inhibitor, an antistatic agent, a fluorescent dye, a dye, a pigment, and a perfume; a solvent; a leveling agent; an internal release agent; and a polymerization modifier such as thiols like t-dodecyl mercaptan.

Among them, an ultraviolet stabilizer may be used particularly preferably in consideration of improving the durability of the photochromic compound. As the ultraviolet stabilizer, a hindered amine light stabilizer, a hindered phenol antioxidant, a sulfur-based antioxidant and the like are known. Examples of particularly suitable ultraviolet stabilizer include bis(1,2,6,6-pentamethyl-4-piperidyl) sebacate, 2,6-di-t-butyl-4-methyl-phenol, and ethylenebis(oxyethylene)bis[3-(5-t-butyl-4-hydroxy-m-tolyl) propionate]. Examples of commercially available product include: ADK STAB LA-52, LA-57, LA-62, LA-63, LA-67, LA-77, LA-82, and LA-87 manufactured by ADEKA CORPORATION; and IRGANOX 1010, 1035, 1075, 1098, 1135, 1141, 1222, 1330, 1425, 1520, 259, 3114, 3790, 5057, and 565 manufactured by Ciba Specialty Chemicals.

In consideration of improvement in durability and photochromic properties of the photochromic compound, an ultraviolet absorber may be used suitably. Examples of the ultraviolet absorber include a benzotriazole-based ultraviolet absorber, a triazine-based ultraviolet absorber, a benzophenone-based ultraviolet absorber, a cyanoacrylate-based ultraviolet absorber, a diphenylacrylate-based ultraviolet absorber, a phenol-based ultraviolet absorber, an oxanilide-based ultraviolet absorber, a malonic acid ester-based ultraviolet absorber, and a cinnamic acid ester-based ultraviolet absorber.

Among them, a cyanoacrylate-based ultraviolet absorber, a diphenylacrylate-based ultraviolet absorber, a phenol-based ultraviolet absorber, an oxanilide-based ultraviolet absorber, a malonic acid ester-based ultraviolet absorber, or a cinnamic acid ester-based ultraviolet absorber may be suitably used. In particular, a cinnamic acid ester-based ultraviolet absorber may be preferably used from the viewpoint that durability can be improved without impairing photochromic properties (particularly, color optical density) as compared with a case where any ultraviolet absorber is not used.

In a case where the releasability of the resin composition is poor, an internal release agent can be used. Any internal release agent can be used as long as it can impart releasability and does not impair physical properties such as transparency of the resin, and surfactants may be used preferably. A phosphate ester-based surfactant is preferred particularly. Here, the internal release agents may include some of the aforementioned catalysts exhibiting mold release effect. It may include, for instance, quaternary ammonium salts and quaternary phosphonium salts. These internal release agents are appropriately selected from the viewpoint of the combination with monomers, the polymerization conditions, the economic efficiency and handleability. Specific examples of the internal release agent of phosphate ester are as follows.

Alkyl acid phosphates: mono-n-butyl phosphate, mono-2-ethylhexyl phosphate, mono-n-octyl phosphate, mono-n-butyl phosphate, bis(2-ethylhexyl)phosphate, di(2-ethylhexyl) phosphate, di-n-octyl phosphate, di-n-butyl phosphate, butyl acid phosphate (mono-, di-mixture), ethyl acid phosphate (mono-, di-mixture), butoxyethyl acid phosphate (mono-, di-mixture), 2-ethylhexyl acid phosphate (mono-, di-mixture), isotridene acid phosphate (mono-, di-mixture), tetracosyl acid phosphate (mono-, di-mixture), and stearyl acid phosphate (mono-, di-mixture)

Other phosphate esters: oleyl acid phosphate (mono-, di-mixture), dibutyl pyrophosphate, ethylene glycol acid phosphate (mono-, di-mixture), butoxyethyl acid phosphate (mono-, di-mixture), and the like Each of the other compounding agents may be used alone or in combination of two or more thereof. The use amount can be small, for instance, in a range of 0.001 parts by mass to 10 parts by mass relative to 100 parts by mass of the total of the component (A) and the component (B).

<Alkali Metal Ion, Alkaline Earth Metal Ion>

The total amount of the alkali metal ion and the alkaline earth metal ion in the photochromic curable composition is preferably 500 ppm or less. When the amount of the alkali metal ion and the alkaline earth metal ion in the photochromic curable composition is 500 ppm or less as described above, a cured product having excellent color development durability of the photochromic compound can be provided. In other words, the photochromic compound is capable of developing colors over a long period of time. The reason for this is considered as follows.

First, in the process of synthesizing the component such as the active hydrogen compound for the photochromic curable composition, an alkali metal salt or an alkaline earth metal salt may be used, or metal salts thereof may be generated. After the synthesis, these metal salts may remain in trace amounts as impurities in the active hydrogen compound or the like. A counter anion contained in the alkali metal salt or the like, particularly, a carboxylic acid ion, may act on an iso(thio)cyanate group of a polyiso(thio)cyanate compound to form a polyiso(thio)cyanurate compound in which an isocyanate group is bonded to become cyclic. That is, if an alkali metal salt or the like is contained in the photochromic curable composition, the iso(thio)cyanate component is excessively consumed, whereby a polyiso (thio) cyanurate compound or the like may be by-produced. The excessive consumption of the iso(thio)cyanate component may result in excessive amount of active hydrogen compound in the photochromic curable composition. In a cured product of photochromic composition in which excessive amount of active hydrogen compound is present, for instance, an active hydrogen group such as a thiol group becomes excessive. These excessive active hydrogen groups can generate radicals by ultraviolet rays, and thus, they can cause deterioration in the cured product.

As mentioned above, it is possible to prevent or retard degradation in the cured product by decreasing the amounts of the alkali metal salt and the alkaline earth metal salt in the photochromic curable composition. The amounts of alkali metal salt and alkaline earth metal salt in the photochromic curable composition can be estimated by the amounts of alkali metal ion and alkaline earth metal ion in the photochromic composition.

The total amount of alkali metal ions and alkaline earth metal ions in the photochromic curable composition can be measured by inductively coupled plasma (ICP) optical emission spectrometry. In the measurement, for instance, 10 g of photochromic curable composition is first dissolved in 20 g of chloroform to obtain 30 g of solution. To this solution, 20 g of ultrapure water containing 1% $HNO_3$ is added to extract the supernatant. The extracted supernatant is used as the measurement sample. For the measuring device, for instance, an ICP optical emission spectrometer (iCAP6500DUO) manufactured by Thermo Fisher Scientific Inc. is used. The measurable limit for the ICP optical emission spectrometry is 1 ppb, for instance. A calibration curve method is used for calculating the concentration of the alkali metal ions and the like.

The total content of alkali metal ions and alkaline earth metal ions in the photochromic curable composition is preferably 200 ppm or less, and more preferably 100 ppm or less. The lower limits of the alkali metal ion and the alkaline earth metal ion in the photochromic composition is 0 ppm or a measurable limit of the ICP optical emission spectrometer.

The contents of the alkali metal salt, the alkaline earth metal salt, the alkali metal ion, the alkaline earth metal ion, and the counter anion thereof of the photochromic curable composition can be reduced by certain treatments such as water-washing or contacting with various adsorbents, an ion exchange resin and the like. The amount of the alkali metal salt or the like can be further reduced by extending the time for water-washing the photochromic curable composition, increasing the amount of the adsorbent and the ion exchange resin, or extending the time to contact with them. Instead of the treatment for reducing the alkali metal ion in the photochromic curable composition, the photochromic curable composition may be prepared by using components as raw materials such as an active hydrogen compound that has been subjected to the aforementioned treatment for reducing the alkali metal ion.

<Method for Producing Photochromic Curable Composition>

The photochromic curable composition to be used here may be prepared by mixing the aforementioned photochromic compound (ii), the component (A), the component (B), and any other components to be compounded, in a known manner without any particular limitations. For instance, a photochromic curable composition can be obtained by dissolving the component (ii) in the component (A), then further adding the component (B) thereto and stirring the mixture. The stirring temperature is in the range of 0 to 100 °C, and the stirring time is in a range of 0.1 to 48 hours, which may be appropriately adjusted.

By using the component (B21), increase in viscosity at the time of producing this photochromic curable composition can also be prevented or retarded.

Since the component (A) has an iso(thio)cyanate group in the molecule, the component (A) is preferably produced under an inert gas atmosphere such as argon or nitrogen in order to prevent from containing moisture.

<Photochromic Optical Article>

A photochromic optical article can be obtained by polymerizing a photochromic curable composition into a photochromic cured product. It is usually polymerized by thermal polymerization. This cured product is a resin composition, and thus, it can be a photochromic optical article made of the resin composition.

In thermal polymerization of the photochromic curable composition, the temperature may particularly affect the shapes and properties of the photochromic cured product to be obtained. Although this temperature condition cannot be limited in general because the influences vary depending on the type and amount of the thermal polymerization initiator and also the type of the compound, a method of initiating polymerization at a relatively low temperature and slowly raising the temperature is usually suitable. Similar to the polymerization temperature, since the polymerization time varies depending on various factors, it is preferable to determine an optimal time corresponding to the conditions in advance. Usually, it is preferable to select a condition so that the polymerization is completed in 2 to 48 hours. In a case of obtaining a photochromic laminate sheet, it is preferable to conduct polymerization at a temperature for proceeding reaction between the polymerizable functional groups, and to determine optimal temperature and time for obtaining a target molecular weight.

There is no particular limitation on the process for polymerizing the photochromic curable composition so as to obtain the photochromic optical article. For instance, a known method described below can be employed in a case of producing a photochromic lens as a kind of optical article.

In a case of producing the photochromic lens by a kneading method, the aforementioned photochromic composition is injected between inorganic glass molds held by an elastomer gasket or a spacer, which is defoamed sufficiently, and then, cast-polymerized by heating in an air furnace or in water. In this manner, a photochromic cured product (photochromic optical article) molded into the form of an optical material such as a lens can be obtained.

In an alternative process, an optical substrate such as a lens substrate is disposed so that a predetermined void is formed, and a photochromic curable composition is injected into the void. In this state, polymerization is conducted by heating. This casting polymerization using an inner mold also can be employed to obtain a photochromic lens having a photochromic layer formed on a surface of an optical substrate (a laminate having a photochromic optical article laminated thereon) (production of a laminate by casting polymerization). The optical substrate is not particularly limited, and any optical substrate made of a known plastic can be used. Specific examples thereof include plastic materials such as (meth)acrylic resins, polycarbonate-based resins, allyl-based resins, thiourethane-based resins, urethane-based resins, and thioepoxy-based resins.

In a case of forming a photochromic layer on a surface of an optical substrate by the casting polymerization, it is also possible to enhance adhesion between the photochromic layer and the optical substrate by treating in advance the surface of the optical substrate chemically with an alkali solution, an acid solution or the like, or physically with a corona discharge, a plasma discharge, polishing or the like. Needles to note, it is also possible to provide a transparent adhesive resin layer on the surface of the optical substrate.

Alternatively, a necessary amount of a photochromic curable composition is coated on one of optical substrates of inorganic glass or the like on which a spacer is placed, and the other optical substrate of glass or the like is placed thereon, and then, the coated photochromic curable composition is cured to be joined to the pair of optical substrates of inorganic glass optical article or the like. In this manner, a photochromic lens (a laminate having a laminated photochromic optical article) can be obtained by joining optical substrates such as a pair of glass optical articles (glass bonding).

In a case of producing a photochromic lens by a binder method, a photochromic sheet made of a photochromic curable composition is first produced. The thus obtained photochromic sheet is sandwiched by two transparent sheets (optical sheets) and the aforementioned polymerization is conducted, whereby a photochromic laminate having the photochromic layer as an adhesive layer is obtained.

In this case, it is also possible to produce the photochromic sheet by coating, that is, by using a coating solution prepared by dissolving the photochromic curable composition in an organic solvent.

The photochromic laminate thus produced is mounted for instance inside a mold, and then, a thermoplastic resin for an optical substrate such as a lens (e.g., polycarbonate) is injection-molded to obtain a photochromic lens having a predetermined shape on which the photochromic laminate is laminated. Alternatively, this photochromic laminate can be adhered to the surface of the optical substrate by an adhesive or the like, whereby a photochromic lens is obtained.

In a case of producing a photochromic laminate in this manner, it is particularly preferable that a urethane- or a urea-based polymerizable compound is used as the polymerizable compound, particularly a urethane-based polymerizable compound, due to its favorable adhesion with the optical substrate, and it is adjusted to make a polyurethane.

The obtained photochromic cured product/laminate can exhibit excellent photochromic properties such as color optical density and fading rate. The photochromic cured product/laminate may be used effectively to produce an optical substrate imparted with photochromic properties, such as a photochromic lens (photochromic optical article).

In accordance with the application, the photochromic cured product can be laminated with any other functional layer or dyed with dyestuff like dispersive dyestuff as long as the effect is not impaired. Further, a hard coat film can be formed thereon by using a hard coat agent based on a silane coupling agent or a sol of silicon, zirconium, antimony, aluminum, tin, tungsten or the like. Alternatively, a thin film can be formed by vapor deposition of a metal oxide such as $SiO_2$, $TiO_2$, or $ZrO_2$. Antireflection can be imparted by a thin film through a treatment of coating an organic polymer. An antistatic treatment or the like can also be carried out.

Another example of lamination with any other functional layer is a lamination of a polarizing film on the obtained photochromic cured product for the purpose of imparting polarization property. The position of the polarizing film is not particularly limited. The polarizing film may be laminated on the outside of the photochromic cured product, or between the photochromic cured product and the other layer. In a case where the adhesive layer is used, the polarizing film may be laminated in the adhesive layer. In a case of using the adhesive layer, a method of embedding in the adhesive layer is preferred from the viewpoint of adhesiveness.

Similarly, the method of laminating a polarizing film is not particularly limited, and any known method may be employed. For instance, in a case of the aforementioned casting polymerization, the polarizing film is placed between a front/rear mold and the photochromic curable composition or within the photochromic composition, at the time of injecting the photochromic curable composition into a glass mold. The photochromic curable composition is then polymerized for lamination.

In a case of the glass bonding method as described above, it is preferable that a polarizing film is laminated in advance on one surface of the optical substrate of inorganic glass. When using the thus prepared laminate, an optical substrate of inorganic glass and a polarizing film are adhered by using a known thermosetting adhesive or an ultraviolet (UV) curable adhesive.

The polarizing film is not particularly limited, and commercially available polarizing films can be used.

The thickness of the polarizing film to be preferably used is 20 to 100 μm. The polarizing film is prepared, for instance, by stretching polyvinyl alcohol dyed with a dichroic substance such as a dichroic dye or iodine.

For the dichroic dye to be contained in the polarizing film, commercially available dichroic dyes can be used without any substantial limitation. Examples thereof include dyes such as azo dyes and anthraquinone dyes. Specific examples thereof include Chlorantine Fast Red (C.I.28160), Congo Red (C.I.22120), Brilliant Blue B (C.I.24410), Benzopurpurin (C.I.23500), Chlorazole Black BH(C.I.22590), Direct Blue 2B (C.I.22610), Diamine Green (C.I.30295), Chrysophenin (C.I.24895), Sirius Yellow (C.I.29000), Direct Fast Red (C.I.23630), Acid Black (C.I.20470), Direct Sky Blue (C.I.24400), Solophenyl Blue 4GL (C.I.34200), Direct Copper Blue 2B (C.I.24185), and Nippon Brilliant Violet BK conc (C.I.27885). Among these dichroic dyes, two or more dyes may be selected and used depending on the purpose. The numbers in the parentheses are Colour Index Nos. described in "New Edition Handbook of Dyestuffs" (Maruzen Co., Ltd., 1970), edited by the Society of Synthetic Organic Chemistry, Japan.

Though a polarizing film having a luminous transmittance of 10 to 60% and a polarization degree of 70.0 to 99.9 is usually difficult to join, even such a polarizing film can be firmly bonded by using the photochromic curable composition described above.

In order to enhance its function and adhesiveness, the polarizing film may have cellulose triacetate films laminated on both surfaces thereof. The thickness of the cellulose triacetate films is preferably 20 to 200 μm, more preferably 20 to 100 μm.

In order to adjust the amount of moisture contained in the polarizing film and to impart dimensional stability to the polarizing film, the polarizing film may be treated with heat of 40 to 100 °C for about 5 seconds to about 30 minutes, before producing the photochromic cured product.

The optical laminate according to the embodiment includes an optical substrate and a resin composition according to the embodiment. The resin composition is laminated on at least one of main surfaces of the optical substrate.

Figure 6:
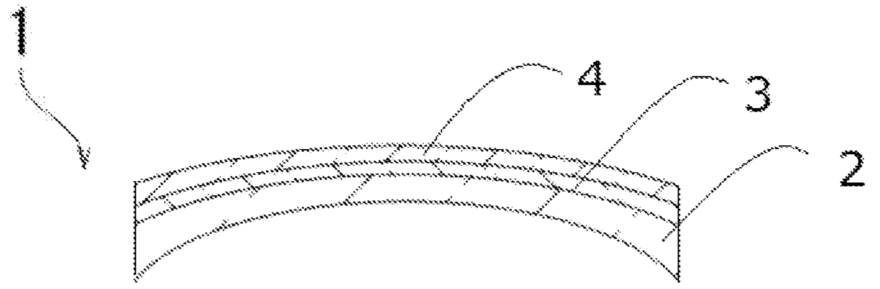
FIG. 6 is a cross-sectional view schematically showing an example of optical laminate according to an embodiment.

FIG. 6 is a cross-sectional view schematically showing an example of optical laminate according to the embodiment. An optical laminate 1 shown in FIG. 6 comprises an optical substrate 2, a primer layer 3 provided on one of the main surfaces of the optical substrate 2, and a resin composition 4 provided on the primer layer 3. The optical substrate 2 is convexo-concave. The primer layer 3 and the resin composition 4 are coated on the convex side of the optical substrate 2. The primer layer 3 comprises, for instance, an adhesive containing a polyurethane resin or the like. The primer layer 3 may be omitted.

The eyeglasses according to the embodiment include lenses according to the embodiment.

Figure 7:
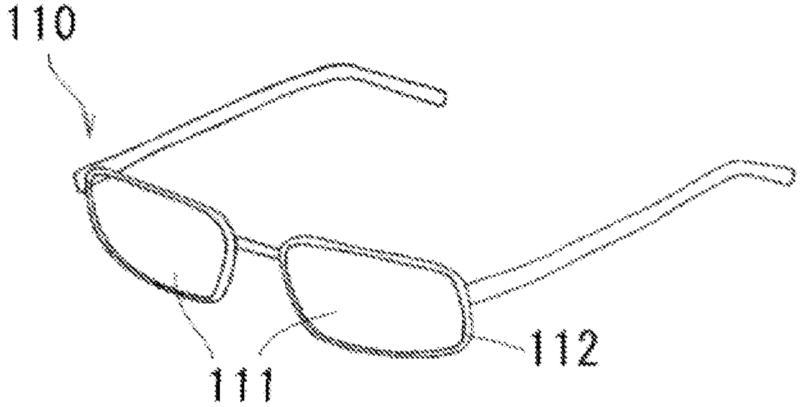
FIG. 7 is a perspective view schematically showing an example of eyeglasses according to an embodiment.

FIG. 7 is a perspective view schematically showing an example of eyeglasses according to the embodiment. The eyeglasses 110 shown in FIG. 7 include two lenses 111 and a frame 112 for fixing these lenses 111. At least one of the two lenses 111 is a lens containing the resin composition according to the embodiment.

EXAMPLES

Hereinafter, the present invention will be described in detail by using Examples, though the present invention is not limited to these Examples. In the Examples, the evaluation method and the like for the respective components and resin compositions described above are as follows.

<Photochromic Curable Composition>

<Component (ii)>

PC1: a photochromic compound represented by the following formula

[CF 20]

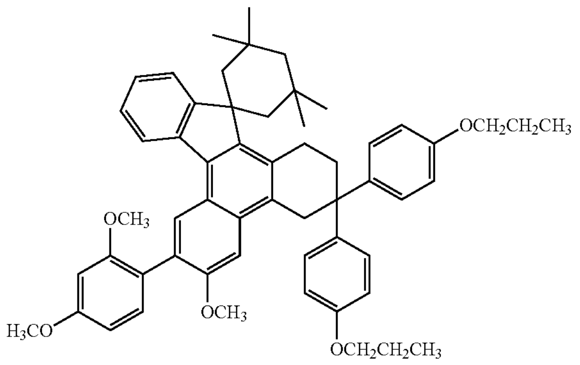

<Component (A)>

NBDI: Norbornane diisocyanate

IPDI: Isophorone diisocyanate 1,3-H6XDI: 1,3-bis(isocyanatomethyl) cyclohexane 1,4-H6XDI: 1,4-bis(isocyanatomethyl) cyclohexane <Component (B1)>

<Component (B1a)>

TMWP: trimethylolpropane tris(3-mercaptopropionate), having three thiol groups in one molecule PEMP: pentaerythritol tetrakis(3-mercaptopropionate), having four thiol groups in a molecule DPMP: dipentaerythritol hexakis(3-mercaptopropionate), having six thiol groups in a molecule <Component (B1b)>

RX-1: polyrotaxane

It is polyrotaxane synthesized by the method described in WO2015/068798. The axial molecule is formed of polyethylene glycol having a molecular weight of 11000. The bulky groups at both ends are adamantyl groups. The cyclic molecule is α cyclodextrin, where 3.5 molecules of ε caprolactone on average are ring-opening polymerized via an oxypropylene group.

The properties of RX-1 are as follows.

Clathrate amount of a cyclodextrin: 0.25

Degree of modification of side chain: 0.5

Molecular weight of side chain: about 450 on average

Weight average molecular weight: 180000

Hydroxyl value: 85 mgKOH/g

The above numerical values indicate that the number of hydroxyl groups in one molecule is 270 on average.

<Component (B2)>

<Component (B21)>

WS-140: polyoxyethylene polyoxypropylene lauryl ether (oxyethylene repeating unit m'=10 (average value), oxypropylene chain repeating unit l'=2 (average value), number average molecular weight: 750)

It has a hydroxyl group at one terminal and an alkyl group having 12 carbon atoms at the other terminal. The repeating part of oxyethylene and the repeating part of oxypropylene are random copolymers.

MPEG750: methoxy polyethylene glycol (average molecular weight: 750)

<Component (B22)>

L-34: polyoxyethylene polyoxypropylene glycol (oxyethylene repeating unit m"+m'"=14 (average value), oxypropylene chain repeating unit l"=16 (average value), number average molecular weight: 1600)

It has hydroxyl groups at both terminals of the molecule (having two hydroxyl groups).

The repeating part of oxyethylene and the repeating part of oxypropylene are block copolymers.

<Component (C): Polymerization Curing Accelerator>

C1: Dimethyltin dichloride

<Other Component to be Compounded>

Ir245: ethylene bis(oxyethylene) bis[3-(5-tert-butyl-4-hydroxy-m-tolyl) propionate]

<Alkali Metal Ion>

Potassium acetate

Sodium acetate

Example 1

A photochromic curable composition mixed with the respective components was prepared according to the formulations shown in Table 1 and Table 3.

The content of alkali metal ion or alkaline earth metal ion in the photochromic curable composition was measured by using an ICP optical emission spectrometer (iCAP6500DUO) manufactured by Thermo Fisher Scientific Inc. The measurement sample used in measurement of the metal ions was prepared by extracting, from 30 g of chloroform solution in which 10 g of photochromic composition is dissolved, into 20 g of ultrapure water (containing 1% $HNO_3$).

Subsequently, the prepared photochromic curable composition was sufficiently defoamed, and then, it was injected into an inorganic glass mold provided with a gap of 2 mm, whereby the photochromic curable composition was polymerized by casting polymerization. The polymerization was carried out using an air furnace. The composition was cured over 18 hours with a gradual increase in temperature from 27 °C to 120 °C. After the polymerization, the cured product was detached from the inorganic glass mold to obtain a photochromic cured product (resin composition) having a thickness of 2 mm.

The obtained photochromic cured product was evaluated by the following method.

(Evaluation)

[Photochromic Properties]

Every property was evaluated from each value measured with a spectrophotometer (instant multichannel photodetector MCPD3000) manufactured by Otsuka Electronics Co., Ltd.

[1] Maximal absorption wavelength (Δmax): maximal absorption wavelength after color development

[2] Color optical density: difference between the absorbance {A(300)} and the absorbance A(0) at the maximal absorption wavelength, where {A(300)} is taken 300 seconds after light irradiation at 23 °C and A(0) is taken at the time light irradiation is not performed yet

[3] Fading half-life [$t_{1/2}$(sec)]: the time period required for the absorbance at the maximal absorption wavelength of a sample to decrease to ½ of {A(300)−A(0)} when irradiation with light is stopped after 300 seconds of light irradiation at 23 °C.

[Durability]

$$\text{Residual rate } (\%)=[(A_{96})/(A_0)\times 100] \quad [1]$$

Degradation was accelerated for 96 hours by use of Xenon Weather Meter X25 manufactured by Suga Test Instruments Co., Ltd. The color optical density was evaluated before and after the degradation acceleration test to determine the ratio ($A_{96}/A_0$) as the residual rate to provide an index of the durability of color development. Here, $A_0$ indicates the color optical density before the test, and $A_{96}$ indicates the color optical density after the test. The higher the residual rate, the higher is the durability of color development.

[2] Degree of yellowing (ΔYI): difference between yellowness ($YI_{96}$) after accelerated degradation for 96 hours by the Xenon Weather Meter X25 and yellowness ($YI_0$) prior to the testing. For the yellowness, values obtained by measurement by a touch-panel SM color computer SM-T manufactured by Suga Test Instruments Co., Ltd. were used.

[Heat Resistance]

As for the softening temperature of the obtained photochromic cured product, a value measured by a thermomechanical analyzer TMA8311 (three-point bending method, temperature increase rate: 10 °C/min) manufactured by Rigaku Corporation was used.

[Solid $^{13}$CNMR Measurement]

Measurement on the $^{13}$CNMR of the obtained photochromic cured product was performed as follows. For the measurement, a photochromic cured product having a thickness of about 1 m was used. The cured product was punched out into a disk having a diameter of about 2 mm and packed into a 4 mm zirconia sample tube.

Equipment: FT-NMR JNM-ECA400II (JEOL Ltd.)

Probe: 4 mmΦCP/MAS probe (JEOL Ltd.)

$^{13}$C Nuclear measurement frequency: 100.53 MHz

Measurement method: CP/MAS method

Contact time: 2 msec.

Delay time: 5 sec.

Cumulated number: 5000 times

Sample volume: approximately 80 mg

Sample spindle speed: 6000 Hz

Temperature: 25 °C.

External standard substance: adamantane (29.5 ppm)

In the PST/MAS measurement, presaturation was performed with an interval of 10 msec. under the aforementioned conditions.

[Thickening Degree ($\Delta\nu_{3h}$)]

This is the difference between the kinematic viscosity ($\nu_{3h}$) 3 hours after preparation of the photochromic curable composition and the initial kinematic viscosity ($\nu_0$). The kinematic viscosity was measured using Canon-Fenske Viscometer.

[Alkali Metal Ion or Alkaline Earth Metal Ion]

As for the concentration of alkali metal ion or alkaline earth metal ion in the obtained photochromic cured product, a disk of Φ40 mm and a thickness of 1 mm was prepared, and a value measured by an X-ray fluorimeter (ZSX Primus IV) manufactured by Rigaku Corporation was used. The lower detection limit in this measurement is 1 ppm.

The evaluation results of the photochromic cured product are shown in Table 5.

Examples 2 to 24, Comparative Examples 1 to 3

According to the formulations shown in Tables 1 to 4 below, photochromic cured products were produced by the same method as in Example 1 and evaluated. The evaluation results are shown in Tables 5 to 6 as in Example 1.

TABLE 1

| | Photochromic curable composition (part by mass) | | | | | | Alkali metal ion |
|---|---|---|---|---|---|---|---|
| | Component | Component | Component (B) | | Component | Other | or alkaline earth |
| No. | (ii) | (A) | Component (B1) | Component (B2) | (C) | component | metal ion (content) |
| Example 1 | PC1 (0.1) | NBDI (38) | DPMP (44) | WS-140 (18) | C1 (0.05) | Ir245 (0.1) | Potassium ion (60 ppb) |
| Example 2 | PC1 (0.1) | 1,3-H6XDI (36) | DPMP (45) | WS-140 (19) | C1 (0.05) | Ir245 (0.1) | Potassium ion (60 ppb) |
| Example 3 | PC1 (0.1) | IPDI (40) | DPMP (43) | WS-140 (17) | C1 (0.05) | Ir245 (0.1) | Potassium ion (60 ppb) |
| Example 4 | PC1 (0.1) | 1,4-H6XDI (36) | DPMP (45) | WS-140 (19) | C1 (0.05) | Ir245 (0.1) | Potassium ion (60 ppb) |
| Example 5 | PC1 (0.1) | 1,3-H6XDI (39) | DPMP (51) | WS-140 (10) | C1 (0.05) | Ir245 (0.1) | Potassium ion (50 ppb) |
| Example 6 | PC1 (0.1) | 1,3-H6XDI (37) | PEMP (44) | WS-140 (19) | C1 (0.05) | Ir245 (0.1) | Potassium ion (60 ppb) |
| Example 7 | PC1 (0.1) | IPDI (41) | PEMP (41) | WS-140 (18) | C1 (0.05) | Ir245 (0.1) | Potassium ion (60 ppb) |
| Example 8 | PC1 (0.1) | 1,3-H6XDI (41) | PEMP (49) | WS-140 (10) | C1 (0.05) | Ir245 (0.1) | Potassium ion (50 ppb) |
| Example 9 | PC1 (0.1) | 1,3-H6XDI (36) | DPMP (34)<br>TMMP (12) | WS-140 (18) | C1 (0.05) | Ir245 (0.1) | Potassium ion (60 ppb) |
| Example 10 | PC1 (0.1) | IPDI (40) | DPMP (32)<br>TMMP (10) | WS-140 (18) | C1 (0.05) | Ir245 (0.1) | Potassium ion (60 ppb) |
| Example 11 | PC1 (0.1) | 1,3-H6XDI (36) | DPMP (46)<br>RX-1 (4) | WS-140 (14) | C1 (0.05) | Ir245 (0.1) | Potassium ion (70 ppb) |
| Example 12 | PC1 (0.1) | 1,3-H6XDI (36) | DPMP (34)<br>TMMP (12)<br>RX-1 (4) | WS-140 (14) | C1 (0.05) | Ir245 (0.1) | Potassium ion (85 ppb) |
| Example 13 | PC1 (0.1) | 1,3-H6XDI (37) | TMMP (49) | WS-140 (14) | C1 (0.05) | Ir245 (0.1) | Potassium ion (50 ppb) |
| Example 14 | PC1 (0.1) | 1,3-H6XDI (34) | DPMP (41) | WS-140 (25) | C1 (0.05) | Ir245 (0.1) | Potassium ion (100 ppb)<br>Sodium ion (70 ppb) |

TABLE 2

| | Photochromic curable composition (part by mass) | | | | | | Alkali metal ion |
|---|---|---|---|---|---|---|---|
| | | | Component (B) | | | | or alkaline earth |
| No. | Component (ii) | Component (A) | Component (B1) | Component (B2) | Component (C) | Other component | metal ion (content) |
| Example 15 | PC1 (0.1) | 1,3-H6XDI (36) | DPMP (45) | L-34 (19) | C1 (0.05) | Ir245 (0.1) | Potassium ion (45 ppb) |
| Example 16 | PC1 (0.1) | 1,3-H6XDI (37) | DPMP (48) | L-34 (15) | C1 (0.05) | Ir245 (0.1) | Potassium ion (45 ppb) |
| Example 17 | PC1 (0.1) | 1,3-H6XDI (39) | DPMP (51) | L-34 (10) | C1 (0.05) | Ir245 (0.1) | Potassium ion (40 ppb) |
| Example 18 | PC1 (0.1) | 1,3-H6XDI (37) | PEMP (43) | L-34 (20) | C1 (0.05) | Ir245 (0.1) | Potassium ion (45 ppb) |
| Example 19 | PC1 (0.1) | 1,3-H6XDI (39) | PEMP (46) | L-34 (15) | C1 (0.05) | Ir245 (0.1) | Potassium ion (45 ppb) |
| Example 20 | PC1 (0.1) | 1,3-H6XDI (41) | PEMP (49) | L-34 (10) | C1 (0.05) | Ir245 (0.1) | Potassium ion (40 ppb) |
| Example 21 | PC1 (0.1) | 1,3-H6XDI (36) | DPMP (34)<br>TMMP (11) | L-34 (19) | C1 (0.05) | Ir245 (0.1) | Potassium ion (45 ppb) |
| Example 22 | PC1 (0.1) | 1,3-H6XDI (39) | TMMP (51) | L-34 (10) | C1 (0.05) | Ir245 (0.1) | Potassium ion (100 ppm) |
| Example 23 | PC1 (0.1) | 1,3-H6XDI (36) | DPMP (45) | WS-140 (19) | C1 (0.05) | Ir245 (0.1) | Potassium ion (800 ppm) |
| Example 24 | PC1 (0.1) | 1,3-H6XDI (36) | DPMP (45) | L-34 (19) | C1 (0.05) | Ir245 (0.1) | Potassium ion (750 ppm) |
| Comparative Example 1 | PC1 (0.1) | 1,3-H6XDI (39) | TMMP (51) | WS-140 (10) | C1 (0.05) | Ir245 (0.1) | Potassium ion (50 ppm) |
| Comparative Example 2 | PC1 (0.1) | 1,3-H6XDI (31) | DPMP (35) | WS-140 (34) | C1 (0.05) | Ir245 (0.1) | Potassium ion (50 ppb) |
| Comparative Example 3 | PC1 (0.1) | 1,3-H6XDI (41) | PEMP (49) | MPEG750 (10) | C1 (0.05) | Ir245 (0.1) | Sodium ion (300 ppm) |

TABLE 3

| | Photochromic curable composition (mole number · molar ratio) | | | | | | | | Composition thickening |
|---|---|---|---|---|---|---|---|---|---|
| | | Component (B) | | | | | | | |
| | | Component (B1) | | | | | | | |
| | Component (A) nA | Component (B1a) nB1a | Component (B1b) nB1b | Component (B1) nB1 | Component (B2) nB2 | nB1/nB2 | Component (B) nB | nA/nB | degree $\Delta v_{3h}$ (cSt) |
| Example 1 | 38.92 mmol | 34.65 mmol | — | 34.65 mmol | 2.54 mmol | 13.6 | 37.19 mmol | 1.05 | 80 |
| Example 2 | 38.92 mmol | 34.65 mmol | — | 34.65 mmol | 2.54 mmol | 13.6 | 37.19 mmol | 1.05 | 80 |
| Example 3 | 38.92 mmol | 34.65 mmol | — | 34.65 mmol | 2.54 mmol | 13.6 | 37.19 mmol | 1.05 | 80 |
| Example 4 | 38.92 mmol | 34.65 mmol | — | 34.65 mmol | 2.54 mmol | 13.6 | 37.19 mmol | 1.05 | 80 |
| Example 5 | 38.92 mmol | 35.94 mmol | — | 35.94 mmol | 1.25 mmol | 28.8 | 37.19 mmol | 1.05 | 100 |
| Example 6 | 38.92 mmol | 34.65 mmol | — | 34.65 mmol | 2.54 mmol | 13.6 | 37.19 mmol | 1.05 | 60 |
| Example 7 | 38.92 mmol | 34.65 mmol | — | 34.65 mmol | 2.54 mmol | 13.6 | 37.19 mmol | 1.05 | 60 |
| Example 8 | 38.92 mmol | 35.94 mmol | — | 35.94 mmol | 1.25 mmol | 28.8 | 37.19 mmol | 1.05 | 80 |
| Example 9 | 38.92 mmol | 34.65 mmol | — | 34.65 mmol | 2.54 mmol | 13.6 | 37.19 mmol | 1.05 | 50 |
| Example 10 | 38.92 mmol | 34.65 mmol | — | 34.65 mmol | 2.54 mmol | 13.6 | 37.19 mmol | 1.05 | 50 |
| Example 11 | 38.92 mmol | 34.65 mmol | 0.80 mmol | 35.25 mmol | 1.94 mmol | 18.2 | 37.19 mmol | 1.05 | 80 |
| Example 12 | 38.92 mmol | 34.65 mmol | 0.60 mmol | 35.25 mmol | 1.94 mmol | 18.2 | 37.19 mmol | 1.05 | 50 |
| Example 13 | 38.92 mmol | 35.30 mmol | — | 35.30 mmol | 1.89 mmol | 18.7 | 37.19 mmol | 1.05 | 60 |
| Example 14 | 38.92 mmol | 33.89 mmol | — | 33.89 mmol | 3.30 mmol | 10.3 | 37.19 mmol | 1.05 | 50 |

TABLE 4

| | Photochromic curable composition (mole number · molar ratio) | | | | | | | | Composition thickening |
|---|---|---|---|---|---|---|---|---|---|
| | | Component (B) | | | | | | | |
| | | Component (B1) | | | | | | | |
| | Component (A) nA | Component (B1a) nB1a | Component (B1b) nB1b | Component (B) nB1 | Component (B2) nB2 | nB1/nB2 | Component (B) nB | nA/nB | degree $\Delta v_{3h}$ (cSt) |
| Example 15 | 38.92 mmol | 34.65 mmol | — | 34.65 mmol | 2.54 mmol | 13.6 | 37.19 mmol | 1.05 | 415 |
| Example 16 | 38.92 mmol | 35.30 mmol | — | 35.30 mmol | 1.89 mmol | 18.7 | 37.19 mmol | 1.05 | 430 |
| Example 17 | 38.92 mmol | 35.94 mmol | — | 35.94 mmol | 1.25 mmol | 28.8 | 37.19 mmol | 1.05 | 440 |
| Example 18 | 38.92 mmol | 34.65 mmol | — | 34.65 mmol | 2.54 mmol | 13.6 | 37.19 mmol | 1.05 | 410 |
| Example 19 | 38.92 mmol | 35.30 mmol | — | 35.30 mmol | 1.89 mmol | 18.7 | 37.19 mmol | 1.05 | 420 |
| Example 20 | 38.92 mmol | 35.94 mmol | — | 35.94 mmol | 1.25 mmol | 28.8 | 37.19 mmol | 1.05 | 430 |
| Example 21 | 38.92 mmol | 34.65 mmol | — | 34.65 mmol | 2.54 mmol | 13.6 | 37.19 mmol | 1.05 | 410 |
| Example 22 | 38.92 mmol | 35.94 mmol | — | 35.94 mmol | 1.25 mmol | 28.8 | 37.19 mmol | 1.05 | 405 |
| Example 23 | 38.92 mmol | 34.65 mmol | — | 34.65 mmol | 2.54 mmol | 13.6 | 37.19 mmol | 1.05 | 20 |
| Example 24 | 38.92 mmol | 34.65 mmol | — | 34.65 mmol | 2.54 mmol | 13.6 | 37.19 mmol | 1.05 | 410 |
| Comparative Example 1 | 38.92 mmol | 35.94 mmol | — | 35.94 mmol | 1.25 mmol | 28.8 | 37.19 mmol | 1.05 | 25 |
| Comparative Example 2 | 38.92 mmol | 31.59 mmol | — | 31.59 mmol | 5.60 mmol | 5.6 | 37.19 mmol | 1.05 | 30 |
| Comparative Example 3 | 38.92 mmol | 35.94 mmol | — | 35.94 mmol | 1.25 mmol | 28.8 | 37.19 mmol | 1.05 | 20 |

TABLE 5

| | Photochromic optical article Mobility of component (i) | | | | | | | | |
|---|---|---|---|---|---|---|---|---|---|
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ |
| Ex. 1 | 2.57 | 0.18 | 14.3 | 2.62 | 0.17 | 15.4 | 11.62 | 1.66 | 7.0 |
| Ex. 2 | 2.54 | 0.18 | 14.1 | 2.48 | 0.18 | 13.8 | 11.68 | 1.50 | 7.4 |
| Ex. 3 | 1.95 | 0.16 | 12.2 | 2.03 | 0.16 | 12.7 | 9.73 | 1.37 | 7.1 |
| Ex. 4 | 2.50 | 0.18 | 13.9 | 2.43 | 0.17 | 14.3 | 10.80 | 1.50 | 7.2 |
| Ex. 5 | 1.25 | 0.12 | 10.4 | 1.18 | 0.12 | 9.8 | 4.82 | 0.79 | 6.1 |
| Ex. 6 | 3.41 | 0.24 | 14.2 | 3.17 | 0.22 | 14.4 | 9.79 | 1.36 | 7.2 |
| Ex. 7 | 2.63 | 0.25 | 10.5 | 2.69 | 0.24 | 11.2 | 8.76 | 1.51 | 5.8 |
| Ex. 8 | 1.08 | 0.12 | 9.0 | 1.21 | 0.12 | 10.1 | 4.86 | 0.81 | 6.0 |
| Ex. 9 | 2.56 | 0.18 | 14.2 | 2.52 | 0.18 | 14.0 | 10.65 | 1.50 | 7.1 |
| Ex. 10 | 2.30 | 0.19 | 12.1 | 2.66 | 0.20 | 13.3 | 11.32 | 1.64 | 6.9 |
| Ex. 11 | 2.52 | 0.18 | 14.0 | 2.52 | 0.18 | 14.0 | 10.50 | 1.50 | 7.0 |
| Ex. 12 | 3.38 | 0.24 | 14.1 | 3.12 | 0.22 | 14.2 | 10.06 | 1.36 | 7.4 |

TABLE 5-continued

| | | | | | | | | | |
|---|---|---|---|---|---|---|---|---|---|
| Ex. 13 | 1.99 | 0.24 | 8.3 | 2.39 | 0.21 | 11.4 | 8.21 | 1.44 | 5.7 |
| Ex. 14 | 4.42 | 0.20 | 22.1 | 4.46 | 0.20 | 22.3 | 13.70 | 1.65 | 8.3 |

| | Photochromic optical article | | | | | | |
|---|---|---|---|---|---|---|---|
| | Photochromic properties (23 °C) | | | Heat resistance | Durability (Xe acceleration test) 96 h | | Alkali metal ion |
| | | Color | | Softening | | | |
| | $\lambda_{max}$ (nm) | optical density | $t_{1/2}$ (sec) | temperature (°C) | Residual rate (%) | ΔYI | or alkaline earth metal ion (content) |
| Ex. 1 | 573 | 0.90 | 46 | 78 | 90 | 5 | less than detection limit |
| Ex. 2 | 573 | 0.90 | 48 | 73 | 90 | 5 | less than detection limit |
| Ex. 3 | 575 | 0.82 | 68 | 70 | 89 | 5 | less than detection limit |
| Ex. 4 | 573 | 0.90 | 46 | 75 | 89 | 5 | less than detection limit |
| Ex. 5 | 573 | 0.61 | 74 | 82 | 91 | 4 | less than detection limit |
| Ex. 6 | 573 | 0.86 | 60 | 70 | 88 | 6 | less than detection limit |
| Ex. 7 | 575 | 0.77 | 82 | 67 | 86 | 6 | less than detection limit |
| Ex. 8 | 573 | 0.60 | 94 | 73 | 90 | 5 | less than detection limit |
| Ex. 9 | 573 | 0.88 | 58 | 70 | 88 | 6 | less than detection limit |
| Ex. 10 | 575 | 0.78 | 75 | 65 | 86 | 6 | less than detection limit |
| Ex. 11 | 573 | 0.90 | 46 | 73 | 90 | 5 | less than detection limit |
| Ex. 12 | 573 | 0.88 | 58 | 70 | 88 | 6 | less than detection limit |
| Ex. 13 | 575 | 0.68 | 180 | 45 | 85 | 7 | less than detection limit |
| Ex. 14 | 573 | 0.98 | 43 | 55 | 86 | 6 | less than detection limit |

Ex.: Example

TABLE 6

| | Photochromic optical article Mobility of component (i) | | | | | | | | |
|---|---|---|---|---|---|---|---|---|---|
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ |
| Ex. 15 | 17.10 | 0.50 | 34.2 | — | — | — | 17.21 | 1.55 | 11.1 |
| Ex. 16 | 15.85 | 0.56 | 28.3 | — | — | — | 17.54 | 1.72 | 10.2 |
| Ex. 17 | 13.13 | 0.65 | 20.2 | — | — | — | 17.48 | 2.01 | 8.7 |
| Ex. 18 | 15.20 | 0.51 | 29.8 | — | — | — | 17.85 | 1.58 | 11.3 |
| Ex. 19 | 14.36 | 0.57 | 25.2 | — | — | — | 17.95 | 1.76 | 10.2 |
| Ex. 20 | 13.27 | 0.66 | 20.1 | — | — | — | 17.43 | 2.05 | 8.5 |
| Ex. 21 | 16.63 | 0.51 | 32.6 | — | — | — | 17.85 | 1.58 | 11.3 |
| Ex. 22 | 6.26 | 0.62 | 10.1 | — | — | — | 7.49 | 1.17 | 6.4 |
| Ex. 23 | 2.52 | 0.18 | 14.0 | 2.54 | 0.18 | 14.1 | 11.10 | 1.50 | 7.4 |
| Ex. 24 | 17.15 | 0.50 | 34.3 | — | — | — | 17.05 | 1.55 | 11.0 |
| Com. Ex. 1 | 1.51 | 0.21 | 7.2 | 1.24 | 0.20 | 6.2 | 7.19 | 1.41 | 5.1 |
| Com. Ex. 2 | 10.18 | 0.24 | 42.4 | 10.20 | 0.24 | 42.5 | 18.22 | 1.98 | 9.2 |
| Com. Ex. 3 | — | — | — | — | — | — | 2.88 | 0.72 | 4.0 |

| | Photochromic optical article | | | | | | |
|---|---|---|---|---|---|---|---|
| | Photochromic properties (23 °C) | | | Heat resistance | Durability (Xe acceleration test) 96 h | | Alkali metal |
| | | Color | | Softening | | | ion or alkaline |
| | $\lambda_{max}$ (nm) | optical density | $t_{1/2}$ (sec) | temperature (°C) | Residual rate (%) | ΔYI | earth metal ion (content) |
| Ex. 15 | 572 | 0.97 | 43 | 78 | 88 | 5 | less than detection limit |
| Ex. 16 | 572 | 0.85 | 51 | 80 | 89 | 4 | less than detection limit |
| Ex. 17 | 572 | 0.66 | 66 | 85 | 90 | 4 | less than detection limit |
| Ex. 18 | 572 | 0.95 | 48 | 73 | 88 | 6 | less than detection limit |
| Ex. 19 | 572 | 0.83 | 58 | 75 | 88 | 5 | less than detection limit |
| Ex. 20 | 572 | 0.65 | 72 | 77 | 90 | 4 | less than detection limit |
| Ex. 21 | 572 | 0.96 | 50 | 72 | 88 | 6 | less than detection limit |
| Ex. 22 | 575 | 0.57 | 143 | 52 | 86 | 6 | Potassium ion (120 ppm) |
| Ex. 23 | 573 | 0.90 | 55 | 73 | 70 | 16 | Potassium ion (850 ppm) |
| Ex. 24 | 572 | 0.97 | 50 | 78 | 70 | 15 | Potassium ion (800 ppm) |
| Com. Ex. 1 | 575 | 0.53 | 235 | 48 | 86 | 6 | Potassium ion (75 ppm) |
| Com. Ex. 2 | 572 | 1.00 | 40 | 42 | 85 | 6 | less than detection limit |
| Com. Ex. 3 | 577 | 0.42 | 152 | 58 | 88 | 4 | Sodium ion (350 ppm) |

Ex.: Example
Com. Ex.: Comparative Example

Examples 25 to 48, Comparative Examples 4 to 6

Photochromic curable compositions were prepared by the formulations shown in Tables 1 to 4 above, except that 0.2 parts by mass of component (ii) PC1 was used. The corresponding Examples and Comparative Examples are shown in Table 7 and Table 8.

Meanwhile, a mold comprising an inorganic glass plate and a thiourethane-based plastic lens having a refractive index of 1.60 was prepared. The gap between the inorganic glass plate and the thiourethane-based plastic lens was set to 1 mm.

After sufficiently defoaming the prepared photochromic curable composition, the photochromic curable composition was injected into the mold having a gap of 1 mm, and polymerized. The polymerization was carried out by using an air furnace. The composition was cured over 18 hours with a gradual increase in temperature from 27 °C to 120 °C. After the polymerization, the cured product was detached from the inorganic glass plate to obtain a bonded type laminate comprising a photochromic cured product having a thickness of 1 mu and laminated on the surface of the thiourethane-based plastic lens having a refractive index of 1.60.

The obtained laminate was evaluated for photochromic properties and durability by the same method as in Example 1, and the evaluation results are shown in Tables 7 to 8. Evaluation of the heat resistance was not performed in consideration of influences of the thiourethane-based plastic lens. Description of the mobility of the component (i) was omitted since it is the same as those of the corresponding Examples and Comparative Examples.

TABLE 7

| | Photochromic properties (23 °C) | | | Durability (Xe acceleration test) 96 h | | | |
|---|---|---|---|---|---|---|---|
| | $\lambda_{max}$ (nm) | Color optical density | $t_{1/2}$ (sec) | Residual rate (%) | ΔYI | Alkali metal ion or alkaline earth metal ion (content) | Remarks |
| Ex. 25 | 573 | 0.90 | 46 | 90 | 5 | At or below detection limit | Compounding rates are the same as those in Ex. 1 except that 0.2 parts by mass of component (ii) PC1 is compounded. |
| Ex. 26 | 573 | 0.90 | 48 | 90 | 5 | At or below detection limit | Compounding rates are the same as those in Ex. 2 except that 0.2 parts by mass of component (ii) PC1 is compounded. |
| Ex. 27 | 575 | 0.82 | 68 | 89 | 5 | At or below detection limit | Compounding rates are the same as those in Ex. 3 except that 0.2 parts by mass of component (ii) PC1 is compounded. |
| Ex. 28 | 573 | 0.90 | 46 | 89 | 5 | At or below detection limit | Compounding rates are the same as those in Ex. 4 except that 0.2 parts by mass of component (ii) PC1 is compounded. |
| Ex. 29 | 573 | 0.61 | 74 | 91 | 4 | At or below detection limit | Compounding rates are the same as those in Ex. 5 except that 0.2 parts by mass of component (ii) PC1 is compounded. |
| Ex. 30 | 573 | 0.86 | 60 | 88 | 6 | At or below detection limit | Compounding rates are the same as those in Ex. 6 except that 0.2 parts by mass of component (ii) PC1 is compounded. |
| Ex. 31 | 575 | 0.77 | 82 | 86 | 6 | At or below detection limit | Compounding rates are the same as those in Ex. 7 except that 0.2 parts by mass of component (ii) PC1 is compounded. |
| Ex. 32 | 573 | 0.60 | 94 | 90 | 5 | At or below detection limit | Compounding rates are the same as those in Ex. 8 except that 0.2 parts by mass of component (ii) PC1 is compounded. |
| Ex. 33 | 573 | 0.88 | 58 | 88 | 6 | At or below detection limit | Compounding rates are the same as those in Ex. 9 except that 0.2 parts by mass of component (ii) PC1 is compounded. |
| Ex. 34 | 575 | 0.78 | 75 | 86 | 6 | At or below detection limit | Compounding rates are the same as those in Ex. 10 except that 0.2 parts by mass of component (ii) PC1 is compounded. |
| Ex. 35 | 573 | 0.90 | 46 | 90 | 5 | At or below detection limit | Compounding rates are the same as those in Ex. 11 except that 0.2 parts by mass of component (ii) PC1 is compounded. |
| Ex. 36 | 573 | 0.88 | 58 | 88 | 6 | At or below detection limit | Compounding rates are the same as those in Ex. 12 except that 0.2 parts by mass of component (ii) PC1 is compounded. |
| Ex. 37 | 575 | 0.68 | 180 | 85 | 7 | At or below detection limit | Compounding rates are the same as those in Ex. 13 except that 0.2 parts by mass of component (ii) PC1 is compounded. |
| Ex. 38 | 573 | 0.98 | 43 | 86 | 6 | At or below detection limit | Compounding rates are the same as those in Ex. 14 except that 0.2 parts by mass of component (ii) PC1 is compounded. |

Ex.: Example

TABLE 8

| | Photochromic properties (23 °C) | | | Durability (Xe acceleration test) 96 h | | | |
|---|---|---|---|---|---|---|---|
| | $\lambda_{max}$ (nm) | Color optical density | $t_{1/2}$ (sec) | Residual rate (%) | ΔYI | Alkali metal ion or alkaline earth metal ion (content) | Remarks |
| Ex. 39 | 572 | 0.97 | 43 | 88 | 5 | At or below detection limit | Compounding rates are the same as those in Ex. 15 except that 0.2 parts by mass of component (ii) PC1 is compounded. |
| Ex. 40 | 572 | 0.85 | 51 | 89 | 4 | At or below detection limit | Compounding rates are the same as those in Ex. 16 except that 0.2 parts by mass of component (ii) PC1 is compounded. |
| Ex. 41 | 572 | 0.66 | 66 | 90 | 4 | At or below detection limit | Compounding rates are the same as those in Ex. 17 except that 0.2 parts by mass of component (ii) PC1 is compounded. |
| Ex. 42 | 572 | 0.95 | 48 | 88 | 6 | At or below detection limit | Compounding rates are the same as those in Ex. 18 except that 0.2 parts by mass of component (il) PC1 is compounded. |
| Ex. 43 | 572 | 0.83 | 58 | 88 | 5 | At or below detection limit | Compounding rates are the same as those in Ex. 19 except that 0.2 parts by mass of component (ii) PC1 is compounded. |
| Ex. 44 | 572 | 0.65 | 72 | 90 | 4 | At or below detection limit | Compounding rates are the same as those in Ex. 20 except that 0.2 parts by mass of component (ii) PC1 is compounded. |
| Ex. 45 | 572 | 0.96 | 50 | 88 | 6 | At or below detection limit | Compounding rates are the same as those in Ex. 21 except that 0.2 parts by mass of component (ii) PC1 is compounded. |
| Ex. 46 | 575 | 0.57 | 143 | 86 | 6 | Potassium ion (120 ppm) | Compounding rates are the same as those in Ex. 22 except that 0.2 parts by mass of component (ii) PC1 is compounded. |
| Ex. 47 | 573 | 0.90 | 55 | 70 | 16 | Potassium ion (850 ppm) | Compounding rates are the same as those in Ex. 23 except that 0.2 parts by mass of component (ii) PC1 is compounded. |
| Ex. 48 | 572 | 0.97 | 50 | 70 | 15 | Potassium ion (800 ppm) | Compounding rates are the same as those in Ex. 24 except that 0.2 parts by mass of component (ii) PC1 is compounded. |
| Com. Ex. 4 | 575 | 0.53 | 235 | 86 | 6 | Potassium ion (75 ppm) | Compounding rates are the same as those in Com. Ex. 1 except that 0.2 parts by mass of component (ii) PC1 is compounded. |
| Com. Ex. 5 | 572 | 1.00 | 40 | 85 | 6 | At or below detection limit | Compounding rates are the same as those in Com. Ex. 2 except that 0.2 parts by mass of component (ii) PC1 is compounded. |
| Com. Ex. 6 | 577 | 0.42 | 152 | 88 | 4 | Sodium ion (350 ppm) | Compounding rates are the same as those in Com. Ex. 3 except that 0.2 parts by mass of component (ii) PC1 is compounded. |

Ex.: Example
Com. Ex.: Comparative Example

Examples 49 to 72, Comparative Examples 7 to 9

Photochromic curable compositions described in Tables 9 to 12 below were prepared.

The prepared photochromic curable compositions were used as adhesives. In other words, a pair of optical substrates (plates) of inorganic glass for optical article were joined with the adhesive so as to produce a laminate. Specifically, a photochromic curable composition was first coated on one of the plates made of inorganic glass for optical article with a 0.1 mm thick spacer placed at the end part. Then, the other plate made of inorganic glass for optical article was placed on the coated photochromic curable composition. Thereafter, the photochromic curable composition was polymerized. The polymerization was carried out using an air furnace. The composition was cured over 18 hours with a gradual increase in temperature from 27 °C to 120 °C. The thus obtained laminate had a pair of plates of inorganic glass for optical article, where the plates were joined with the adhesive. In other words, a glass-bonded type photochromic laminate comprising a photochromic cured product having a thickness of 0.1 mm was obtained.

The photochromic properties and durability of the obtained photochromic laminate were evaluated by the same method as in Example 1, and the evaluation results are shown in Tables 13 to 14. The mobility of the component (i) was measured by separately curing the photochromic curable composition under the same conditions as those of the aforementioned method and measuring the obtained cured product. Heat resistance was not evaluated in considering the influence of plates made of inorganic glass.

TABLE 9

| No. | Photochromic curable composition (part by mass) Component (ii) | Component (A) | Component (B) Component (B1) | Component (B2) | Component (C) | Other component | Alkali metal ion or alkaline earth metal ion (content) |
|---|---|---|---|---|---|---|---|
| Example 49 | PC1 (2) | NBDI (39) | DPMP (43) | WS-140 (18) | C1 (0.05) | Ir245 (0.1) | Potassium ion (60 ppb) |
| Example 50 | PC1 (2) | 1,3-H6XDI (37) | DPMP (44) | WS-140 (19) | C1 (0.05) | Ir245 (0.1) | Potassium ion (60 ppb) |
| Example 51 | PC1 (2) | IPDI (41) | DPMP (42) | WS-140 (17) | C1 (0.05) | Ir245 (0.1) | Potassium ion (60 ppb) |
| Example 52 | PC1 (2) | 1,4-H6XDI (37) | DPMP (44) | WS-140 (19) | C1 (0.05) | Ir245 (0.1) | Potassium ion (60 ppb) |
| Example 53 | PC1 (2) | 1,3-H6XDI (40) | DPMP (50) | WS-140 (10) | C1 (0.05) | Ir245 (0.1) | Potassium ion (50 ppb) |
| Example 54 | PC1 (2) | 1,3-H6XDI (38) | PEMP (43) | WS-140 (19) | C1 (0.05) | Ir245 (0.1) | Potassium ion (60 ppb) |
| Example 55 | PC1 (2) | IPDI (42) | PEMP (40) | WS-140 (18) | C1 (0.05) | Ir245 (0.1) | Potassium ion (60 ppb) |
| Example 56 | PC1 (2) | 1,3-H6XDI (42) | PEMP (48) | WS-140 (10) | C1 (0.05) | Ir245 (0.1) | Potassium ion (50 ppb) |
| Example 57 | PC1 (2) | 1,3-H6XDI (37) | DPMP (33)<br>TMMP (12) | WS-140 (18) | C1 (0.05) | Ir245 (0.1) | Potassium ion (60 ppb) |
| Example 58 | PC1 (2) | IPDI (41) | DPMP (31)<br>TMMP (10) | WS-140 (18) | C1 (0.05) | Ir245 (0.1) | Potassium ion (60 ppb) |
| Example 59 | PC1 (2) | 1,3-H6XDI (37) | DPMP (45)<br>RX-1 (4) | WS-140 (14) | C1 (0.05) | Ir245 (0.1) | Potassium ion (70 ppb) |
| Example 60 | PC1 (2) | 1,3-H6XDI (37) | DPMP (33)<br>TMMP (12)<br>RX-1 (4) | WS-140 (14) | C1 (0.05) | Ir245 (0.1) | Potassium ion (85 ppb) |
| Example 61 | PC1 (2) | 1,3-H6XDI (38) | TMMP (48) | WS-140 (14) | C1 (0.05) | Ir245 (0.1) | Potassium ion (50 ppb) |
| Example 62 | PC1 (2) | 1,3-H6XDI (35) | DPMP (40) | WS-140 (25) | C1 (0.05) | Ir245 (0.1) | Potassium ion (100 ppb)<br>Sodium ion (70 ppb) |

TABLE 10

| No. | Photochromic curable composition (part by mass) Component (ii) | Component (A) | Component (B) Component (B1) | Component (B2) | Component (C) | Other component | Alkali metal ion or alkaline earth metal ion (content) |
|---|---|---|---|---|---|---|---|
| Example 63 | PC1 (2) | 1,3-H6XDI (37) | DPMP (44) | L-34 (19) | C1 (0.05) | Ir245 (0.1) | Potassium ion (45 ppb) |
| Example 64 | PC1 (2) | 1,3-H6XDI (38) | DPMP (47) | L-34 (15) | C1 (0.05) | Ir245 (0.1) | Potassium ion (45 ppb) |
| Example 65 | PC1 (2) | 1,3-H6XDI (40) | DPMP (50) | L-34 (10) | C1 (0.05) | Ir245 (0.1) | Potassium ion (40 ppb) |
| Example 66 | PC1 (2) | 1,3-H6XDI (38) | PEMP (42) | L-34 (20) | C1 (0.05) | Ir245 (0.1) | Potassium ion (45 ppb) |
| Example 67 | PC1 (2) | 1,3-H6XDI (40) | PEMP (45) | L-34 (15) | C1 (0.05) | Ir245 (0.1) | Potassium ion (45 ppb) |
| Example 68 | PC1 (2) | 1,3-H6XDI (42) | PEMP (48) | L-34 (10) | C1 (0.05) | Ir245 (0.1) | Potassium ion (40 ppb) |
| Example 69 | PC1 (2) | 1,3-H6XDI (37) | DPMP (33)<br>TMMP (11) | L-34 (19) | C1 (0.05) | Ir245 (0.1) | Potassium ion (45 ppb) |
| Example 70 | PC1 (2) | 1,3-H6XDI (40) | TMMP (50) | L-34 (10) | C1 (0.05) | Ir245 (0.1) | Potassium ion (100 ppm) |
| Example 71 | PC1 (2) | 1,3-H6XDI (37) | DPMP (44) | WS-140 (19) | C1 (0.05) | Ir245 (0.1) | Potassium ion (800 ppm) |
| Example 72 | PC1 (2) | 1,3-H6XDI (37) | DPMP (44) | L-34 (19) | C1 (0.05) | Ir245 (0.1) | Potassium ion (750 ppm) |
| Comparative Example 7 | PC1 (2) | 1,3-H6XDI (40) | TMMP (50) | WS-140 (10) | C1 (0.05) | Ir245 (0.1) | Potassium ion (50 ppm) |
| Comparative Example 8 | PC1 (2) | 1,3-H6XDI (32) | DPMP (34) | WS-140 (34) | C1 (0.05) | Ir245 (0.1) | Potassium ion (50 ppb) |
| Comparative Example 9 | PC1 (2) | 1,3-H6XDI (42) | PEMP (48) | MPEG750 (10) | C1 (0.05) | Ir245 (0.1) | Sodium ion (300 ppm) |

TABLE 11

| | Photochromic curable composition (mole number · molar ratio) Component (A) nA | Component (B) Component (B1) Component (B1a) nB1a | Component (B1b) nB1b | Component (B1) nB1 | Component (B2) nB2 | nB1/nB2 | Component (B) nB | nA/nB | Composition thickening degree $\Delta v_{3h}$ (cSt) |
|---|---|---|---|---|---|---|---|---|---|
| Example 49 | 40.91 mmol | 34.65 mmol | — | 34.65 mmol | 2.54 mmol | 13.6 | 37.19 mmol | 1.10 | 80 |
| Example 50 | 40.91 mmol | 34.65 mmol | — | 34.65 mmol | 2.54 mmol | 13.6 | 37.19 mmol | 1.10 | 80 |
| Example 51 | 40.91 mmol | 34.65 mmol | — | 34.65 mmol | 2.54 mmol | 13.6 | 37.19 mmol | 1.10 | 80 |
| Example 52 | 40,91 mmol | 34.65 mmol | — | 34.65 mmol | 2.54 mmol | 13.6 | 37.19 mmol | 1.10 | 80 |
| Example 53 | 40,91 mmol | 35.94 mmol | — | 35.94 mmol | 1.25 mmol | 28.8 | 37.19 mmol | 1.10 | 100 |
| Example 54 | 40.91 mmol | 34.65 mmol | — | 34.65 mmol | 2.54 mmol | 13.6 | 37.19 mmol | 1.10 | 60 |
| Example 55 | 40.91 mmol | 34.65 mmol | — | 34.65 mmol | 2.54 mmol | 13.6 | 37.19 mmol | 1.10 | 60 |

TABLE 11-continued

| | Photochromic curable composition (mole number · molar ratio) | | | | | | | | |
|---|---|---|---|---|---|---|---|---|---|
| | | Component (B) | | | | | | | Composition |
| | | Component (B1) | | | | | | | |
| | Component (A) nA | Component (B1a) nB1a | Component (B1b) nB1b | Component (B1) nB1 | Component (B2) nB2 | nB1/nB2 | Component (B) nB | nA/nB | thickening degree $\Delta v_{3h}$ (cSt) |
| Example 56 | 40.91 mmol | 35.94 mmol | — | 35.94 mmol | 1.25 mmol | 28.8 | 37.19 mmol | 1.10 | 80 |
| Example 57 | 40.91 mmol | 34.65 mmol | — | 34.65 mmol | 2.54 mmol | 13.6 | 37.19 mmol | 1.10 | 50 |
| Example 58 | 40.91 mmol | 34.65 mmol | — | 34.65 mmol | 2.54 mmol | 13.6 | 37.19 mmol | 1.10 | 50 |
| Example 59 | 40.91 mmol | 34.65 mmol | 0.60 mmol | 35.25 mmol | 1.94 mmol | 18.2 | 37.19 mmol | 1.10 | 80 |
| Example 60 | 40.91 mmol | 34.65 mmol | 0.60 mmol | 35.25 mmol | 1.94 mmol | 18.2 | 37.19 mmol | 1.10 | 50 |
| Example 61 | 40.91 mmol | 35.30 mmol | — | 35.30 mmol | 1.89 mmol | 18.7 | 37.19 mmol | 1.10 | 60 |
| Example 62 | 40.91 mmol | 33.89 mmol | — | 33.89 mmol | 3.30 mmol | 10.3 | 37.19 mmol | 1.10 | 50 |

TABLE 12

| | Photochromic curable composition (mole number · molar ratio) | | | | | | | | |
|---|---|---|---|---|---|---|---|---|---|
| | | Component (B) | | | | | | | Composition |
| | | Component (B1) | | | | | | | thickening |
| | Component (A) nA | Component (B1a) nB1a | Component (B1b) nB1b | Component (B1) nB1 | Component (B2) nB2 | nB1/nB2 | Component (B) nB | nA/nB | degree $\Delta v_{3h}$ (cSt) |
| Example 63 | 40.91 mmol | 34.65 mmol | — | 34.65 mmol | 2.54 mmol | 13.6 | 37.19 mmol | 1.10 | 415 |
| Example 64 | 40.91 mmol | 35.30 mmol | — | 35.30 mmol | 1.89 mmol | 18.7 | 37.19 mmol | 1.10 | 430 |
| Example 65 | 40.91 mmol | 35.94 mmol | — | 35.94 mmol | 1.25 mmol | 28.8 | 37.19 mmol | 1.10 | 440 |
| Example 66 | 40.91 mmol | 34.65 mmol | — | 34.65 mmol | 2.54 mmol | 13.6 | 37.19 mmol | 1.10 | 410 |
| Example 67 | 40.91 mmol | 35.30 mmol | — | 35.30 mmol | 1.89 mmol | 18.7 | 37.19 mmol | 1.10 | 420 |
| Example 68 | 40.91 mmol | 35.94 mmol | — | 35.94 mmol | 1.25 mmol | 28.8 | 37.19 mmol | 1.10 | 430 |
| Example 69 | 40.91 mmol | 34.65 mmol | — | 34.65 mmol | 2.54 mmol | 13.6 | 37.19 mmol | 1.10 | 410 |
| Example 70 | 40.91 mmol | 35.94 mmol | — | 35.94 mmol | 1.25 mmol | 28.8 | 37.19 mmol | 1.10 | 405 |
| Example 71 | 40.91 mmol | 34.65 mmol | — | 34.65 mmol | 2.54 mmol | 13.6 | 37.19 mmol | 1.10 | 20 |
| Example 72 | 40.91 mmol | 34.65 mmol | — | 34.65 mmol | 2.54 mmol | 13.6 | 37.19 mmol | 1.10 | 410 |
| Comparative Example 7 | 40.91 mmol | 35.94 mmol | — | 35.94 mmol | 1.25 mmol | 28.8 | 37.19 mmol | 1.10 | 25 |
| Comparative Example 8 | 40.91 mmol | 31.59 mmol | — | 31.59 mmol | 5.60 mmol | 5.6 | 37.19 mmol | 1.10 | 30 |
| Comparative Example 9 | 40.91 mmol | 35.94 mmol | — | 35.94 mmol | 1.25 mmol | 28.8 | 37.19 mmol | 1.10 | 20 |

TABLE 13

| | Photochromic optical article | | | | | | | | | | | | | |
|---|---|---|---|---|---|---|---|---|---|---|---|---|---|---|
| | | | | | | | | | | Photochromic properties (23 °C) | | Durability (Xe acceleration test) 96 h | | Alkali metal ion or alkaline |
| | Mobility of component (i) | | | | | | | | | Color | | | | |
| | $PMI_{pst}$ | $PMI_{cp}$ | $PMI_{pst}$/ $PMI_{cp}$ | $AMI_{pst}$ | $AMI_{cp}$ | $AMI_{pst}$/ $AMI_{cp}$ | $EI_{pst}$ | $EI_{cp}$ | $EI_{pst}$/ $EI_{cp}$ | $\lambda_{max}$ (nm) | optical density | $t_{1/2}$ (sec) | Residual rate (%) | ΔYI | earth metal ion (content) |
| Ex. 49 | 2.57 | 0.18 | 14.3 | 2.62 | 0.17 | 15.4 | 11.62 | 1.66 | 7.0 | 573 | 0.90 | 46 | 90 | 5 | less than detection limit |
| Ex. 50 | 2.54 | 0.18 | 14.1 | 2.48 | 0.18 | 13.8 | 11.68 | 1.50 | 7.4 | 573 | 0.90 | 48 | 90 | 5 | less than detection limit |
| Ex. 51 | 1.95 | 0.16 | 12.2 | 2.03 | 0.16 | 12.7 | 9.73 | 1.37 | 7.1 | 575 | 0.82 | 68 | 89 | 5 | less than detection limit |
| Ex. 52 | 2.50 | 0.18 | 13.9 | 2.43 | 0.17 | 14.3 | 10.80 | 1.50 | 7.2 | 573 | 0.90 | 46 | 89 | 5 | less than detection limit |
| Ex. 53 | 1.25 | 0.12 | 10.4 | 1.18 | 0.12 | 9.8 | 4.82 | 0.79 | 6.1 | 573 | 0.61 | 74 | 91 | 4 | less than detection limit |
| Ex. 54 | 3.41 | 0.24 | 14.2 | 3.17 | 0.22 | 14.4 | 9.79 | 1.36 | 7.2 | 573 | 0.86 | 60 | 88 | 6 | less than detection limit |
| Ex. 55 | 2.63 | 0.25 | 10.5 | 2.69 | 0.24 | 11.2 | 8.76 | 1.51 | 5.8 | 575 | 0.77 | 82 | 86 | 6 | less than detection limit |

TABLE 13-continued

| | Photochromic optical article | | | | | | | | | | | | | | |
|---|---|---|---|---|---|---|---|---|---|---|---|---|---|---|---|
| | Mobility of component (i) | | | | | | | | | Photochromic properties (23 °C) | | | Durability (Xe acceleration test) 96 h | | Alkali metal ion or alkaline earth metal ion (content) |
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ | $\lambda_{max}$ (nm) | Color optical density | $t_{1/2}$ (sec) | Residual rate (%) | ΔYI | |
| Ex. 56 | 1.08 | 0.12 | 9.0 | 1.21 | 0.12 | 10.1 | 4.86 | 0.81 | 6.0 | 573 | 0.60 | 94 | 90 | 5 | less than detection limit |
| Ex. 57 | 2.56 | 0.18 | 14.2 | 2.52 | 0.18 | 14.0 | 10.65 | 1.50 | 7.1 | 573 | 0.88 | 58 | 88 | 6 | less than detection limit |
| Ex. 58 | 2.30 | 0.19 | 12.1 | 2.66 | 0.20 | 13.3 | 11.32 | 1.64 | 6.9 | 575 | 0.78 | 75 | 86 | 6 | less than detection limit |
| Ex. 59 | 2.52 | 0.18 | 14.0 | 2.52 | 0.18 | 14.0 | 10.50 | 1.50 | 7.0 | 573 | 0.90 | 46 | 90 | 5 | less than detection limit |
| Ex. 60 | 3.38 | 0.24 | 14.1 | 3.12 | 0.22 | 14.2 | 10.06 | 1.36 | 7.4 | 573 | 0.88 | 58 | 88 | 6 | less than detection limit |
| Ex. 61 | 1.99 | 0.24 | 8.3 | 2.39 | 0.21 | 11.4 | 8.21 | 1.44 | 5.7 | 575 | 0.68 | 180 | 85 | 7 | less than detection limit |
| Ex. 62 | 4.42 | 0.20 | 22.1 | 4.46 | 0.20 | 22.3 | 13.70 | 1.65 | 8.3 | 573 | 0.98 | 43 | 86 | 6 | less than detection limit |

Ex.: Example

TABLE 14

| | Photochromic optical article | | | | | | | | | | | | | | |
|---|---|---|---|---|---|---|---|---|---|---|---|---|---|---|---|
| | Mobility of component (i) | | | | | | | | | Photochromic properties (23 °C) | | | Durability (Xe acceleration test) 96 h | | Alkali metal ion or alkaline earth metal ion (content) |
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ | $\lambda_{max}$ (nm) | Color optical density | $t_{1/2}$ (sec) | Residual rate (%) | ΔY | |
| Ex. 63 | 17.10 | 0.50 | 34.2 | — | — | — | 17.21 | 1.55 | 11.1 | 572 | 0.97 | 43 | 88 | 5 | less than detection limit |
| Ex. 64 | 15.85 | 0.56 | 28.3 | — | — | — | 17.54 | 1.72 | 10.2 | 572 | 0.85 | 51 | 89 | 4 | less than detection limit |
| Ex. 65 | 13.13 | 0.65 | 20.2 | — | — | — | 17.48 | 2.01 | 8.7 | 572 | 0.66 | 66 | 90 | 4 | less than detection limit |
| Ex. 66 | 15.20 | 0.51 | 29.8 | — | — | — | 17.85 | 1.58 | 11.3 | 572 | 0.95 | 48 | 88 | 6 | less than detection limit |
| Ex. 67 | 14.36 | 0.57 | 25.2 | — | — | — | 17.95 | 1.76 | 10.2 | 572 | 0.83 | 58 | 88 | 5 | less than detection limit |
| Ex. 68 | 13.27 | 0.66 | 20.1 | — | — | — | 17.43 | 2.05 | 8.5 | 572 | 0.65 | 72 | 90 | 4 | less than detection limit |
| Ex. 69 | 16.63 | 0.51 | 32.6 | — | — | — | 17.85 | 1.58 | 11.3 | 572 | 0.96 | 50 | 88 | 6 | less than detection limit |
| Ex. 70 | 6.26 | 0.62 | 10.1 | — | — | — | 7.49 | 1.17 | 6.4 | 575 | 0.57 | 143 | 86 | 6 | Potassium ion (120 ppm) |
| Ex. 71 | 2.52 | 0.18 | 14.0 | 2.54 | 0.18 | 14.1 | 11.10 | 1.50 | 7.4 | 573 | 0.90 | 55 | 70 | 16 | Potassium ion (850 ppm) |
| Ex. 72 | 17.15 | 0.50 | 34.3 | — | — | — | 17.05 | 1.55 | 11.0 | 572 | 0.97 | 50 | 70 | 15 | Potassium ion (800 ppm) |
| Com. Ex. 7 | 1.51 | 0.21 | 7.2 | 1.24 | 0.20 | 6.2 | 7.19 | 1.41 | 5.1 | 575 | 0.53 | 235 | 86 | 6 | Potassium ion (75 ppm) |
| Com. Ex. 8 | 10.18 | 0.24 | 42.4 | 10.20 | 0.24 | 42.5 | 18.22 | 1.98 | 9.2 | 572 | 1.00 | 40 | 85 | 6 | less than detection limit |
| Com. Ex. 9 | — | — | — | — | — | — | 2.88 | 0.72 | 4.0 | 577 | 0.42 | 152 | 88 | 4 | Sodium ion (350 ppm) |

Ex.: Example
Com. Ex.: Comparative Example

Examples 73 to 96, Comparative Examples 10 to 12

The photochromic curable compositions described in Tables 15 to 18 below were prepared.

The prepared photochromic curable composition was used as the adhesive. In other words, a pair of optical substrates (plates) made of inorganic glass for optical article, one of which had a polarizing film on its surface, were joined to another plate with the adhesive so as to produce a laminate.

Specifically, an acrylic adhesive was first spin-coated on one surface of the plate made of inorganic glass for optical article, and a polarizing film (thickness: 27 μm, luminous transmittance: 42.5%, polarizing degree: 99.2%, gray color, polyvinyl alcohol base) was disposed thereon. Then, UV rays were radiated from the plate side to prepare an optical substrate on which the polarizing film/plate was laminated.

Next, a photochromic curable composition was coated on a plate made of inorganic glass for optical article on which a spacer having a thickness of 0.1 mm was placed at the end, and the aforementioned optical substrate having a polarizing film laminated thereon was arranged so that the polarizing film surface would be in contact with the photochromic curable composition.

Thereafter, the photochromic curable composition was polymerized. Polymerization was carried out using an air furnace. The composition was cured over 18 hours while gradually increasing the temperature from 27 °C to 120 °C, thereby joining the pair of plates for optical article. In this manner, a glass-bonded type photochromic laminate comprising a polarizing film layer and a photochromic layer of a thickness of 0.1 mm was obtained.

The obtained photochromic laminate was evaluated for photochromic properties and durability by the same method as in Example 1, and the evaluation results are shown in Tables 19 to 20. The mobility of the component (i) was measured by separately curing the photochromic curable composition under the same conditions as those of the aforementioned methods to measure the obtained cured product. Heat resistance was not evaluated considering the influence of plates made of inorganic glass.

TABLE 15

| | Photochromic curable composition (part by mass) | | | | | | Alkali metal ion or |
|---|---|---|---|---|---|---|---|
| | | | Component (B) | | | Other | alkaline earth metal |
| No. | Component (ii) | Component (A) | Component (B1) | Component (B2) | Component (C) | component | ion (content) |
| Example 73 | PC1 (0.1) | NBDI (43) | DPMP (40) | WS-140 (17) | C1 (0.05) | Ir245 (0.1) | Potassium ion (60 ppb) |
| Example 74 | PC1 (0.1) | 1,3-H6XDI (41) | DPMP (41) | WS-140 (18) | C1 (0.05) | Ir245 (0.1) | Potassium ion (60 ppb) |
| Example 75 | PC1 (0.1) | IPDI (45) | DPMP (39) | WS-140 (16) | C1 (0.05) | Ir245 (0.1) | Potassium ion (60 ppb) |
| Example 76 | PC1 (0.1) | 1,4-H6XDI (41) | DPMP (41) | WS-140 (18) | C1 (0.05) | Ir245 (0.1) | Potassium ion (60 ppb) |
| Example 77 | PC1 (0.1) | 1,3-H6XDI (44) | DPMP (47) | WS-140 (9) | C1 (0.05) | Ir245 (0.1) | Potassium ion (50 ppb) |
| Example 78 | PC1 (0.1) | 1,3-H6XDI (42) | PEMP (40) | WS-140 (18) | C1 (0.05) | Ir245 (0.1) | Potassium ion (60 ppb) |
| Example 79 | PC1 (0.1) | IPDI (46) | PEMP (37) | WS-140 (17) | C1 (0.05) | Ir245 (0.1) | Potassium ion (60 ppb) |
| Example 80 | PC1 (0.1) | 1,3-H6XDI (46) | PEMP (45) | WS-140 (9) | C1 (0.05) | Ir245 (0.1) | Potassium ion (50 ppb) |
| Example 81 | PC1 (0.1) | 1,3-H6XDI (41) | DPMP (31)<br>TMMP (11) | WS-140 (17) | C1 (0.05) | Ir245 (0.1) | Potassium ion (60 ppb) |
| Example 82 | PC1 (0.1) | IPDI (45) | DPMP (29)<br>TMMP (9) | WS-140 (17) | C1 (0.05) | Ir245 (0.1) | Potassium ion (60 ppb) |
| Example 83 | PC1 (0.1) | 1,3-H6XDI (41) | DPMP (42)<br>RX-1 (4) | WS-140 (13) | C1 (0.05) | Ir245 (0.1) | Potassium ion (70 ppb) |
| Example 84 | PC1 (0.1) | 1,3-H6XDI (41) | DPMP (31)<br>TMMP (11)<br>RX-1 (4) | WS-140 (13) | C1 (0.05) | Ir245 (0.1) | Potassium ion (85 ppb) |
| Example 85 | PC1 (0.1) | 1,3-H6XDI (42) | TMMP (45) | WS-140 (13) | C1 (0.05) | Ir245 (0.1) | Potassium ion (50 ppb) |
| Example 86 | PC1 (0.1) | 1,3-H6XDI (39) | DPMP (38) | WS-140 (23) | C1 (0.05) | Ir245 (0.1) | Potassium ion (100 ppb)<br>Sodium ion (70 ppb) |

TABLE 16

| | Photochromic curable composition (part by mass) | | | | | | Alkali metal ion or |
|---|---|---|---|---|---|---|---|
| | | | Component (B) | | Component | Other | alkaline earth metal |
| No. | Component (ii) | Component (A) | Component (B1) | Component (B2) | (C) | component | ion (content) |
| Example 87 | PC1 (0.1) | 1,3-H6XDI (41) | DPMP (41) | L-34 (18) | C1 (0.05) | Ir245 (0.1) | Potassium ion (45 ppb) |
| Example 88 | PC1 (0.1) | 1,3-H6XDI (42) | DPMP (44) | L-34 (14) | C1 (0.05) | Ir245 (0.1) | Potassium ion (45 ppb) |
| Example 89 | PC1 (0.1) | 1,3-H6XDI (44) | DPMP (47) | L-34 (9) | C1 (0.05) | Ir245 (0.1) | Potassium ion (40 ppb) |
| Example 90 | PC1 (0.1) | 1,3-H6XDI (42) | PEMP (40) | L-34 (18) | C1 (0.05) | Ir245 (0.1) | Potassium ion (45 ppb) |
| Example 91 | PC1 (0.1) | 1,3-H6XDI (44) | PEMP (42) | L-34 (14) | C1 (0.05) | Ir245 (0.1) | Potassium ion (45 ppb) |
| Example 92 | PC1 (0.1) | 1,3-H6XDI (46) | PEMP (45) | L-34 (9) | C1 (0.05) | Ir245 (0.1) | Potassium ion (40 ppb) |
| Example 93 | PC1 (0.1) | 1,3-H6XDI (41) | DPMP (31)<br>TMMP (10) | L-34 (18) | C1 (0.05) | Ir245 (0.1) | Potassium ion (45 ppb) |
| Example 94 | PC1 (0.1) | 1,3-H6XDI (44) | TMMP (47) | L-34 (9) | C1 (0.05) | Ir245 (0.1) | Potassium ion (100 ppm) |
| Example 95 | PC1 (0.1) | 1,3-H6XDI (41) | DPMP (41) | WS-140 (18) | C1 (0.05) | Ir245 (0.1) | Potassium ion (800 ppm) |
| Example 96 | PC1 (0.1) | 1,3-H6XDI (41) | DPMP (41) | L-34 (18) | C1 (0.05) | Ir245 (0.1) | Potassium ion (750 ppm) |
| Comparative Example 10 | PC1 (0.1) | 1,3-H6XDI (44) | TMMP (47) | WS-140 (9) | C1 (0.05) | Ir245 (0.1) | Potassium ion (50 ppm) |
| Comparative Example 11 | PC1 (0.1) | 1,3-H6XDI (36) | DPMP (32) | WS-140 (32) | C1 (0.05) | Ir245 (0.1) | Potassium ion (50 ppb) |
| Comparative Example 12 | PC1 (0.1) | 1,3-H6XDI (46) | PEMP (45) | MPEG750 (9) | C1 (0.05) | Ir245 (0.1) | Sodium ion (300 ppm) |

TABLE 17

| | Photochromic curable composition (mole number · molar ratio) | | | | | | | | Composition thickening degree |
|---|---|---|---|---|---|---|---|---|---|
| | | Component (B) | | | | | | | |
| | | Component (B1) | | | | | | | |
| | Component (A) nA | Component (B1a) nB1a | Component (B1b) nB1b | Component (B1) nB1 | Component (B2) nB2 | nB1/nB2 | Component (B) nB | nA/nB | $\Delta v_{3h}$ (cSt) |
| Example 73 | 48.35 mmol | 34.65 mmol | — | 34.65 mmol | 2.54 mmol | 13.6 | 37.19 mmol | 1.30 | 65 |
| Example 74 | 48.35 mmol | 34.65 mmol | — | 34.65 mmol | 2.54 mmol | 13.6 | 37.19 mmol | 1.30 | 65 |
| Example 75 | 48.35 mmol | 34.65 mmol | — | 34.65 mmol | 2.54 mmol | 13.6 | 37.19 mmol | 1.30 | 65 |
| Example 76 | 48.35 mmol | 34.65 mmol | — | 34.65 mmol | 2.54 mmol | 13.6 | 37.19 mmol | 1.30 | 65 |
| Example 77 | 48.35 mmol | 35.94 mmol | — | 35.94 mmol | 1.25 mmol | 28.8 | 37.19 mmol | 1.30 | 85 |
| Example 78 | 48.35 mmol | 34.65 mmol | — | 34.65 mmol | 2.54 mmol | 13.6 | 37.19 mmol | 1.30 | 45 |
| Example 79 | 48.35 mmol | 34.65 mmol | — | 34.65 mmol | 2.54 mmol | 13.6 | 37.19 mmol | 1.30 | 45 |
| Example 80 | 48.35 mmol | 35.94 mmol | — | 35.94 mmol | 1.25 mmol | 28.8 | 37.19 mmol | 1.30 | 65 |
| Example 81 | 48.35 mmol | 34.65 mmol | — | 34.65 mmol | 2.54 mmol | 13.6 | 37.19 mmol | 1.30 | 35 |
| Example 82 | 48.35 mmol | 34.65 mmol | — | 34.65 mmol | 2.54 mmol | 13.6 | 37.19 mmol | 1.30 | 35 |
| Example 83 | 48.35 mmol | 34.65 mmol | 0.60 mmol | 35.25 mmol | 1.94 mmol | 18.2 | 37.19 mmol | 1.30 | 65 |
| Example 84 | 48.35 mmol | 34.65 mmol | 0.60 mmol | 35.25 mmol | 1.94 mmol | 18.2 | 37.19 mmol | 1.30 | 35 |
| Example 85 | 48.35 mmol | 35.30 mmol | — | 35.30 mmol | 1.89 mmol | 18.7 | 37.19 mmol | 1.30 | 45 |
| Example 86 | 48.35 mmol | 33.89 mmol | — | 33.89 mmol | 3.30 mmol | 10.3 | 37.19 mmol | 1.30 | 35 |

TABLE 18

| | Photochromic curable composition (mole number · molar ratio) | | | | | | | | Composition thickening degree |
|---|---|---|---|---|---|---|---|---|---|
| | | Component (B) | | | | | | | |
| | | Component (B1) | | | | | | | |
| | Component (A) nA | Component (B1a) nB1a | Component (B1b) nB1b | Component (B1) nB1 | Component (B2) nB2 | nB1/nB2 | Component (B) nB | nA/nB | $\Delta v_{3h}$ (cSt) |
| Example 87 | 48.35 mmol | 34.65 mmol | — | 34.65 mmol | 2.54 mmol | 13.6 | 37.19 mmol | 1.30 | 400 |
| Example 88 | 48.35 mmol | 35.30 mmol | — | 35.30 mmol | 1.89 mmol | 18.7 | 37.19 mmol | 1.30 | 415 |
| Example 89 | 48.35 mmol | 35.94 mmol | — | 35.94 mmol | 1.25 mmol | 28.8 | 37.19 mmol | 1.30 | 425 |
| Example 90 | 48.35 mmol | 34.65 mmol | — | 34.65 mmol | 2.54 mmol | 13.6 | 37.19 mmol | 1.30 | 395 |
| Example 91 | 48.35 mmol | 35.30 mmol | — | 35.30 mmol | 1.89 mmol | 18.7 | 37.19 mmol | 1.30 | 405 |
| Example 92 | 48.35 mmol | 35.94 mmol | — | 35.94 mmol | 1.25 mmol | 28.8 | 37.19 mmol | 1.30 | 415 |
| Example 93 | 48.35 mmol | 34.65 mmol | — | 34.65 mmol | 2.54 mmol | 13.6 | 37.19 mmol | 1.30 | 395 |
| Example 94 | 48.35 mmol | 35.94 mmol | — | 35.94 mmol | 1.25 mmol | 28.8 | 37.19 mmol | 1.30 | 390 |
| Example 95 | 48.35 mmol | 34.65 mmol | — | 34.65 mmol | 2.54 mmol | 13.6 | 37.19 mmol | 1.30 | 10 |
| Example 96 | 48.35 mmol | 34.65 mmol | — | 34.65 mmol | 2.54 mmol | 13.6 | 37.19 mmol | 1.30 | 395 |
| Comparative Example 10 | 48.35 mmol | 35.94 mmol | — | 35.94 mmol | 1.25 mmol | 28.8 | 37.19 mmol | 1.30 | 15 |
| Comparative Example 11 | 48.35 mmol | 31.59 mmol | — | 31.59 mmol | 5.60 mmol | 5.6 | 37.19 mmol | 1.30 | 20 |
| Comparative Example 12 | 48.35 mmol | 35.94 mmol | — | 35.94 mmol | 1.25 mmol | 28.8 | 37.19 mmol | 1.30 | 10 |

TABLE 19

| | Photochromic optical article Mobility of component (i) | | | | | | | | |
|---|---|---|---|---|---|---|---|---|---|
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ |
| Ex. 73 | 2.57 | 0.18 | 14.3 | 2.62 | 0.17 | 15.4 | 11.62 | 1.66 | 7.0 |
| Ex. 74 | 2.54 | 0.18 | 14.1 | 2.48 | 0.18 | 13.8 | 11.68 | 1.50 | 7.4 |
| Ex. 75 | 1.95 | 0.16 | 12.2 | 2.03 | 0.16 | 12.7 | 9.73 | 1.37 | 7.1 |
| Ex. 76 | 2.50 | 0.18 | 13.9 | 2.43 | 0.17 | 14.3 | 10.80 | 1.50 | 7.2 |
| Ex. 77 | 1.25 | 0.12 | 10.4 | 1.18 | 0.12 | 9.8 | 4.82 | 0.79 | 6.1 |
| Ex. 78 | 3.41 | 0.24 | 14.2 | 3.17 | 0.22 | 14.4 | 9.79 | 1.36 | 7.2 |
| Ex. 79 | 2.63 | 0.25 | 10.5 | 2.69 | 0.24 | 11.2 | 8.76 | 1.51 | 5.8 |
| Ex. 80 | 1.08 | 0.12 | 9.0 | 1.21 | 0.12 | 10.1 | 4.86 | 0.81 | 6.0 |
| Ex. 81 | 2.56 | 0.18 | 14.2 | 2.52 | 0.18 | 14.0 | 10.65 | 1.50 | 7.1 |
| Ex. 82 | 2.30 | 0.19 | 12.1 | 2.66 | 0.20 | 13.3 | 11.32 | 1.64 | 6.9 |
| Ex. 83 | 2.52 | 0.18 | 14.0 | 2.52 | 0.18 | 14.0 | 10.50 | 1.50 | 7.0 |

TABLE 19-continued

| | | | | | | | | | |
|---|---|---|---|---|---|---|---|---|---|
| Ex. 84 | 3.38 | 0.24 | 14.1 | 3.12 | 0.22 | 14.2 | 10.06 | 1.36 | 7.4 |
| Ex. 85 | 1.99 | 0.24 | 8.3 | 2.39 | 0.21 | 11.4 | 8.21 | 1.44 | 5.7 |
| Ex. 86 | 4.42 | 0.20 | 22.1 | 4.46 | 0.20 | 22.3 | 13.70 | 1.65 | 8.3 |

| | Photochromic optical article | | | | | |
|---|---|---|---|---|---|---|
| | Photochromic properties (23 °C) | | | Durability (Xe acceleration test) 96 h | | |
| | Color | | | | | |
| | $\lambda_{max}$ (nm) | optical density | $t_{1/2}$ (sec) | Residual rate (%) | ΔYI | Alkali metal ion or alkaline earth metal ion (content) |
| Ex. 73 | 573 | 1.04 | 46 | 94 | 5 | less than detection limit |
| Ex. 74 | 573 | 1.04 | 48 | 94 | 5 | less than detection limit |
| Ex. 75 | 575 | 0.94 | 68 | 93 | 5 | less than detection limit |
| Ex. 76 | 573 | 1.04 | 46 | 93 | 5 | less than detection limit |
| Ex. 77 | 573 | 0.70 | 74 | 95 | 4 | less than detection limit |
| Ex. 78 | 573 | 0.99 | 60 | 92 | 6 | less than detection limit |
| Ex. 79 | 575 | 0.89 | 82 | 90 | 6 | less than detection limit |
| Ex. 80 | 573 | 0.69 | 94 | 94 | 5 | less than detection limit |
| Ex. 81 | 573 | 1.01 | 58 | 92 | 6 | less than detection limit |
| Ex. 82 | 575 | 0.90 | 75 | 90 | 6 | less than detection limit |
| Ex. 83 | 573 | 1.04 | 46 | 94 | 5 | less than detection limit |
| Ex. 84 | 573 | 1.01 | 58 | 92 | 6 | less than detection limit |
| Ex. 85 | 575 | 0.78 | 180 | 89 | 7 | less than detection limit |
| Ex. 86 | 573 | 1.13 | 43 | 90 | 6 | less than detection limit |

Ex.: Example

TABLE 20

| | Photochromic optical article Mobility of component (i) | | | | | | | | |
|---|---|---|---|---|---|---|---|---|---|
| | $PMI_{pst}$ | $PMI_{cp}$ | $PMI_{pst}/PMI_{cp}$ | $AMI_{pst}$ | $AMI_{cp}$ | $AMI_{pst}/AMI_{cp}$ | $EI_{pst}$ | $EI_{cp}$ | $EI_{pst}/EI_{cp}$ |
| Ex. 87 | 17.10 | 0.50 | 34.2 | — | — | — | 17.21 | 1.55 | 11.1 |
| Ex. 88 | 15.85 | 0.56 | 28.3 | — | — | — | 17.54 | 1.72 | 10.2 |
| Ex. 89 | 13.13 | 0.85 | 20.2 | — | — | — | 17.48 | 2.01 | 8.7 |
| Ex. 90 | 15.20 | 0.51 | 29.8 | — | — | — | 17.85 | 1.58 | 11.3 |
| Ex. 91 | 14.36 | 0.57 | 25.2 | — | — | — | 17.95 | 1.76 | 10.2 |
| Ex. 92 | 13.27 | 0.66 | 20.1 | — | — | — | 17.43 | 2.05 | 8.5 |
| Ex. 93 | 16.63 | 0.51 | 32.6 | — | — | — | 17.85 | 1.58 | 11.3 |
| Ex. 94 | 6.26 | 0.62 | 10.1 | — | — | — | 7.49 | 1.17 | 6.4 |
| Ex. 95 | 2.52 | 0.18 | 14.0 | 2.54 | 0.18 | 14.1 | 11.10 | 1.50 | 7.4 |
| Ex. 96 | 17.15 | 0.50 | 34.3 | — | — | — | 17.05 | 1.55 | 11.0 |
| Com. Ex. 10 | 1.51 | 0.21 | 7.2 | 1.24 | 0.20 | 6.2 | 7.19 | 1.41 | 5.1 |
| Com. Ex. 11 | 10.18 | 0.24 | 42.4 | 10.20 | 0.24 | 42.5 | 18.22 | 1.98 | 9.2 |
| Com. Ex. 12 | — | — | — | — | — | — | 2.88 | 0.72 | 4.0 |

| | Photochromic optical article | | | | | |
|---|---|---|---|---|---|---|
| | Photochromic properties (23 °C) | | | Durability (Xe acceleration test) 96 h | | |
| | Color | | | | | |
| | $\lambda_{max}$ (nm) | optical density | $t_{1/2}$ (sec) | Residual rate (%) | ΔYI | Alkali metal ion or alkaline earth metal ion (content) |
| Ex. 87 | 572 | 1.11 | 43 | 93 | 5 | less than detection limit |
| Ex. 88 | 572 | 0.98 | 51 | 94 | 4 | less than detection limit |
| Ex. 89 | 572 | 0.76 | 66 | 95 | 4 | less than detection limit |
| Ex. 90 | 572 | 1.10 | 48 | 93 | 6 | less than detection limit |
| Ex. 91 | 572 | 0.95 | 58 | 93 | 5 | less than detection limit |
| Ex. 92 | 572 | 0.75 | 72 | 95 | 4 | less than detection limit |
| Ex. 93 | 572 | 1.10 | 50 | 93 | 6 | less than detection limit |
| Ex. 94 | 575 | 0.66 | 143 | 91 | 6 | Potassium ion (120 ppm) |

TABLE 20-continued

| | | | | | | |
|---|---|---|---|---|---|---|
| Ex. 95 | 573 | 1.04 | 55 | 74 | 16 | Potassium ion (850 ppm) |
| Ex. 96 | 572 | 1.12 | 50 | 74 | 15 | Potassium ion (800 ppm) |
| Com. Ex. 10 | 575 | 0.61 | 235 | 90 | 6 | Potassium ion (75 ppm) |
| Com. Ex. 11 | 572 | 1.15 | 40 | 89 | 6 | less than detection limit |
| Com. Ex. 12 | 577 | 0.48 | 152 | 92 | 4 | Sodium ion (350 ppm) |

Ex.: Example
Com. Ex.: Comparative Example

It is shown that the resin composition having an intensity ratio ($PMI_{pst}/PMI_{cp}$) of 8.0 or more and 40.0 or less can exhibit excellent photochromic properties and mechanical properties since the molecular mobility is controlled by the crosslinked structure. The thus obtained resin composition can have particularly excellent photochromic properties and heat resistance.

As for the component (B1), a component having six thiol groups in a molecule is used so that a resin composition exhibiting excellent effects can be obtained. By using the component having six thiol groups in a molecule, the intensity ratio ($PMI_{pst}/PMI_{cp}$) of the resulting resin composition can be made relatively high.

As a result, the resin composition according to the embodiment will have excellent photochromic properties and particularly excellent heat resistance. This indicates that the photochromic properties can be evaluated from the intensity ratio ($PMI_{pst}/PMI_{cp}$) for evaluating molecular mobility. In addition, the heat resistance may be improved by using a component having six thiol groups in a molecule. It is considered that the number of hydrogen bonds per crosslinking point is increased and this provides the effect of multivalent interaction (multi-point hydrogen bonding) to improve the heat resistance.

In particular, by combining the component having six thiol groups in a molecule with the component (B21), the intensity ratio ($PMI_{pst}/PMI_{cp}$) can be set to 10.0 or more and 15.0 or less, more preferably 11.0 to 15.0, and still more preferably 12.5 to 15.0. In this case, it is also possible to prevent or lower the viscosity increase of the photochromic curable composition.

In comparison of Examples, the following tendency has been confirmed. PEMP (a component having four thiol groups in a molecule) and DPMP (a component having six thiol groups in a molecule) of the component (B1) correspond to the completely substituted compound. On the other hand, TMMP (a component having three thiol groups in a molecule) corresponds to a partially substituted compound. Comparison of these Examples has clarified that particularly excellent photochromic properties are exhibited by using the PEMP and the DPMP corresponding to the completely substituted compound rather than using the TMMP corresponding to the partially substituted compound. This may imply that the free space for allowing molecular movement of the photochromic compound is effectively formed in a case where the completely substituted compound is used as the component (B1).

Further, by adjusting the contents of alkali metal ion and the alkaline earth metal ions contained in the photochromic composition of the present invention, durability can also be improved. The reason for this is considered as follows. In a case where the contents of the alkali metal salt and the alkaline earth metal salt in the photochromic composition are large, a side reaction such as isocyanuration may occur during the preparation of the photochromic composition or during the polymerization. As a result, the residual thiol group in the cured product increases. The thiol group may generate radicals by ultraviolet rays, which may accelerate the deterioration of the photochromic compound and degrade the durability. In the present invention, it is considered that side reactions are prevented or reduced by setting appropriately the contents of suitable alkali metal ion and alkaline earth metal ion, and thus, the durability is improved.

EXPLANATIONS OF LETTERS OR NUMERALS

10: Polyrotaxane
20: Axial molecule
30: Cyclic molecule
40: Bulky terminal groups
50: Side chain
1: Optical laminate
2: Optical substrate
3: Primer layer
4: Resin composition
110: Eyeglasses
111: Lens
112: Frame

The invention claimed is:

1. A resin composition comprising a urethane-based resin having a polyoxypropylene chain in a molecular chain and a photochromic compound, wherein a ratio of $PMI_{pst}$ to $PMI_{cp}$ ($PMI_{pst}/PMI_{cp}$) is 8.0 or more and 40.0 or less when $PMI_{pst}$ indicates the maximal intensity of signal in a range of 16 ppm to 20 ppm in a first spectrum by $^{13}C$-PST/MAS nuclear magnetic resonance spectroscopy and $PMI_{cp}$ indicates the maximal intensity of signal in a range of 16 ppm to 20 ppm in a second spectrum by $^{13}C$-CP/MAS nuclear magnetic resonance spectroscopy, the urethane-based resin is a resin obtained through a reaction of:

(A) a polyiso(thio)cyanate component having in a molecule at least two iso(thio)cyanate groups selected from the group consisting of an isocyanate group and an isothiocyanate group, and (B) an active hydrogen-containing component having an active hydrogen-containing group, when nB indicates a total mole number of active hydrogen-containing groups of the active hydrogen-containing component (B) and nA indicates the total mole number of iso(thio)cyanate groups of the polyiso(thio) cyanate component (A), a ratio (nA/nB) is 1.00 or more and 1.50 or less, the active hydrogen-containing component (B) comprises:

a polyfunctional active hydrogen-containing component (B1) comprising a compound that has a quaternary carbon atom in a molecule, and all groups to be bonded to the quaternary carbon atom have active hydrogen-containing groups, and a first active hydrogen-containing component (B2) having one or two active hydrogen-containing groups in one molecule, and the first active hydrogen-containing component (B2) has a number average molecular weight of 500 or more and has a polyoxypropylene chain in a molecule.

2. The resin composition according to claim 1, wherein a ratio of $AMI_{pst}$ to $AMI_{cp}$ ($AMI_{pst}/AMI_{cp}$) is 7.0 or more and 23.0 or less when $AMI_{pst}$ indicates the maximal intensity of signal in a range of 10 ppm to 15 ppm in the first spectrum and $AMI_{cp}$ indicates the maximal intensity of signal in a range of 10 ppm to 15 ppm in the second spectrum.

3. The resin composition according to claim 1, wherein a ratio of $EI_{pst}$ to $EI_{cp}$ ($EI_{pst}/EI_{cp}$) is 5.0 or more and 20.0 or less when $EI_{pst}$ indicates the maximal intensity of signal in a range of 68 ppm to 72 ppm in the first spectrum and $EI_{cp}$ indicates the maximal intensity of signal in a range of 68 ppm to 72 ppm in the second spectrum.

4. The resin composition according to claim 1, wherein the total content of alkali metal ion and alkaline earth metal ion by X-ray fluorimetry is 500 ppm or less.

5. The resin composition according to claim 1, wherein the polyoxypropylene chain of the first active hydrogen-containing component (B2) has an average value of oxypropylene repeating units of 2 or more and 25 or less.

6. The resin composition according to claim 1, wherein the first active hydrogen-containing component (B2) further has at least either an alkyl group or a polyoxyethylene chain in a molecule.

7. The resin composition according to claim 6, wherein the first active hydrogen-containing component (B2) has the alkyl group, and the carbon number is 5 or more and 20 or less.

8. The resin composition according to claim 6, wherein the first active hydrogen-containing component (B2) has the polyoxyethylene chain, and the average value of repeating units is 5 or more and 25 or less.

9. An optical laminate comprising:

an optical substrate and the resin composition according to claim 1, laminated on at least one of main surfaces of the optical substrate.

10. The optical laminate according to claim 9, further comprising a polarizing film.

11. An optical article comprising the resin composition according to claim 1.

12. A lens comprising the resin composition according to claim 1.

13. Eyeglasses comprising the lens according to claim 12.

* * * * *